United States Patent [19]
Klein et al.

[11] Patent Number: 5,783,283
[45] Date of Patent: Jul. 21, 1998

[54] MULTILAYER POLYESTER FILM WITH A LOW COEFFICIENT OF FRICTION

[75] Inventors: James A. Klein, Minneapolis; Brandt K. Carter, Woodbury; Sheldon J. Israel, Minneapolis; Raymond L. Lucking, Hastings, all of Minn.

[73] Assignee: Minnesota Mining and Manufacturing Company, St. Paul, Minn.

[21] Appl. No.: 612,526

[22] Filed: Mar. 8, 1996

[51] Int. Cl.[6] ............... B32B 5/00; B32B 27/08; B32B 27/36
[52] U.S. Cl. ............... 428/141; 428/480; 428/694 SG
[58] Field of Search ............... 428/910, 141, 428/480, 694 TR, 694 BR, 694 SG

[56] References Cited

U.S. PATENT DOCUMENTS

| | | | |
|---|---|---|---|
| 3,565,985 | 2/1971 | Schrenk et al. | 264/171 |
| 3,610,729 | 10/1971 | Rogers | 350/157 |
| 3,720,732 | 3/1973 | Sevenich | 260/860 |
| 3,801,429 | 4/1974 | Schrenk et al. | 161/181 |
| 3,884,606 | 5/1975 | Schrenk | 425/133.5 |
| 3,900,604 | 8/1975 | Tanabe et al. | 427/129 |
| 3,967,025 | 6/1976 | Tanabe et al. | 428/155 |
| 3,983,285 | 9/1976 | Riboulet et al. | 428/212 |
| 4,310,584 | 1/1982 | Cooper et al. | 428/212 |
| 4,514,451 | 4/1985 | Suzuki et al. | 428/141 |
| 4,847,033 | 7/1989 | Carroll, Jr. | 264/346 |
| 4,937,134 | 6/1990 | Schrenk et al. | 428/213 |
| 5,018,048 | 5/1991 | Shaw et al. | 361/323 |
| 5,032,461 | 7/1991 | Shaw et al. | 428/461 |
| 5,077,121 | 12/1991 | Harrison et al. | 428/213 |
| 5,094,788 | 3/1992 | Schrenk et al. | 264/171 |
| 5,095,210 | 3/1992 | Wheatley et al. | 250/339 |
| 5,122,905 | 6/1992 | Wheatley et al. | 359/586 |
| 5,122,906 | 6/1992 | Wheatley | 359/586 |
| 5,125,138 | 6/1992 | Shaw et al. | 29/25.42 |

(List continued on next page.)

FOREIGN PATENT DOCUMENTS

| | | |
|---|---|---|
| 0 398 075 | 11/1990 | European Pat. Off. . |
| 0 448 544 A1 | 6/1992 | European Pat. Off. . |
| 0 616 320 | 9/1994 | European Pat. Off. . |
| 0 678 554 A1 | 10/1995 | European Pat. Off. . |
| 63 197 643 | 8/1988 | Japan . |
| 63 212 549 | 9/1988 | Japan . |
| 02 078 545 | 3/1990 | Japan . |
| 03096343 | 4/1991 | Japan . |
| 03224722 | 10/1991 | Japan . |
| 04316843 | 11/1992 | Japan . |
| 5131600A | 4/1993 | Japan . |
| 05269842 | 10/1993 | Japan . |
| 06 198 828 | 7/1994 | Japan . |

(List continued on next page.)

OTHER PUBLICATIONS

Alfrey et al., "Physical Optics of Iridescent Multilayered Plastic Films", *Polymer Engineering and Science*, vol. 9, No. 6, pp. 400–404 (Nov. 1969).

Radford et al., "Reflectivity of Iridescent Coextruded Multilayered Plastic Films", *Polymer Engineering and Science*, vol. 13, No. 3, pp. 216–221 (May 1973).

Schrenk et al., "Some Physical Properties of Multilayered Films", *Polymer Engineering and Science*, vol. 9, No. 6, pp. 393–399 (Nov. 1969).

Bhateja et al., "Mechanical Interactions in Laminated Sheets.II", *J. Macromol. Sci.–Phys.*, B19(4), pp. 743–771 (1981).

Schrenk, "Multilayer Plastic Films", *Applied Polymer Symposium*, No. 24, pp. 9–12 (1974).

*Primary Examiner*—Vivian Chen
*Attorney, Agent, or Firm*—John A. Fortkort

[57] ABSTRACT

A multilayer film is provided with a slippery surface layer by crystallization in an underlying layer which results in the deformation of an overlying surface layer without the use of particulate slip agents. The films may be formed by alternating layers of a naphthalene dicarboxylic acid polyester and a terephthalic acid polyester.

33 Claims, 22 Drawing Sheets

U.S. PATENT DOCUMENTS

| | | | |
|---|---|---|---|
| 5,126,880 | 6/1992 | Wheatley et al. | 359/587 |
| 5,149,578 | 9/1992 | Wheatley et al. | 428/213 |
| 5,217,794 | 6/1993 | Schrenk | 428/220 |
| 5,262,894 | 11/1993 | Wheatley et al. | 359/586 |
| 5,269,995 | 12/1993 | Ramanathan et al. | 264/171 |
| 5,278,694 | 1/1994 | Wheatley et al. | 359/359 |
| 5,307,395 | 4/1994 | Seely et al. | 378/84 |
| 5,316,703 | 5/1994 | Schrenk | 264/1.3 |
| 5,320,888 | 6/1994 | Stevens | 428/36.2 |
| 5,389,324 | 2/1995 | Lewis et al. | 264/171 |
| 5,389,422 | 2/1995 | Okazaki et al. | 428/141 |
| 5,425,964 | 6/1995 | Southwell et al. | 427/10 |

FOREIGN PATENT DOCUMENTS

| | | |
|---|---|---|
| 06210722 | 8/1994 | Japan . |
| 06320693 | 11/1994 | Japan . |
| 08085150 | 4/1996 | Japan . |
| 9011429 | 1/1997 | Japan . |
| WO 93/02122 | 2/1993 | WIPO . |
| WO 94/13478 | 6/1994 | WIPO . |
| WO 95/17303 | 6/1995 | WIPO . |

Fig.5 — Fit to the Double - Linear Model

Fig.6 — Fit to the Double-Linear Model

MULTILAYER POLYESTER FILM WITH A LOW COEFFICIENT OF FRICTION

FIELD OF THE INVENTION

The present invention relates to multilayer films, and in particular to multilayer films comprising a plurality of layers of naphthalene dicarboxylic acid polyester and terephthalic acid polyester.

BACKGROUND OF THE INVENTION

Polyester films of various compositions are known to the art. These films, which may be continuously extruded into sheets of various thicknesses, have good tensile strength and modulus, and have found use, among other things, as magnetic media substrates.

To date, much attention in the art has been focused on the optical properties of multilayer films. Alfrey et al., *Polymer Engineering and Science*, Vol. 9, No. 6, pp. 400–404 (November 1969), Radford et al., *Polymer Engineering and Science*, Vol. 13, No. 3, pp. 216–221 (May 1973), and U.S. Pat. No. 3,610,729 (Rogers), for example, describe the reflectivity of certain multilayer polymeric films. This work has been extended to multilayer polyester films. Thus, U.S. Pat. No. 3,801,429 (Schrenk et al.) and U.S. Pat. No. 3,565,985 (Schrenk et al.) disclose multilayer composites made from various resins, including polyesters, and methods for making the same. The composites have the property of being iridescent, even without the addition of pigments.

U.S. Pat. No. 4,310,584 (Cooper et al.) describe the use of polyesters in making multilayer iridescent light-reflecting film. The film includes alternating layers of a high refractive index polymer and a polymer with a low refractive index. The high refractive index polymer is a cast nonoriented film that includes a thermoplastic polyester or copolyester such as polyethylene terephthalate (PET), polybutylene terephthalate and various thermoplastic copolyesters which are synthesized using more than one glycol and/or more than one dibasic acid.

U.S. Pat. No. 5,122,905 (Wheatley) describes a multilayer reflective film with first and second diverse polymeric materials in alternating layers that exhibits at least 30% reflection of incident light. The individual layers have an optical thickness of at least 0.45 micrometers, and adjacent layers have a refractive index difference of at least 0.03. U.S. Pat. No. 5,122,906 (Wheatley) describes similar reflecting bodies, wherein a substantial majority of individual layers have an optical thickness of not more than 0.09 micrometers or not less than 0.45 micrometers, and adjacent layers have a refractive index of at least 0.03.

Some attempts have also been made to improve the mechanical properties of particular multilayer films. Thus, U.S. Pat. No. 5,077,121 (Harrison et al.) describes polyethylene-based multilayer films consisting of layers of two or more different resins, wherein the draw ratios of the composite film are found to exceed the draw ratios of monolithic films of the component materials. In the films described, a layer of high elongation, low modulus material is sandwiched between layers of low elongation, low modulus material. The reference also notes that a similar phenomenon is sometimes observed in composites wherein a high modulus, low elongation material is sandwiched between layers of high elongation material, although in many of these composites, the low elongation material fails at its characteristic low elongation, causing a simultaneous, premature failure of the high elongation layers.

To date, however, relatively few improvements have been made in the mechanical properties of multilayer polyester films, despite the fact that such films have become increasingly important in a wide variety of commercial applications. While polyester films are already available which have a high modulus and medium elongation, in a variety of uses, as when polyester films are used as engineering materials or are subject to winding operations, the physical limitations of these films are already being tested. There thus remains a need in the art for a multilayer polyester film having improved mechanical properties, and for a method of making the same. In particular, there is a need in the art for multilayer polyester films having improved tensile modulus, tensile strength, and stretchability.

A further problem encountered with polyester films, and frequently commented on in the literature, relates to the incidence of hazing. Hazing in polyester films is undesirable in applications where a clear film would be preferred, as in window films. In other applications, a particular degree of hazing is acceptable or even desirable. To date, however, the phenomenon of hazing has been poorly understood, and no methods have been provided which allow for easy control of the degree of hazing in polyester films. There is thus a need in the art for a method of controlling the degree of hazing in polyester films, and particularly in multilayer polyester films. In particular, there is a need in the art for a method of producing multilayer polyester films with any desired degree of hazing, through manipulation of readily controllable process parameters.

Yet another problem encountered in polyester films relates to their coefficient of friction. Thin polyester films having a high coefficient of friction are prone to wrinkling, web breaks, and similar damage during winding and handling. In these applications, it would be desirable to use a polyester film having a lower coefficient of friction, so that adjacent surfaces of the film would slide over each other easily.

To date, this has been accomplished through the use of slip agents. However, the use of slip agents is undesirable in that it complicates the manufacturing process, and frequently compromises the mechanical or optical properties of the resulting film. There is thus a need in the art for polyester films which are substantially devoid of slip agents, but which have a comparatively low coefficient of friction. There is also a need in the art for a method of controlling the coefficient of friction in a polyester film without the addition of slip agents.

These and other needs are met by the present invention, as hereinafter disclosed.

SUMMARY OF THE INVENTION

In one aspect, the present invention relates to a new class of polyester multilayer films, and to a method for making the same. Surprisingly, it has been found that, by extruding a film having alternating layers of polyethylene naphthalate (PEN) and polyethylene terephthalate (PET), a multilayer composite is obtained which can be stretched to a higher draw ratio than monolithic films of comparable dimensions of either PEN or PET. Upon orientation, the multilayer film has a tensile modulus and tensile strength superior to that of monolithic films of PEN or PET. The composite structure permits the PET layers within the film to remain stretchable even after they have crystallized. Remarkably, the optimum stretching temperature for these films is found to be significantly higher than the glass transition temperature of either component resin. By contrast, the optimum stretching temperature for monolithic films of each component resin are known in the art to be only slightly above Tg.

In another aspect, the present invention relates to a method by which multilayer polyester films having a desired degree of hazing may be produced in a continuous or noncontinuous manner, at various combinations of intrinsic viscosities and at various ratios of PEN to PET, and with either PET or PEN as the surface resin. Surprisingly, it has been found that the degree of haze in the finished stretched film can be controlled through proper manipulation of preheating temperature and duration. Thus, the method allows films to be produced with any desired degree of clarity. Various other features of the films, including shrinkage, friction, color, and modulus, may also be controlled through manipulation of these and other parameters.

In yet another aspect, the present invention relates to polyester films having a desired degree of surface roughness, and to a method for making the same. Surprisingly, it has been found that the degree of crystallization of PET in a multilayer film comprising layers of PET and PEN can be used to manipulate the degree of surface roughness so as to provide a polyester film that has a slippery surface without the addition of slip agents.

DETAILED DESCRIPTION OF THE PREFERRED EMBODIMENTS

In a conventional "tenter" film process, one or more polymers are extruded onto a temperature-controlled roll (or "casting wheel") in the form of a continuous film or sheet. This film or sheet, prior to any orientational stretching in either the machine direction or transverse (cross) direction, is often referred to by the term "cast web". As used herein, the terms "film" and "web" are used interchangeably to refer to the polymer sheet at any point in the process subsequent to casting on the casting wheel, but the term "cast web" is reserved for film which has not yet experienced significant orientational stretching in either the machine or transverse direction.

Figure 1A:
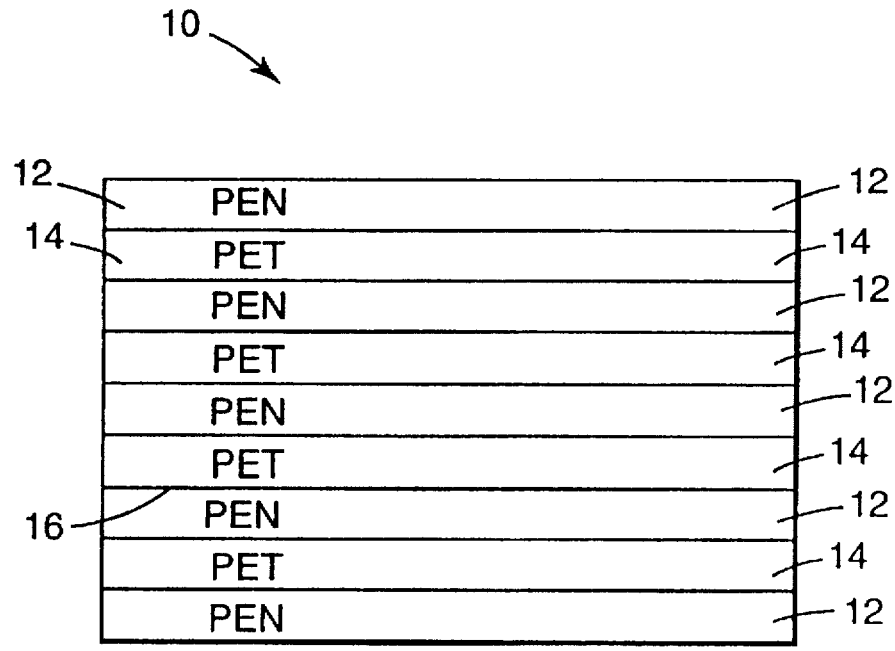
FIG. 1a is a schematic drawing of a first embodiment of the multilayer film of the present invention.
Figure 1B:
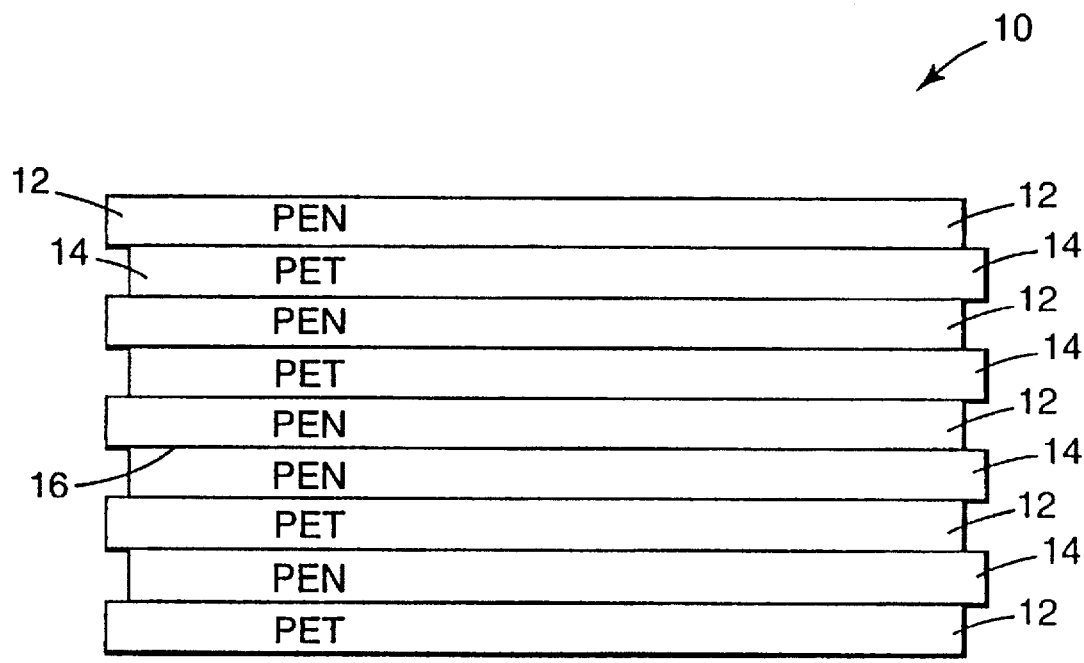
FIG. 1b is a schematic drawing of a second embodiment of the multilayer film of the present invention.

As indicated in FIGS. 1a–b, the multilayer films 10 of the present invention are formed from at least two different polymer resins. These resins are coextruded into a composite film having alternating layers of a first resin 12 and a second resin 14. Preferably, either the first and second resins are immiscible, or the coextrudate is rapidly cooled to a temperature below the glass transition temperatures of the resins soon after the first and second resins come into contact with one another inside the coextrusion equipment. The satisfaction of one of these two criteria ensures that adjacent layers in the composite film are joined across an interface 16, which may be either sharp or diffuse.

The films of the present invention may contain virtually any number of layers greater than or equal to three. However, there are preferably at least 7 layers in the finished film, and more preferably at least 13 layers. The presence of at least 7 or 13 layers in the film is found to coincide with the onset of certain desirable properties, such as improvements in orientational stretchability, modulus, and surface roughness. Typically, the films of the invention will contain only a few dozen layers, although finished films containing hundreds, or even thousands, of layers are found to be advantageous in some applications.

The layers of different resins are preferably arranged in an alternating sequence in at least a portion of the film, and preferably throughout the film as a whole. However, in some embodiments, as in the embodiment depicted in FIG. 1b, the film may be extruded with one or more adjacent layers of the same resin. In most conventional extrusion processes, adjacent layers of the same resin will coalesce into a single layer of greater thickness. This tendency may be used to produce doubly thick layers where the provision of such layers is desirable, as on the surfaces of some films.

The relationships among the thicknesses of the various layers is not limited. Layers of the first resin may be different in thickness than layers of the second resin. Different layers of the same resin may also be of different thicknesses.

The present invention also allows for virtually any number of layers of any number of different resins to be incorporated into the multilayer film. Thus, while the multilayer films of the present invention will most commonly contain only two types of layers made from two different resins, the invention also contemplates embodiments wherein three or more different resin types are present in the finished film.

Many different polymer resins can be used to make multilayer films in accordance with the present invention. However, as noted above, it is preferred that resins and/or processing conditions be chosen so as to maintain the separate chemical identity of the layers across an interface between each pair of adjacent layers.

The present invention contemplates that any polymer resins melt-processable into film form may be used. These may include, but are not limited to, homopolymers and copolymers from the following families: polyesters, such as polyethylene terephthalate (PET), polybutylene terephthalate, poly (1,4-cyclohexylenedimethylene terephthalate), polyethylene bibenzoate, and polyethylene naphthalate (PEN); liquid crystalline polyesters; polyarylates; polyamides, such as polyamide 6, polyamide 11, polyamide 12, polyamide 46, polyamide 66, polyamide 69, polyamide 610, and polyamide 612; aromatic polyamides and polyphthalamides; thermoplastic polyimides; polyetherimides; polycarbonates, such as the polycarbonate of bisphenol A; polyolefins, such as polyethylene, polypropylene, and poly-4-methyl-1-pentene; ionomers such as SURLYN™ (available from E. I. du Pont de Nemours & Co., Wilmington, Del.); polyvinyl alcohol and ethylene-vinyl alcohol copolymers; acrylic and methacrylic polymers such as polymethyl methacrylate; fluoropolymers, such as polyvinylidene fluoride, polyvinyl fluoride, polychlorotrifluoroethylene, and poly (ethylene-alt-chlorotrifluoroethylene); chlorinated polymers, such as polyvinyl chloride and polyvinylidene chloride; polyketones, such as poly(aryl ether ether ketone) (PEEK) and the alternating copolymers of ethylene or propylene with carbon monoxide; polystyrenes of any tacticity, and ring- or chain-substituted polystyrenes; polyethers, such as polyphenylene oxide, poly(dimethylphenylene oxide), polyethylene oxide and polyoxymethylene; cellulosics, such as the cellulose acetates; and sulfur-containing polymers such as polyphenylene sulfide, polysulfones, and polyethersulfones.

Films in which at least one of the first resin and the second resin is a semicrystalline thermoplastic, are preferred. More preferred are films in which at least one resin is a semicrystalline polyester. Still more preferred are films in which at least one resin is polyethylene terephthalate or polyethylene naphthalate. Films comprising polyethylene terephthalate and polyethylene naphthalate as the first and second resins are especially preferred, and the films thereof are found to have many desirable properties, including good orientational stretchability, high modulus, and controllable degrees of surface roughness, even in the absence of added slip agents. However, the exact choice of resins ultimately depends on the use to which the multilayer films are to be applied. Thus, for example, if the multilayer film is to be used for optical applications, other factors, such as the indices of refraction of the resins, must be taken into account. Other pairs of polymer resins which provide the orientational stretchability, high modulus, and/or surface roughness advantages described herein are contemplated by the present invention.

Among the polyesters and copolyesters considered suitable for use in the present invention are those formed as the reaction product of diols with dicarboxylic acids and/or their esters. Useful diols include ethylene glycol, propane diol, butane diol, neopentyl glycol, polyethylene glycol, tetramethylene glycol, diethylene glycol, cyclohexanedimethanol, 4-hydroxy diphenol, bisphenol A, 1,8-dihydroxy biphenyl, 1,3bis(2-hydroxyethoxy)benzene, and other aliphatic, aromatic, cycloalkyl and cycloalkenyl diols. Useful dicarboxylic acids include terephthalic acid, isophthalic acid, any of the isomeric naphthalene dicarboxylic acids, dibenzoic acid, 4,4'-dibenzoic acid, azelaic acid, adipic acid, sebacic acid, or other aliphatic, aromatic, cycloalkane or cycloalkene dicarboxylic acids. Esters of the dicarboxylic acids may be used in place of or in combination with the dicarboxylic acids themselves. When polyethylene terephthalate and polyethylene naphthalate are to be used as the first and second resins, either or both may contain minor amounts of comonomers and/or additives.

The intrinsic viscosity of the polymer resins to be used in the present invention is not specifically limited. Depending on the equipment used for the extrusion and casting of the multilayer film, the melt viscosities of the polymer resins may need to be matched to greater or lesser degrees of precision. Monolayer films of PET are typically made from resins having intrinsic viscosities of about 0.60. These and even lower IVs may also be accommodated in the present invention. PET resins with IVs as high as 1.10 or higher may be routinely obtained from commercial sources, and may also be used. The PEN resin should be chosen so as to match the selected PET resin in melt viscosity closely enough, so that smooth, defect-free films may be cast with the equipment to be used.

Another aspect of the present invention concerns films having tailorable surface roughness, haze, and coefficient of friction, without the use of conventional "slip agents". Tailorable surface roughness is desirable so as to provide films appropriate to diverse applications. For instance, films employed as substrates for magnetic recording media must be relatively smooth on the side or sides to which the magnetic coating is applied. Typical requirements are for root mean square average surface roughness (Rq) of less than 60 nm, with many applications requiring Rq less than 20 nm, and some requiring Rq less than 10 nm. On the other hand, capacitor films and printable or writeable films must have a high surface roughness to allow oil impregnation and to accept ink, respectively. Typical requirements in these applications are for Rq values greater than 100 nm, with some applications requiring Rq values of 200 nm or more.

Haze is well-known in the film industry to correlate with roughness, especially in the absence of complicating factors such as particulate additives. Furthermore, haze is considerably easier to measure and/or qualitatively assess than is surface roughness. Thus, while of interest in its own right for certain applications, haze was typically assessed, in the experiments described herein, as a means of making qualitative comparisons of the surface roughnesses of films.

A low coefficient of friction is desirable so as to improve handling and winding properties of the film during manufacture and use, and to prevent blocking during storage. Thinner films are known to require lower coefficients of friction in order to be wound and handled without damage such as wrinkling and web breaks. Coefficient of friction also correlates well with surface roughness, provided that composition and construction within a series of films remains unchanged. Thus, for polyethylene terephthalate films containing a given slip agent, increasing the amount of the slip agent increases the surface roughness, and lowers the coefficient of friction in a well correlated manner. The form of the correlation may differ for a different slip agent, however.

Slip agents are so named because the purpose of their use in films is to provide a low coefficient of friction (i.e., slipperiness) required for handling. Slip agents are defined as inert solid fine particles within, or on, the surface(s) of the film. They may be incorporated into the film during its formation, or coated onto the film's surface afterward. When coated on, they may be incorporated in a binder polymer, which may or may not be the same polymer as the film itself, or they may be deposited from a dispersing medium or solvent. When incorporated into the film during its formation, they may be present throughout the film, or only in layers coextruded or laminated on one or both surfaces. Slip agents may be incorporated by blending them into the film polymer resin during extrusion, or they may be incorporated into the resin during its manufacture.

Slip agents may be spherical or non-uniform in shape. They may or may not form agglomerates. Individual slip agent particles usually are smaller than 5 microns in diameter, and are most commonly an order of magnitude or more smaller than that. They are incorporated into films at up to about 3% by weight, but more typically are present at well under 1%.

Slip agents can be polymeric or non-polymeric. Typical examples of non-polymeric slip agents are kaolin, talc, silicas, aluminas, metal carbonates such as calcium carbonate, metal oxides such as titanium dioxide, silicate salts, metal phosphates, metal sulfates, metal titanates, metal chromates, metal benzoates, metal terephthalates, forms of carbon such as carbon black, and glasses. Polymeric slip agents may be crosslinked or non-crosslinked. Typical examples of crosslinked polymeric slip agents are silicones, styrenics, acrylics, and polyesters. Non-crosslinked polymeric slip agents are typically thermoplastics, and they are processed so as to be finely dispersed as particles within the film resin. Typical examples of non-crosslinked polymeric slip agents are polyolefins, ionomers, styrenics, polycarbonates, acrylics, fluoropolymers, polyamides, polyesters, polyphenylene sulfide, and liquid crystalline polymers.

All conventional slip agents have in common a fine particulate nature in, or on the surface(s) of, the finished film. Furthermore, all conventional slip agents of the type that are incorporated into the film during its formation (rather than coated on afterward) have in common a fine particulate nature in, or on, the surface(s) of the extruded cast web as well. For this reason, there are significant disadvantages to the use of slip agents. The use of slip agents necessitates the use of filtration devices in the manufacture of the film. These devices are frequently clogged by the slip agent. Also, slip agents may form undesirably large agglomerates in the film, which have a negative effect in many applications. Incorporation of inorganic particulates usually requires that they be milled to the appropriate size and/or "classified". These are added steps that are difficult to control and add cost. Incorporation of crosslinked polymer particles requires either similar preparation, or precise control of particle shape and size during their formation. Incorporation of non-crosslinked polymer particles requires difficultly-obtained control over their size distribution and/ or dispersion during film extrusion. Furthermore, the use of slip agents presents the possibility for the formation of dust and debris, and scratching of the film surface, during biaxial orientation, handling, winding, slitting, converting, processing and/or use of the film.

For all these reasons, it is desired to control surface roughness and coefficient of friction in polymer films without resort to the addition of conventional inert solid fine particulate slip agents. Surprisingly, it has been discovered that the multilayer films of the present invention possess varying degrees of surface roughness and "slip" (coefficient of friction), even in the absence of slip agents, and that the degree of surface roughness and value of coefficient of friction is adjustable by varying process conditions, such as the temperature and duration of preheating prior to orientation.

In the Examples set forth below, the following procedures were used to determine the physical properties of the films tested.

Intrinsic Viscosity

Intrinsic viscosity was determined identically for both PEN and PET. The solvent used is a 60/40 mixture (by weight) of phenol and ortho-dichlorobenzene. A temperature of 110° C. is used to effect the dissolution of the polymer in 30 minutes. A size 150 Cannon-Fenske viscometer is used, and data is taken at 30° C. A single-point determination of relative viscosity is done, using a solution concentration of about 0.5% polymer by weight. Relative viscosity is the ratio of efflux times in the viscometer for the solution and the pure solvent. The relative viscosity is converted to an approximate value of intrinsic viscosity using the well-known Billmeyer relationship:

$$IV=\{\eta(rel)-1+3\ln[\eta(rel)]\}/4c$$

where $\eta(rel)$ is the relative viscosity and c is the polymer solution concentration in g/dL.

Modulus Measurement

Modulus was measured on a computerized Instron tensile tester. Specimens were cut to 0.5 inch width. The gauge length between Instron grips was 4 inches. The test was performed at a rate of 2 inch/min crosshead speed. The specimens were cut to approximately 7 inch lengths to permit easy mounting in the 1 inch wide Instron grips and great care was taken to avoid either excessive slack or pre-tension for these thin film specimens. The thickness for each specimen was determined by taking ten measurements within the gauge length. The average of all ten was used in calculations. For films prepared on a continuous film line, specimens were cut from the center of the web. For films prepared on a laboratory film stretcher, tensile specimens were cut from the center of the square specimen from the stretcher. In this case, specimens for determining the tensile properties in the machine direction were taken from one square stretcher specimen, and specimens for determining the tensile properties in the transverse direction were taken from a separate square stretcher specimen, so that all could be cut from the center. In some evaluations, five specimens were cut and tested, and the values obtained were averaged. Variation was small, however, so for most evaluations only three specimens were tested and averaged.

In some examples, a value is given for the "Green modulus". It was discovered that the modulus of the films made in these studies increased over time. While this is not uncommon for biaxially oriented polyester films, in some cases the increase was more dramatic than that which is normally observed for PET films. Thus, modulus measurements were made either as soon as possible (and no more than four hours after the film was made), or after at least one week had elapsed. It is believed that most if not all of the modulus enhancement or "aging" occurs in the interim. Measurements taken on "aged" film are referred to simply as "modulus", while measurements taken quickly are referred to as "green" modulus. Most reported values for green modulus represent the average of two tests.

Reversible Coefficient of Thermal Expansion

The Reversible Coefficient of Thermal Expansion, or CTE, was measured using a Zygo model 121 testing apparatus. A 0.5 inch wide, 12 inch long test specimen is mounted flat. The temperature differential used for testing was approximately 20°–25° C., going from Room Temperature to about 45° C. The CTE is measured as mm of expansion per mm of initial length per °C. of temperature change. Since the expansion is typically on the order of $1-20 \times 10^{-6}$ in these units, it is reported as parts per million per °C. (ppm/°C.). For most films tested, three specimens were prepared and the results were averaged.

Reversible Coefficient of Hygroscopic Expansion

The Reversible Coefficient of Hygroscopic Expansion, or CHE, was measured on a Neenah Paper Expansimeter. A 0.5 inch (1.27 cm) by 9.5 inch (24.13 cm) sample is arranged in the apparatus between a hook and a level/hook arrangement. A micrometer is used to adjust the level after a change to the test specimen length occurs due to controlled change in the humidity of the air in the test apparatus. The humidity test range was 23–94% relative humidity (% R.H.). CHE is measured as mm of expansion per mm of initial length per % R.H. Similarly to the CTE, the values for CHE are conveniently expressed as ppm/% R.H. Again, most results represent the average of three tests.

Irreversible Thermal Shrinkage

Thermal shrinkage was measured as follows: Test specimens were cut to 0.5 inch (1.27 cm) width and 12 inches (30.48 cm) in length. Ink "X"-marks were placed about 10 inches (25.4 cm) apart on each specimen. The exact distance between the two marks was determined by using an "optical comparitor" or "electronic ruler", a device which precisely determines the distance traveled by a microscopic eyepiece moved from one mark to the other. The specimens were then allowed to hang unrestrained in a temperature-controlled oven for 3 days (72 hrs) at 80° C. The specimens were removed from the oven and remeasured. Great care is taken during both measurements to ensure that the specimens are mounted on the optical comparitor flat and straight, and with as little tension as possible. Shrinkage results are expressed as a percent of the original specimen length, and are regarded as accurate to ±0.01%. Here too, results are expressed as the average of three tests. In some evaluations, the oven conditions were changed to 3 days residence time at 65° C. Some measurements were also done for 15 minutes residence time at 150° C.

Haze

Haze was measured with a Gardner Hazemeter. Model AUX-10 or AUX-10A was used, with a sample size of approximately 1 inch (2.54 cm) square. Care was taken to ensure that the film specimens were free from dust, scratches, etc. Light passing through the sample either directly, or "diffused", is captured and quantified by the instrument. Haze is the amount of diffused transmitted light as a percentage of all transmitted light (direct and diffuse).

Coefficient of Friction

Static and Kinetic Coefficients of Friction were measured with an Instron tensile tester. In this document, all coefficients of friction are measured on films made to slide with one of their surfaces in contact with the opposite surface. A 2 inch (5.08 cm) wide and 10 inch (25.4 cm) long specimen is cut from the film and mounted on a horizontal platform. A 1 inch (2.54 cm) wide by 5 inch (12.7 cm) long specimen is cut from the film and mounted on a special 200 gram "sled" with a 0.97 inch (2.46 cm) radius. The specimens are cut so that the film's machine direction is in the long dimension of each specimen. The sled is placed on the platform, and pulled with a chain via a pulley by the Instron crosshead at ½-inch per minute ($2.1 \times 10^{-2}$ cm/s). At least 4 inches (10.16 cm) of crosshead travel is used.

The coefficient of friction is defined as the ratio of the Frictional Force to the sled weight. The Frictional Force is read directly from the Instron recorder chart. The Static Coefficient of Friction is determined by using the peak force recorded at the beginning of the test. The Kinetic Coefficient of Friction is determined by using the average force recorded at long times in the test.

Surface Roughness by Interferometer

Surface roughness is measured on a specially-constructed instrument utilizing the principles of laser light interferometry. Specimens are cut from the film ½-inch (1.27 cm) wide by 6 inches (15.24 cm) long, and are vapor coated with metal. As configured, the system probes an area about 230 microns wide by 365 microns long. A 3-dimensional image of the probed area is generated. Statistical parameters of the surface are also calculated by the instrument's dedicated computer. Normally, two averages, "Ra" and "Rq", both well known to those experienced in surface profilometry, are reported. Ra is the arithmetic mean height of deviations from the hypothetical average plane of the film surface. Rq is the geometric mean height of deviations from the same plane.

Surface Roughness by Rodenstock

In some cases, films of the current invention proved so rough as to be outside the useful range of the Interferometer, above. Thus, a second method was employed, using the Rodenstock RM600 surface analyzer, a commercially available instrument. The Rodenstock is a non-contact surface "stylus" which probes the specimen along a 5 mm long line, rather than canvassing a rectangular area, and works on the principle of dynamically refocusing a laser beam on the traveling film surface. Specimens for Rodenstock must also be vapor coated. The Rodenstock technique also calculates Ra and Rq, but due to the way the data is collected, filtered, and analyzed, it returns consistently higher values than the Interferometer, for the same specimen. Thus, values of Ra and Rq from the two instruments cannot be usefully compared.

EXAMPLES 1–24

The following examples demonstrate the ability to coextrude PEN and PET into multilayer webs at various combinations of intrinsic viscosities with either polymer at the two film surfaces, throughout the full range of relative composition.

Several webs of PEN and PET were cast by coextrusion. The webs consisted of alternating layers (usually 29 total) of PEN and PET, which were obtained from the Goodyear Chemical Co., Akron, Ohio. In each web, the two surface layers (the 1 st and 29th) consisted of the same polymer. As shown in Table 1, in some coextrusions, both of the surface layers consisted of PEN, while in others, both surface layers consisted of PET.

Several different molecular weights for each resin were used in the experiments, as reflected in the values for Intrinsic Viscosity reported in Table 1. The polymers were extruded on separate 1¾" (4.4 cm) single screw extruders. PEN was extruded at about 293° C., and PET was extruded at about 282° C. The throughput of each extruder was adjusted within the range of 5.22 kg/hr ($1.45 \times 10^{-3}$) to about 43.5 kg/hr ($1.2 \times 10^{-2}$) so as to arrive at the polymer proportions shown in Table 1. A film die which accepts modular coextrusion inserts was used with an insert machined for 29-layer coextrusion. The die had an orifice width of 12 inches (30.48 cm), and was maintained at about 282° C.

Extrudates were cast onto a chilled roll maintained at about 22° C. for the purpose of quenching the cast webs to a solid amorphous state. The quenched cast webs were about 12–13 mils thick.

TABLE 1

| Example No. | PEN IV (dL/g) | PET IV (dL/g) | "Surface" Polymer | % PEN |
|---|---|---|---|---|
| 1 | 0.57 | — | All-PEN Control | 100 |
| 2 | 0.57 | 0.80 | PET | 80 |
| 3 | 0.57 | 0.80 | PET | 71 |
| 4 | 0.57 | 0.80 | PET | 59 |
| 5 | 0.57 | 0.80 | PET | 49 |
| 6 | 0.57 | 0.80 | PET | 41 |
| 7 | 0.57 | 0.80 | PET | 31 |
| 8 | 0.57 | 0.80 | PET | 20 |
| 9 | — | 0.80 | All-PET Control | 0 |
| 10 | 0.50 | — | All-PEN Control | 100 |
| 11 | 0.50 | 0.72 | PET | 70 |
| 12 | 0.50 | 0.72 | PET | 59 |
| 13 | 0.50 | 0.72 | PET | 49 |
| 14 | 0.50 | 0.72 | PET | 39 |
| 15 | 0.50 | 0.72 | PET | 30 |
| 16 | 0.50 | 0.72 | PET | 16 |
| 17 | — | 0.72 | All-PET Control | 0 |
| 18 | 0.50 | 0.95 | PEN | 71 |
| 19 | 0.50 | 0.95 | PEN | 60 |
| 20 | 0.50 | 0.95 | PEN | 49 |
| 21 | 0.50 | 0.95 | PEN | 41 |
| 22 | 0.50 | 0.95 | PEN | 29 |
| 23 | 0.50 | 0.95 | PEN | 20 |
| 24 | — | 0.95 | All-PET Control | 0 |

EXAMPLES 25–35

The following examples demonstrate the enhancement in modulus and stretch ratios of the multilayer films of the present invention in comparison with monolayer The cast webs made in Examples 1–2 above were stretched into films using a laboratory biaxial film stretching device. The stretching device was a custom-built instrument using a pantograph mechanism similar to that found in commercial instruments of its kind, such as the film stretchers available from T. M. Long Co. A square specimen of the cast web was marked with a gridline pattern and then mounted inside the film stretcher, with the temperature inside the stretcher at or just below 100° C. The temperature was quickly raised to 150° C. and the sample was held for 45 seconds, measured from the beginning of the temperature rise. The sample was then stretched simultaneously and equally in the machine and transverse directions at a rate of 100%/s, based on the original gauge length of the sample. The gauge length is defined as the distance between opposing pairs of grippers, as measured between their closest points. The stretching chamber was then opened and the sample was quenched by blowing cool air across its surface and was then removed.

Stretch ratios for stretched samples were determined as the nominal stretch real stretch ratio. "Nominal stretch ratio" refers to the final sample length divided by the gauge length, as determined by grip separation. "Real stretch ratio" refers to the analogous figure, as measured by displacement of the central marks of the gridline pattern which had been printed on the sample. As used throughout this specification, the phrase "biaxial stretch ratio" refers to the nominal stretch ratio (in each direction) for a simultaneous stretch of equal magnitude in each direction. Real stretch ratios and modulus values reported without reference to machine or transverse directions are averaged values for the two directions.

Specimens were prepared from the cast webs made in Examples 1 (100% PEN) and 2 (20% PET, 80% PEN). These specimens were stretched to various biaxial stretch ratios, until a stretch ratio was found at which it was difficult to stretch without specimen failure. The resulting stretched films were tensile tested to determine their Young's Moduli. The results of these stretching experiments are shown in Table 2.

TABLE 2

| Example No. | Cast Web from Example No. | % PEN | Nominal Stretch Ratio | Real Stretch Ratio | Modulus, kpsi (10⁶ kPa) |
|---|---|---|---|---|---|
| 25 | 1 | 100 | 3.50 | 3.74 | 858 (5.9) |
| 26 | 1 | 100 | 4.00 | 4.00 | 910 (6.27) |
| 27 | 1 | 100 | 4.50 | 4.41 | 982 (6.77) |
| 28 | 1 | 100 | 5.00 | 4.78 | 1043 (7.19) |
| 29 | 1 | 100 | 5.25 | 5.10 | 1078 (7.43) |
| 30 | 2 | 80 | 3.50 | 3.50 | 731 (5.04) |
| 31 | 2 | 80 | 4.00 | 3.89 | 835 (5.76) |
| 32 | 2 | 80 | 4.50 | 4.36 | 916 (6.32) |
| 33 | 2 | 80 | 5.00 | 4.70 | 995 (6.86) |
| 34 | 2 | 80 | 5.50 | 5.19 | 1066 (7.35) |
| 35 | 2 | 80 | 5.75 | 5.51 | 1181 (8.14) |

Figure 2:
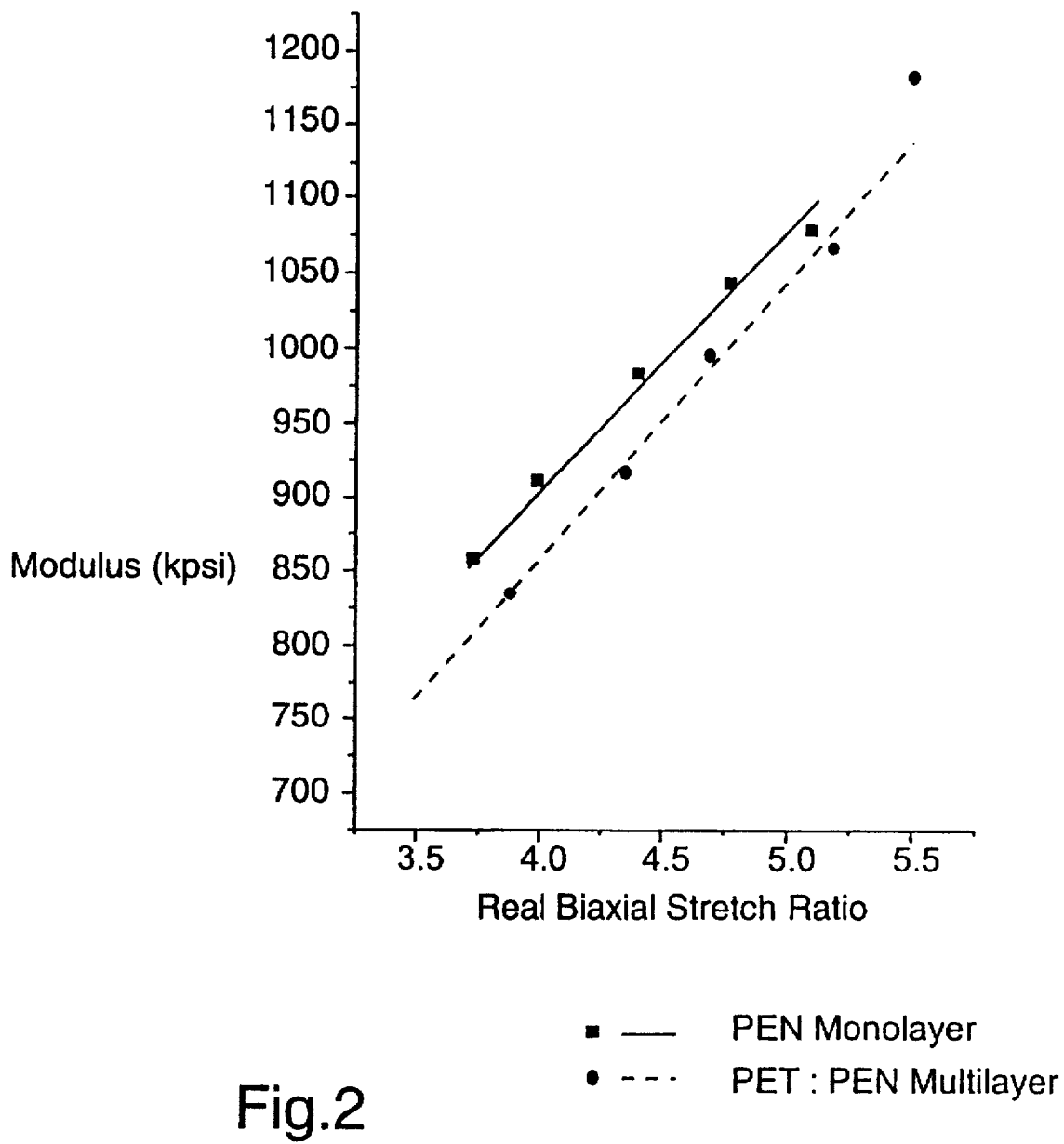
FIG. 2 is a graph comparing the modulus as a function of biaxial draw ratio of a pure PEN film to that of a 29 layer film consisting of 80% by weight PET and 20% by weight PEN.

These results are depicted graphically in FIG. 2. FIG. 2 demonstrates that each composition develops a monotonically increasing Young's Modulus as the simultaneous biaxial stretch ratio is increased. At any given stretch ratio not resulting in sample failure, PEN shows a higher modulus than the 20:80 PET:PEN multilayer film, a result that might be expected in light of the fact that PEN is known to be a higher modulus polymer than PET. However, the multilayer cast web is unexpectedly capable of being stretched to a considerably higher stretch ratio without sample failure as compared to monolithic PEN. Consequently, the modulus of the multilayer film is seen to ultimately surpass that of the PEN film, which is stretchable only to a lower stretch ratio.

EXAMPLES 36–44

The following examples demonstrate the effect of the PEN:PET Ratio on stretchability and modulus.

Experiments were performed to determine the highest stretch ratio to which the cast webs of Examples 1–9 could be stretched at the conditions of Examples 25–35. The breaking of a film during stretching is a statistical event, so that different specimens cut from a given cast web will stretch to varying extents before breaking. For the purpose of these examples, the stretch ratio was examined at increments of 0.25 nominal stretch ratio units until a ratio was found at which the sample broke during stretching. This condition was repeated until three consecutive sample failures were recorded, or until two samples stretched without breaking. The highest value of stretch ratio to which a stretching experiment could be completed and replicated without specimen rupture is called the Ultimate Biaxial Stretch Ratio (UBSR). Corresponding Real Stretch Ratios were determined as in Examples 25–35, by the displacement of ink marks.

At the UBSR for each composition, specimens were tensile tested to determine their Young's Moduli. Some of these films were also mounted under restraint on metal frames, and heat-set in an oven. The oven was allowed to equilibrate at 235° C., the door was quickly opened, the framed specimen inserted, and the door immediately closed. The specimen was left in the oven for 30 seconds and then removed. These heat-set specimens were also tensile tested for Young's Modulus. The UBSR, Modulus, and Heat-set Modulus results are shown in tabular form in Table 3 and graphically in FIGS. 3 and 4.

TABLE 3

| Example No. | Cast Web from Example No. | % PEN | UBSR (nom) | UBSR (real) | Modulus, kpsi ($10^6$ Pa) | Heat-Set Modulus, kpsi ($10^6$ kPa) |
|---|---|---|---|---|---|---|
| 36 | 1 | 100 | 5.25 | 5.10 | 1078 (7.43) | 1178 (8.12) |
| 37 | 2 | 80 | 5.75 | 5.51 | 1181 (8.14) | 1304 (8.99) |
| 38 | 3 | 71 | 5.75 | 5.46 | 1071 (7.38) | 1197 (8.25) |
| 39 | 4 | 59 | 5.25 | 5.00 | 1005 (6.93) | 1124 (7.75) |
| 40 | 5 | 49 | 5.00 | 4.61 | 948 (6.54) | 1047 (7.22) |
| 41 | 6 | 41 | 4.25 | 3.88 | 811 (5.59) | — |
| 42 | 7 | 31 | 3.50 | 3.06 | 648 (4.47) | — |
| 43 | 8 | 20 | 3.25 | 2.86 | 556 (3.83) | — |
| 44 | 9 | 0 | 3.00 | 2.07 | 443 (3.05) | — |

Figure 3:
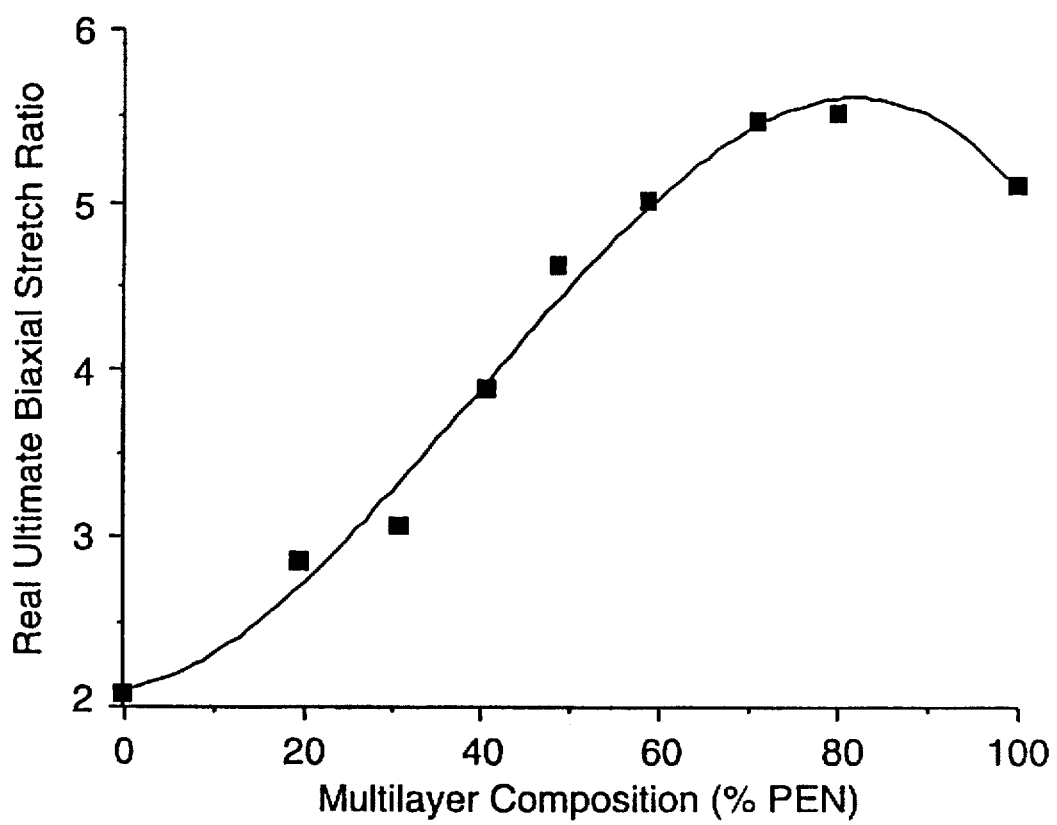
FIG. 3 is a graph of the ultimate biaxial draw ratio of the films of the present invention as a function of multilayer composition.

As shown in Table 3 and FIG. 3, the UBSR varies smoothly with composition cast webs of Examples 1–9, with a maximum value near a composition of 70 to 80% PEN. For multilayer specimens consisting of at least about 60% PEN, these values are about as high, or higher, than those observed with samples consisting of 100% PEN. Since PET itself is known generally to be less stretchable than PEN, it is unexpected result that the multilayer films of the two polymers should stretch to ratios than either polymer alone.

Figure 4:
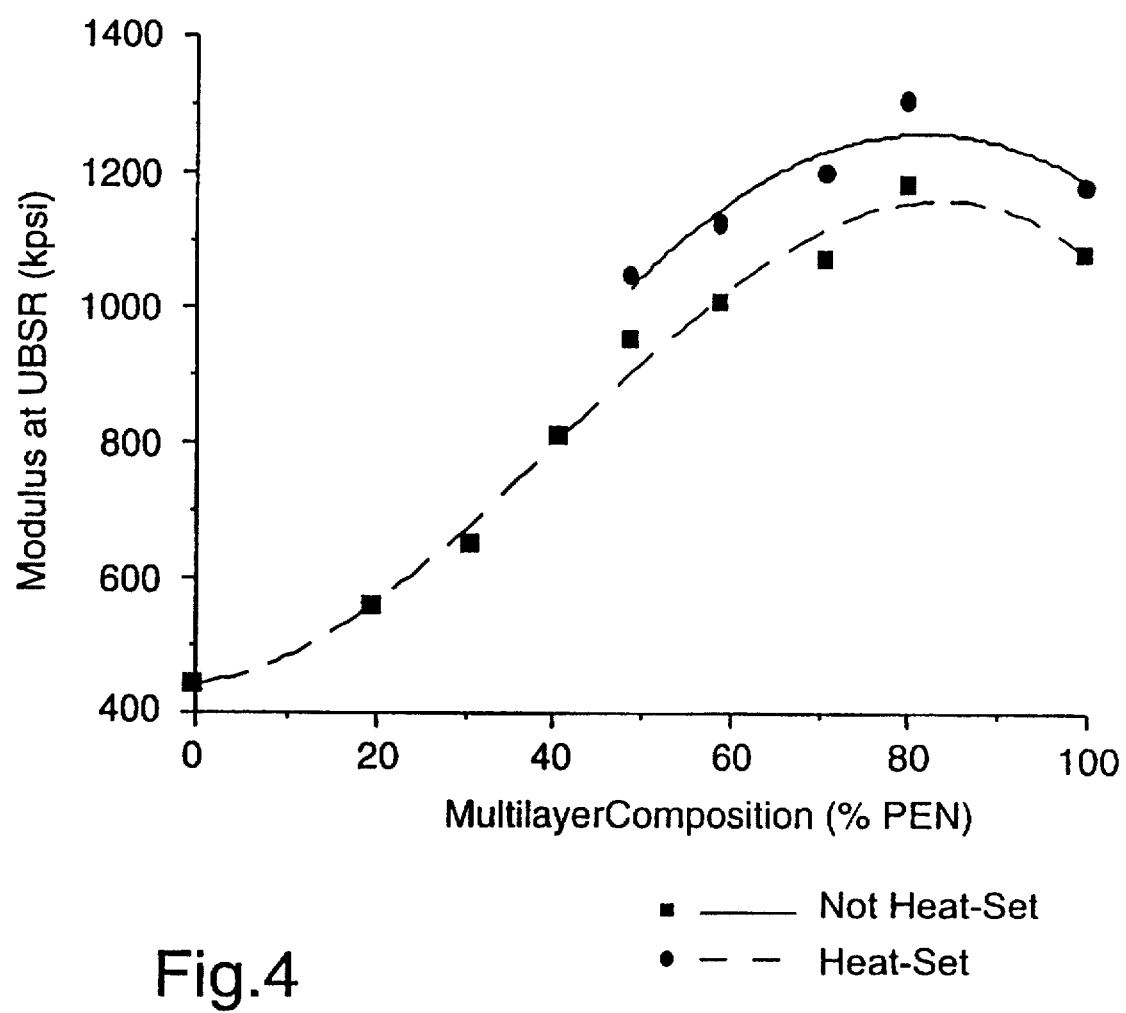
FIG. 4 is a graph of the effect of heat setting on the films of the present invention.

Table 3 and FIG. 4 clearly show that the dependence of the modulus on the composition, when measured at the UBSR, follows the same general shape, that the modulus is highest near a composition of 80% PEN, and that any of these multilayer compositions having at least about 70% PEN is capable of having a modulus equal to or greater than that of 100% PEN. Since PET is known generally to be a polymer of lower modulus than PEN, it is particularly unexpected that the multilayer films of the two polymers should have Young's Moduli higher than those of either PEN or PET alone. Table 3 and FIG. 4 also illustrate the effect of heat-setting in improving the modulus of any of the films of this invention.

EXAMPLES 45–57

The following examples illustrate the linear dependence of the modulus of the multilayer compositions of the present invention on (% PEN) and the real stretch ratio.

Additional specimens were prepared from the cast webs of Examples 3–6. These were stretched to biaxial stretch ratios of 3.5 or higher, and their moduli were determined as before. The results are shown in Table 4. The data from Examples 25–57 were pooled and fitted to a mathematical model, assuming that the modulus depends linearly on both the composition (% PEN) and the real stretch ratio.

TABLE 4

| Example No. | Cast Web of Example No. | % PEN | Stretch Ratio (nom) | Stretch Ratio (real) | Modulus, kpsi $10^6$ kPa) |
|---|---|---|---|---|---|
| 45 | 3 | 71 | 3.50 | 3.39 | 741 (5.11) |
| 46 | 3 | 71 | 4.00 | 3.97 | 824 (5.68) |
| 47 | 3 | 71 | 4.50 | 4.31 | 903 (6.23) |
| 48 | 3 | 71 | 5.00 | 4.72 | 992 (6.84) |
| 49 | 3 | 71 | 5.50 | 5.14 | 1034 (7.13) |
| 50 | 4 | 59 | 4.00 | 3.80 | 787 (5.43) |
| 51 | 4 | 59 | 4.50 | 4.22 | 886 (6.11) |
| 52 | 4 | 59 | 5.00 | 4.74 | 956 (6.59) |
| 53 | 5 | 49 | 3.50 | 3.30 | 727 (5.01) |
| 54 | 5 | 49 | 4.00 | 3.68 | 804 (5.54) |
| 55 | 5 | 49 | 4.50 | 4.20 | 872 (6.01) |
| 56 | 6 | 41 | 3.50 | 3.22 | 707 (4.87) |
| 57 | 6 | 41 | 4.00 | 3.68 | 747 (5.15) |

Figure 5:
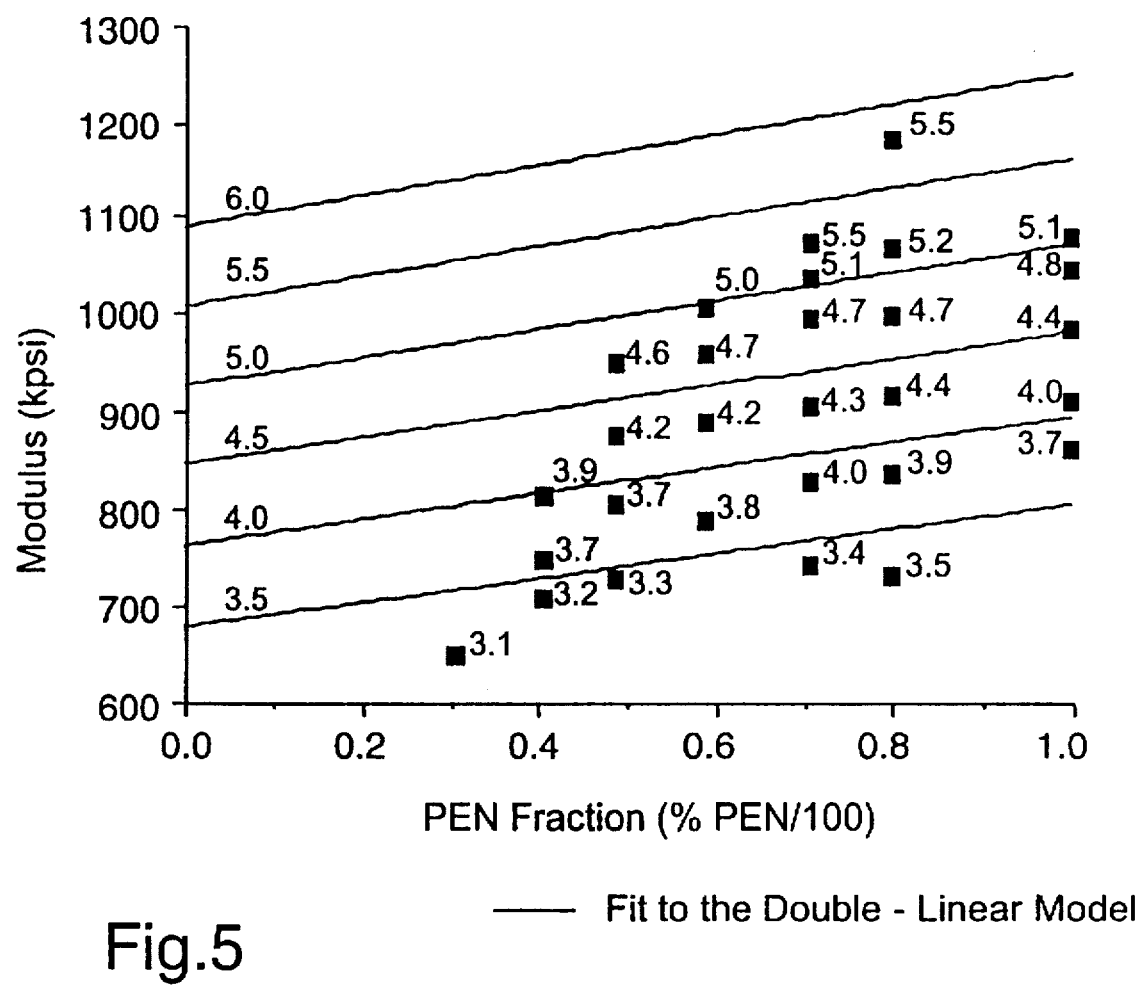
FIG. 5 is a graph of the modulus as a function of PEN fraction for 29 layer films of the present invention.
Figure 6:
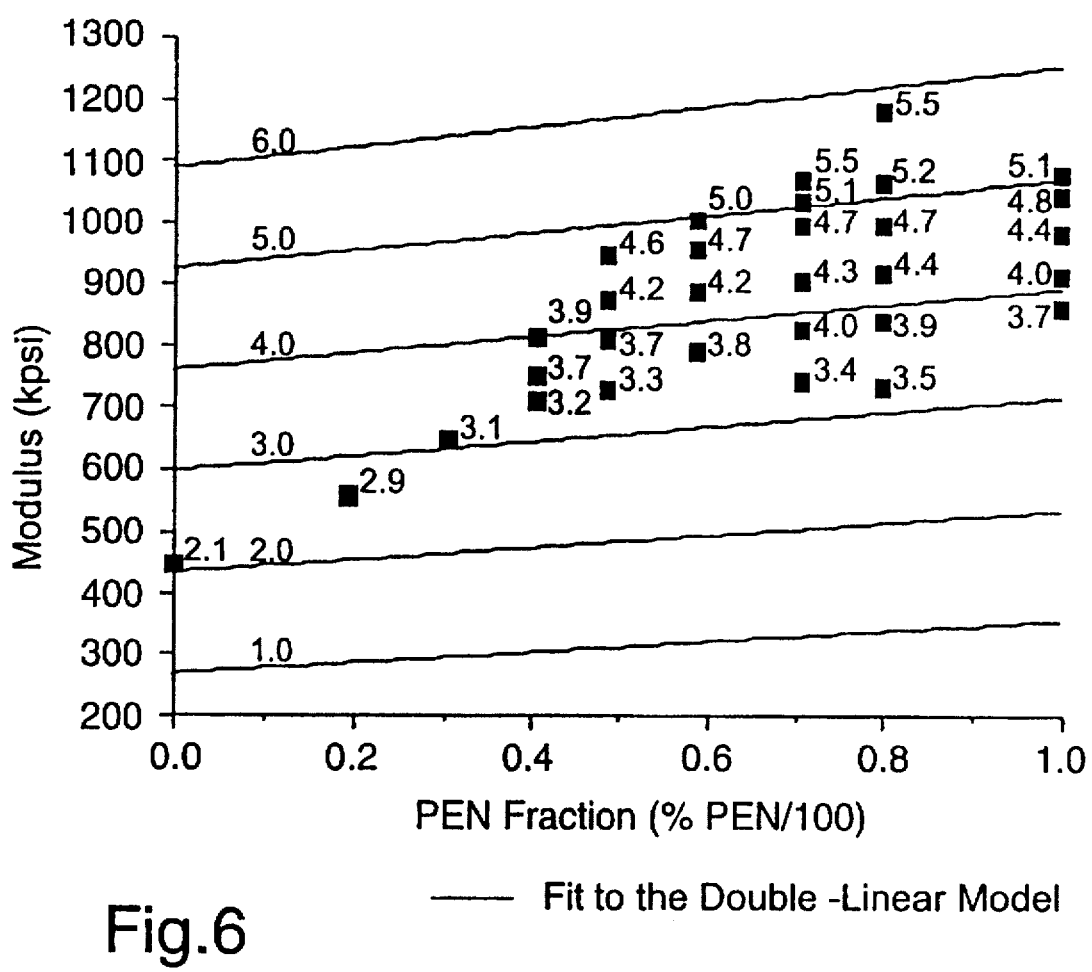
FIG. 6 is a graph of the modulus as a function of PEN fraction for 29 layer films of the present invention.

The result of the mathematical fit is shown graphically in FIGS. 5 and 6. It is immediately apparent that the data is well-fit by a linear model. The model also yields reasonable values for several limiting cases. Thus, FIG. 5 shows that the model predicts a modulus for pure PET biaxially oriented to a stretch ratio of 4.0 that is roughly 760 kpsi ($5.24 \times 10^6$ kPa). This value is comparable to those observed with PET films made by conventional industrial processes. The model also predicts a modulus for pure PEN biaxially oriented to a stretch ratio of 5.0 that is roughly 1070 kpsi ($7.38 \times 10^6$ kPa), which is comparable to the values observed with commercially available PEN films. FIG. 6, which shows a wider view of the same model, shows that the modulus values at stretch ratio of 1.0 are roughly 260 kpsi ($1.79 \times 10^6$ kPa) and 350 kpsi ($2.41 \times 10^6$ kPa) for PET and PEN, respectively. These values also compare reasonably with those observed for pure samples of the polymers in question-in their unstretched states.

These results imply that the assumptions of the model are reasonable, and that the extrapolations of the other lines of constant stretch ratio in FIG. 6 are also significant. This suggests that the contribution of the PET layers to the overall modulus of the multilayer films stretched to stretch ratios of 5.5 is slightly in excess of 1000 kpsi ($6.9 \times 10^6$ kPa). It must be noted that a monolayer free-standing film of PET typically cannot be stretched to stretch ratios as high as 5.5 in each direction by known commercial processes, and that the modulus of PET film made by such processes does not reach values in excess of 1000 kpsi ($6.9 \times 10^6$ kPa) in each direction.

Therefore, the results obtained in these examples, and the success of the linear model in predicting the observed results, imply that the PET layers within the multilayer films are stretchable to much higher draw ratios than can be achieved in conventional processes, and possess moduli far in excess of those attainable with conventional PET films. A PET-layer "contribution" to the overall film modulus of over 1000 kpsi ($6.9 \times 10^6$ kPa) is a particularly surprising result, as is the stretchability of PET layers to stretch ratios of 5.5.

EXAMPLES 58–61

The following examples demonstrate the dimensional stability of the films of the present invention.

Multilayer film samples from cast webs 1, 2, 3, and 9 were prepared by stretching, simultaneously and equally in both directions, on the laboratory film stretcher. Conditions are given in Table 5. The stretch ratios chosen for each cast web were at or near the UBSR for the chosen stretch temperatures. The films were heat-set on frames as in Examples 36–40. The CTE, CHE, and 80° C./3 day shrinkage were measured on specimens cut on the diagonal, so as to average the effects of the two directions. The results are presented in Table 5.

TABLE 5

| Example No. | Cast Web No. | % PEN | Stretch Temp. (°C.) | Biaxial Stretch Ratio | CTE (ppm/°C.) | CHE (ppm/% RH) | Shrinkage (%) |
| --- | --- | --- | --- | --- | --- | --- | --- |
| 58 | 9 | PET Control | 100 | 3.75 | 17.74 | 10.05 | 0.38 |
| 59 | 1 | PEN Control | 150 | 5.0 | 6.13 | 9.83 | 0.15 |
| 60 | 2 | 80 | 150 | 6.0 | 4.68 | 9.25 | 0.20 |
| 61 | 3 | 71 | 150 | 5.5 | 3.97 | 9.02 | 0.21 |

The results clearly reflect the well-known superior dimensional stability of PEN over PET. Moreover, the results also show that the multilayer films exhibit somewhat improved CTE and CHE values over even the pure PEN film, and shrinkage values roughly equivalent to that which would be obtained from an interpolation based on composition between the values of the PET and PEN films.

EXAMPLES 62–88

The following examples illustrate the effect of temperature on stretchability and modulus.

Stretching experiments were performed on specimens of the cast web of Example 2 to determine the effect of temperature on stretchability and the resulting modulus. The procedures followed were similar to those of Examples 36–44 above, except that the temperature was varied from 150° C. UBSRs were determined at temperatures from 120° to 180° C. In these Examples, the UBSR is expressed only in terms of the nominal stretch ratio to save the effort of measuring Real stretch ratios. Also, in these Examples, a stretch ratio condition was pursued until five consecutive sample failures were recorded (rather than three). Thus, the values reported for UBSR will be slightly higher if compared to those in Examples 36–44.

The laboratory stretcher used was capable of a maximum stretch ratio only slightly in excess of 6.0. At temperatures from 155° to 175° C., the UBSR was found to be in excess of 6.0, as evidenced by the lack of ruptured specimens when stretched to this extent. Therefore, in order to more fully gauge the temperature effect, the somewhat less stretchable cast web of Example 5 was also tested.

The Young's Modulus of each film stretched to its UBSR was determined by tensile testing. The results are shown in Table 6 and in FIGS. 7–8. It was observed that all of the films had a patchy or broken "frosted" or hazy appearance on each surface.

TABLE 6

| Example No. | Cast Web of Example No. | % PEN | Stretch Temperature, °C. | UBSR | Modulus at UBSR, kpsi (10⁶ kPa) |
| --- | --- | --- | --- | --- | --- |
| 62 | 2 | 80 | 120 | 4.00 | 632 (4.36) |
| 63 | 2 | 80 | 125 | 4.50 | 665 (4.59) |
| 64 | 2 | 80 | 130 | 4.50 | 799 (5.51) |
| 65 | 2 | 80 | 135 | 4.75 | 885 (6.10) |
| 66 | 2 | 80 | 140 | 5.00 | 931 (6.42) |

TABLE 6-continued

| Example No. | Cast Web of Example No. | % PEN | Stretch Temperature, °C. | UBSR | Modulus at UBSR, kpsi (10⁶ kPa) |
| --- | --- | --- | --- | --- | --- |
| 67 | 2 | 80 | 145 | 5.50 | 968 (6.67) |
| 68 | 2 | 80 | 150 | 6.00 | 1028 (7.09) |
| 69 | 2 | 80 | 155 | >6.00 | — |
| 70 | 2 | 80 | 160 | >6.00 | — |
| 71 | 2 | 80 | 165 | >6.00 | — |
| 72 | 2 | 80 | 170 | >6.00 | — |
| 73 | 2 | 80 | 175 | >6.00 | — |
| 74 | 2 | 80 | 180 | Unstretchable | — |
| 75 | 5 | 49 | 120 | 3.75 | — |
| 76 | 5 | 49 | 125 | 4.25 | — |
| 77 | 5 | 49 | 130 | 4.25 | 726 (5.01) |
| 78 | 5 | 49 | 135 | 4.50 | 799 (5.51) |
| 79 | 5 | 49 | 140 | 4.50 | 774 (5.34) |
| 80 | 5 | 49 | 145 | 4.75 | 807 (5.56) |
| 81 | 5 | 49 | 150 | 4.75 | 864 (5.96) |
| 82 | 5 | 49 | 155 | 5.00 | 886 (6.11) |
| 83 | 5 | 49 | 160 | 5.25 | 861 (5.94) |
| 84 | 5 | 49 | 165 | 5.50 | — |
| 85 | 5 | 49 | 170 | 5.50 | 664 (4.58) |
| 86 | 5 | 49 | 175 | 5.25 | — |
| 87 | 5 | 49 | 180 | 5.25 | — |
| 88 | 5 | 49 | 185 | 4.75 | — |

Figure 7:
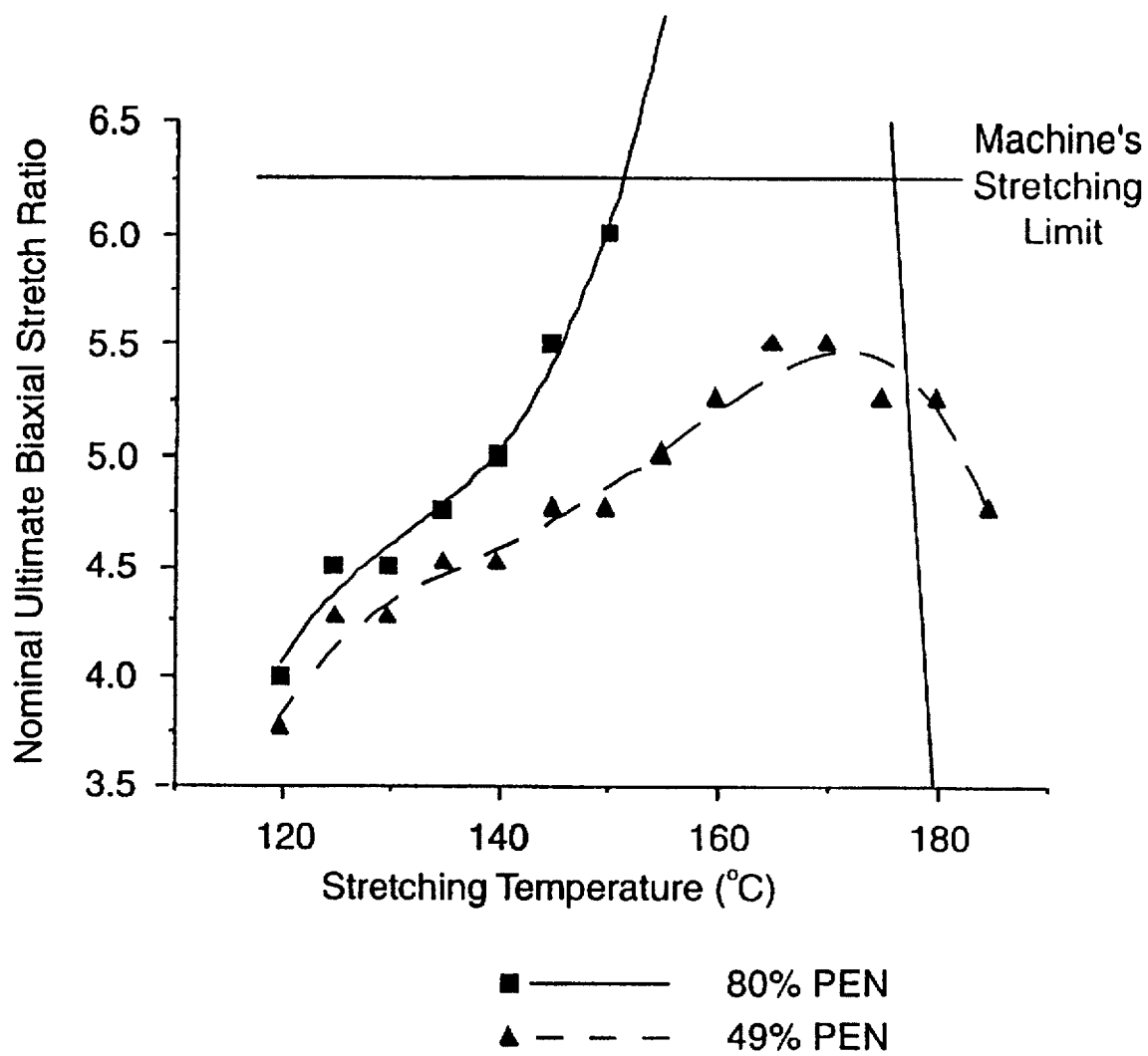
FIG. 7 is a graph of the maximum draw ratio as a function of draw temperature for various 29 layer films of differing PEN:PET ratios.

FIG. 7 shows that the UBSR for the 80% PEN multilayer achieves a maximum at a temperature somewhere between 150° and 180° C., falling off sharply at the high-temperature end of the range. The UBSR also appears to fall off more abruptly as the stretch temperature is lowered below 125° C., which is very near the Tg of PEN. The 49% PEN composition exhibits a similarly dependence of UBSR on stretch temperature, although the UBSR falls off more gradually at very high temperatures as compared to the 80% PEN composition.

This effect may be due in part to the crystallization of the PET before the stretching commences at these high temperatures. Generally, 170°–180° C. is regarded temperature range in which PET crystallizes from the amorphous glass most rapidly. With PET making up more of the total in the 49% PEN composition, the sample may be better able to support drawing stresses at the higher temperatures. It is also apparent that the 49% PEN composition has a maximum UBSR at 165°–170° C.

Figure 8:
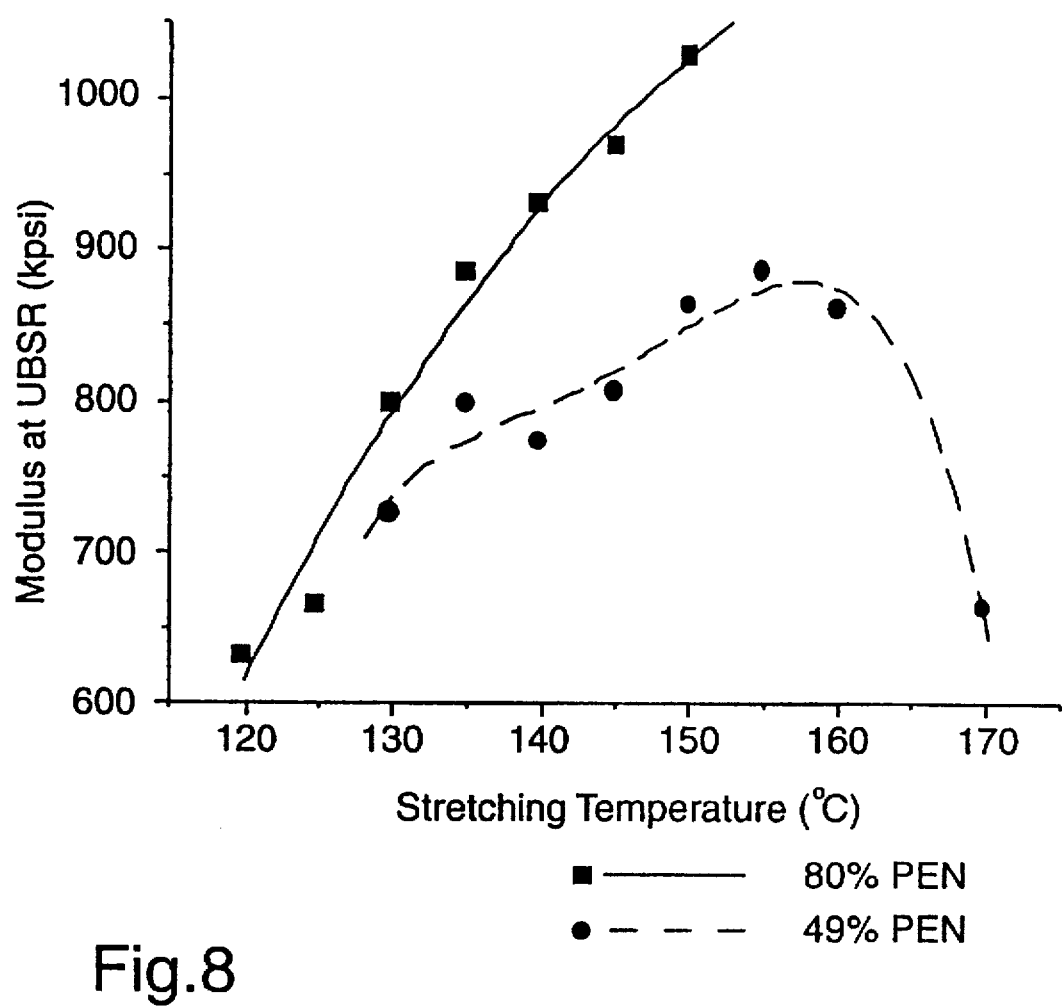
FIG. 8 is a graph of the modulus (at the maximum draw ratio) as a function of draw temperature for two 29 layer films of differing PEN:PET ratios.

As indicated in FIG. 8, the modulus at the UBSR for the 80% PEN composition rises with stretch temperature up to the point where machine limitations make further measurements impossible. The modulus of the film made at 150° C. was in excess of 1000 kpsi (6.9×10⁶ kPa) prior to heat-setting, and the curve of modulus as a function of stretch temperature shows no signs of leveling off. The results for the 49% PEN composition, however, show a maximum at a stretch temperature somewhat lower than that of the UBSR maximum. Thus, the optimum stretching temperature range for the 80% PEN composition is also likely to be in the 150°–160° C. range. Since the glass transition of PEN is only about 120°–125° C. and the glass transition of PET is much lower, the determination of an optimum stretching temperature of 150°–160° C. for the multilayer films is a surprising result.

EXAMPLES 89–103

The following examples illustrate the application of the feedblock concept of multilayer coextrusion for the PEN:PET polymer pair.

Samples of PEN and PET were obtained and were dried under dry nitrogen. PEN at about 177° C., and PET at about 149° C. The PEN resins used had several different molecular weights, as measured by intrinsic viscosity (IV). The PET resin was Goodyear Traytuf 8000C, with an IV of 0.80. For PEN, a 1¾ inch extruder was used, and the extrusion temperature was about 293° C. For PET, a second 1.75 inch (4.4 cm) extruder was used, and the extrusion temperature was about 282° C.

The resins were coextruded by a feedblock method. Thus, the melt streams from the two extruders were conveyed to the feedblock via ¾" diameter neck tubes maintained at about 293° C. and 266° C., respectively, for PEN and PET. A modular feedblock with an alternating-two-component, 29-layer insert was used. The feedblock fed a typical polyester film die with a 12 inch (30.5 cm) wide die orifice. The feedblock exit was mated to the die inlet via a gradual square-to-round flow channel profile adapter.

The feedblock, adapter, and die were all maintained at about 282° C. The extrudate was cast onto a chill roll maintained at about 18° C., and electrostatic pinning was used. Total combined throughput was maintained at either about 60 lbs/hr ($7.5 \times 10^{-3}$ kg/s) or 90 lbs/hr ($1.1 \times 10^{-2}$ kg/s). The PEN:PET ratio was varied from about 80:20 to about 50:50. The feedblock was set up so that the outermost layers were PET in some experiments and PEN in others. The cast web thickness was controlled by the chill roll speed to be about 12–13 mils. In some experiments, the 2nd and 28th slots of the feedblock were plugged, so as to create a 25-layer flow with outermost layers of double thickness.

The cast films were evaluated before any stretching for characteristic rheologically-based flow-defect patterns, and rated "Good", "Marginal", or "Poor". "Good" cast webs exhibited no flow-defect patterns, "Marginal" webs exhibited minor cosmetic flow-defect patterns, and "Poor" webs exhibited significant flow-defect patters. Table 7 contains the conditions of the individual experiments and results of the evaluations.

TABLE 7

| Example Number | No. of Layers | PEN IV, dL/g | Throughput, lbs/hr ($10^{-3}$ kg/s) | PEN:PET Ratio | Outside Layer Polymer | Cast Web Rating |
|---|---|---|---|---|---|---|
| 89 | 29 | 0.626 | 63 (7.9) | 80 | PET | Poor |
| 90 | 29 | 0.570 | 59 (7.4) | 80 | PET | Poor |
| 91 | 29 | 0.520 | 61 (7.7) | 81 | PET | Poor |
| 92 | 29 | 0.473 | 61 7.7) | 80 | PET | Good |
| 93 | 29 | 0.473 | 62 (7.8) | 70 | PET | Good |
| 94 | 29 | 0.473 | 62 (7.8) | 61 | PET | Good |
| 95 | 29 | 0.473 | 61 (7.7) | 53 | PET | Marginal |
| 96 | 25 | 0.570 | 60 (7.6) | 79 | PET | Poor |
| 97 | 25 | 0.516 | 59 (7.4) | 80 | PET | Marginal |
| 98 | 25 | 0.516 | 94 (11.8) | 79 | PET | Marginal |
| 99 | 25 | 0.485 | 63 (7.9) | 80 | PET | Good |
| 100 | 25 | 0.485 | 93 (11.7) | 80 | PET | Good |
| 101 | 25 | 0.555 | 61 (7.7) | 79 | PEN | Poor |
| 102 | 25 | 0.516 | 59 (7.4) | 79 | PEN | Marginal |
| 103 | 25 | 0.485 | 60 (7.6) | 78 | PEN | Good |

These results indicate that, with the feedblock configuration used, it was necessary to utilize a PEN resin with IV below 0.52 in order to make acceptable multilayer cast webs with a PET resin of IV 0.80, regardless of which polymer was used on the surface layers. The same feedblock and die were used in subsequent experiments on continuous film lines. Since the mechanical properties of PEN decrease with an IV below a level of about 0.53, comparison of properties between prior and subsequent examples may be misleading.

EXAMPLES 104–105

The following examples illustrate the effect of IV on stretchability.

Specimens were prepared for stretching experiments from the cast webs of Example 3 (for Example 104) and Example 11 (for Example 105). These cast webs were chosen because the only significant difference between them was the IV of the resins used. The cast web of Example 3 consisted of PEN with IV of 0.57 and PET with IV of 0.80. The cast web of Example 11 consisted of PEN with IV of 0.50 and PET with IV of 0.72. Each cast web had PET at the outermost layers, and consisted of about 70% PEN.

For each cast web, the UBSR was determined as in Examples 50–76, at 150° C. In Example 104, the UBSR was determined to be 5.75. In Example 105, a value of 5.25 to 5.50 was obtained. Thus, the higher IV resins appear to promote the enhanced stretchability effect.

EXAMPLES 106–111

The following examples illustrate the effect of cast web quality on stretchability.

Specimens were prepared for stretching experiments from the cast webs of Example 2 (for Example 106) and Example 90 (for Example 107). These cast webs were chosen because the only significant difference between them was that the web from Example 2 was prepared using the multilayer die, while the web from Example 90 was prepared using the less rheologically "forgiving" multilayer feedblock. Thus, the web from Example 90 included rheologically-related surface imperfections, as reflected by its cast web rating of "poor" in Table 7. Each cast web consisted of 80% PEN and had PET as the outermost layers. The resins used in the web also had similar IVs.

For each cast web, the UBSR was determined as in Examples 62–88, at 150° C. In Example 106, the UBSR was determined to be 6.00, the stretching machine's physical limit. In Example 107, a USBR of 5.25 was obtained. Thus, the rheologically-related defects appear to negatively impact the enhanced stretchability of the films.

Specimens were prepared for stretching experiments from the cast webs of Example 91 (for Example 108) and Example 92 (for Example 109). These cast webs were chosen because, taken with the cast web of Example 90 (Example 107), they constitute a series in which the only significant differences are the IVs of the PEN resins used, and consequently, the quality of the cast web surface. The cast web of Example 90 contained PEN with an IV of 0.570, and was rated "poor" in surface quality due to rheologically-related defects. The cast web of Example 91 contained PEN with an IV of 0.520, and was also rated "poor" in surface quality. The cast web of Example 92 contained PEN with an IV of 0.473, and was rated "good" in surface quality. Each cast web had PET as the outermost layers, and consisted of about 80% PEN.

For each cast web, the UBSR was determined as described in Examples 62–88 at 150° C. In Example 107, the UBSR was 5.25, as stated above. In Example 108, a value of 5.75 was obtained. In Example 109, a value of 6.00 (stretching machine limit) was obtained. Since the effect of resin IV shown by Examples 104–105 would predict UBSRs falling in the reverse of this order, the surface quality is shown by these Examples to be an even more important factor in promoting enhanced stretchability in the multilayer films.

Specimens were prepared for stretching experiments from the cast webs of Example 96 (for Example 110) and Example 99 (for Example 111). These cast webs were chosen because the only significant differences between them are the IVs of the PEN resin used, and consequently, the quality of the cast web surface. Together, they differ from the Examples 107–109 series in having 25 alternating layers, with the outermost layers double-thick, rather than 29 alternating layers of equal thicknesses.

The cast web of Example 96 contained PEN with IV of 0.570, and was rated "poor" in surface quality due to flow-related defects. The cast web of Example 99 contained PEN with IV of 0.485, and was rated "good" in surface quality. Each cast web had PET at the outermost layers, and consisted of about 80% PEN. For each cast web, the UBSR was determined as described in Examples 62–88 at 150° C. In Example 110, the UBSR was 5.50. In Example 111, a value of 6.00 (stretching machine limit) was obtained. Clearly, the deleterious effect on stretchability demonstrated by Examples 107–109 is shown to continue to apply to these films, even though they were made with doubly-thick surface layers.

The results of Examples 107 and 110 were further compared. The higher UBSR in the case of Example 110 (5.50 vs. 5.25) suggests that there is a beneficial stretchability effect, of secondary importance, from the provision of doubly-thick surface layers on the multilayer films.

EXAMPLES 112–113

The following examples illustrate the effect of the PEN IV on the modulus.

The modulus was determined for the films stretched to their 150° C. UBSR in Examples 108 and 109 (Examples 112 and 113, respectively). In Example 112, the modulus was found to be 1000 kpsi ($6.90 \times 10^6$ kPa) at a biaxial stretch ratio of 5.75. For Example 113, the modulus was determined to be 946 kpsi ($6.52 \times 10^6$ kPa) at a biaxial stretch ratio of 6.00. The higher IV PEN resin appears to be beneficial in promoting a higher modulus, in this case even overcoming a disadvantage in stretchability.

EXAMPLES 114–117

The following examples demonstrate the effect of the choice of surface polymer and the degree of crystallinity of PET on the clarity and frictional properties of multilayer PEN/PET films. The examples also illustrate the behavior of films in which the PET layers are "constrained".

Specimens for Examples 114–117 were prepared from the cast webs of Examples 1 (Monolayer PEN), 3 (71% PEN with PET as the "surface" polymer), 18 (71% PEN with PEN as the "surface" polymer), and 9 (monolayer PET), respectively. The first three specimens were stretched at conditions similar to Examples 25–35, to biaxial stretch ratios of 5.0 at a stretch temperature of 150° C. The fourth, being pure PET, was mounted in the stretcher at 60° C., and stretched at 100° C. to biaxial stretch ratio of 4.0. Examples No. 114 (PEN), No. 116 (71% PEN with PEN as "surface" polymer), and No. 117 (PET) each yielded visually clear, non-hazy films, while Example No. 115 (71% PEN with PET as "surface" polymer) yielded films with a patchy haze as in Examples 62–88. All of the multilayer films, even those referred to as being "clear", exhibited a slightly iridescent appearance, most likely due to the proximity of the individual layer thicknesses of the stretched films to the wavelengths of visible light. Specimens of Example No. 115 were also observed to be slippery when folded over and rubbed against themselves. By contrast, the PEN and PET films (Examples Nos. 114 and 117) "block" to themselves tenaciously and are very hard to slide in friction. Surprisingly, the multilayer film with the PEN outer layers (Example No. 116) exhibited frictional behavior intermediate between these two extremes.

Without wishing to be bound by any theory, it is believed that in the case of the multilayer films, the elevated temperature of 150° C. required for stretching the PEN causes the PET layers to crystallize during preheating, prior to the commencement of stretching. In the case of films with PET as the outermost layers, the crystallized PET surface layers are believed to break up during the stretching step, leaving "islands" of patchy haze on the stretched film. Surprisingly, when PEN serves as the outermost layers, no patchiness or haziness is observed. It is believed that the PET layers still crystallize during preheat, but that the PET draws without failure from the crystalline state when confined between the PEN layers.

EXAMPLES 118–121

The following examples illustrate the effect of the surface polymer on stretchability and modulus.

Specimens were prepared for stretching experiments from the cast webs of Example 99 (for Examples 118 and 120) and Example 103 (for Examples 119 and 121). These cast webs were chosen in light of the fact that the only significant difference between them was the identity of the polymer in the two outside surface layers. The cast web of Example 99 had 25 layers with PET forming both outside or surface layers, while the cast web of Example 103 had 25 layers with PEN forming both surface layers. Each specimen consisted of about 80% PEN.

For each cast web, the UBSR was determined as described in Examples 62–88 at both 150° and 145° C. The Examples done at 145° C. were performed for the sake of resolving a stretchability difference between the two cast webs, since both proved stretchable to the machine limit at 150° C. For the films drawn to the same nominal draw ratio at 150° C., the real draw ratio was determined by the displacement of ink marks. The modulus was also determined. Both are reported as values averaged over the MD and TD. The results are shown in Table 8.

TABLE 8

| Example No. | Cast Web No. | "Outside" Polymer | Stretch Temp. (°C.) | Ultimate Biaxial Stretch Ratio | Real Stretch Ratio | Modulus, kpsi ($10^6$ kPa) |
| --- | --- | --- | --- | --- | --- | --- |
| 118 | 99  | PET | 145 | 5.25 |      |              |
| 119 | 103 | PEN | 145 | 5.50 |      |              |
| 120 | 99  | PET | 150 | >6.00 | 5.70 | 1018 (7.02) |
| 121 | 103 | PEN | 150 | >6.00 | 5.89 | 1037 (7.15) |

These results demonstrate that the stretching differences between otherwise identical cast webs, due solely to the choice of surface-layer polymer, are small. PEN surface layers appear to promote slightly enhanced stretchability, a more uniform draw (i.e., a real stretch ratio closer to the nominal value), and a slightly higher modulus. As in Examples 114–117, the films with PEN outer layers were also clear, while the PET-surfaced films had uneven patches of frosty haze.

The placement of the lower-Tg PET at the surface layers presents some practical challenges in a continuous process, especially in a length orienter or tenter, where the film is contacted across its width or at the edges by metal parts heated to a temperature sufficiently high for stretching the higher-Tg PEN. Since the results of these Examples show no advantage to placing the PET at the surface layers, all subsequent Examples employ "PEN-surfaced" constructions.

EXAMPLES 122–124

The following examples demonstrate the production of the film of the current invention in a continuous manner on a film line.

A PEN resin was prepared having an IV of 0.50, and was dried at about 149° C. A PET resin (Goodyear TRAYTUF™ 8000C) was obtained which had an IV of 0.80, and was dried at about 135° C. The PEN was extruded on a 2½" single-screw extruder at a temperature of about 293° C., with the post-extruder equipment in the PEN melt train being maintained at about 282° C. The PET was extruded on a 1¾" single screw extruder at a temperature of about 277° C., with the post-extruder equipment in the PET melt train being maintained at about 266° C. Gear pumps were used to control the extrudate flow. Both melt streams were filtered with candle-type filters rated for 40 microns, and ¾-inch diameter, heated, insulated neck tubes were used to convey the polymer melts to the feedblock.

The same feedblock insert was used as in Examples 89–103, and was plugged as before to give a 25-layer construction whose outermost layers were doubled in thickness. The feedblock was fed to place PEN as the outermost layers. The PEN:PET ratio was 80:20 by weight, and total throughput was about 130 lbs/hr. The same 12" wide film die as in Examples 89–103 was used. Electrostatic pinning was also used. The feedblock was maintained at a temperature of about 282° C., and the die was maintained at a temperature of about 288° C. The casting roll was maintained at a temperature of about 52° C. The casting roll speed was adjusted to provide a cast web thickness of 12 to 13 mils.

Using a "length orienter", the cast web was stretched in the machine direction between rolls driven at different speeds. The slower driven rolls were maintained at about 138° C. and subsequent idler rolls were maintained at about 143° C. The nominal stretch ratio in this step, determined by the difference in speeds of the driven rolls, was 1.30. The faster (cooling) rolls were maintained at about 24° C.

The film was subsequently stretched in both the machine and transverse directions using a tenter capable of simultaneous biaxial stretching. The tenter oven's preheat and stretch zones were both maintained at about 163° C. The preheat zone had a length of 9.8 feet (3.0 m), providing a residence time in the preheat zone of approximately 18 seconds at those conditions. The film was further stretched nominally (as measured by grip displacement) to stretch ratios of 4.40 and 4.89 in the machine and transverse directions, respectively. The stretch zone had a length of 8.2 feet (2.5 m), providing a residence time in the stretch zone of approximately 6 seconds at those conditions.

The film was heat-set under restraint in the tenter. The tenter's two heat-set zones were maintained at about 216° and 199° C. Before release from the tenter clips, the film was cooled in a cooling zone maintained at about 54° C. Ink marks were drawn on the cast web in order to measure the actual stretch ratios in the center of the film web. The final stretch ratios were 5.81 and 5.50 in the machine and transverse directions, respectively. The film was, surprisingly, somewhat hazy, in spite of having PEN outer layers. In addition, rather than being slightly and uniformly iridescent over its entire surface, as was observed of almost all of the lab stretcher specimens of multilayer films, the film of this Example had lightly colored bands running in the machine direction, probably due to minor thickness and/or orientational differences cross-web. The physical properties of the film of Example 122 are listed in Table 9.

In Example 123, the length orienter's fast roll was adjusted to provide a draw ratio of 1.34. The tenter's nominal draw ratios in the machine and transverse directions were 4.40 and 5.12, respectively. All other conditions were unchanged. The stretch ratios of the finished film, as measured by the displacement of ink marks, were 5.99 and 5.95 in the machine and transverse directions, respectively. This film was equally hazy and color-banded. The physical properties of the film are listed in Table 9.

In Example 124, the temperatures in the simultaneous-biaxial tenter were altered. Other conditions were as before. At tenter preheat and stretch temperatures of about 168° C. and 149° C., respectively, measured stretch ratios of 6.14 and 6.11 were obtained in the machine and transverse directions, respectively. This film was less hazy than the two described above. The physical properties of this film are listed in Table 9.

TABLE 9

| Example No. | | 122 | 123 | 124 |
|---|---|---|---|---|
| L. O. Stretch Ratio | | 1.30 | 1.34 | 1.34 |
| Tenter Preheat Temp. | °C. | 1.63 | 1.63 | 1.68 |
| Tenter Stretch Temp. | °C. | 1.63 | 1.63 | 1.49 |
| Tenter MD Stretch Ratio | | 4.40 | 4.40 | 4.40 |
| Tenter TD Stretch Ratio | | 4.89 | 5.12 | 5.12 |
| Film Caliper | mils | 0.363 | 0.340 | 0.306 |
| Real Stretch Ratio (MD) | | 5.81 | 5.99 | 6.14 |
| Real Stretch Ratio (TD) | | 5.50 | 5.95 | 6.11 |
| Green Modulus (MD) | kpsi ($10^6$ kPa) | 890 (6.14) | 792 | 760 |
| Green Modulus (TD) | kpsi ($10^6$ kPa) | 906 (6.25) | 925 | 898 |
| Modulus (MD) | kpsi ($10^6$ kpa) | 966 (6.66) | 1015 | 962 |
| Modulus (TD) | kpsi ($10^6$ kPa) | 1019 (7.03) | 995 | 1078 |
| CTE (MD) | (ppm/°C.) | 15.91 | 10.38 | 15.28 |
| CTE (TD) | (ppm/°C.) | 11.53 | 10.25 | 10.53 |
| CHE (MD) | (ppm/% RH) | 11.03 | 9.53 | 8.78 |
| CHE (TD) | (ppm/% RH) | 8.82 | 8.67 | 7.43 |
| 65° C./72 hr. Shrinkage (MD) | (%) | 0.16 | 0.16 | 0.13 |
| 65° C./72 hr. Shrinkage (TD) | (%) | 0.18 | 0.17 | 0.17 |
| 150° C./15 min Shrinkage (MD) | (%) | 2.34 | 2.60 | 1.65 |
| 150° C./15 min Shrinkage (TD) | (%) | 2.84 | 2.92 | 2.35 |
| Appearance | | Hazy | Hazy | Less Hazy |

These results demonstrate that it is possible, by the process described, to produce the film of the current invention in a continuous manner on a film line. However, the modulus values, being lower than those in Example 37, and the CTE values, being higher than those in Example 60, serve to illustrate that the conditions set forth in these three examples are not the optimum conditions, and that one skilled in the art might reasonably expect to improve upon these properties via appropriate adjustment of the processing conditions.

EXAMPLE 125 AND COMPARATIVE EXAMPLES 1–3

The following examples illustrate the effect of the length orienter and tenter temperatures on the processability of the compositions of the present invention.

In Example 125, the length orienter was run with the heated rolls maintained at about 149° and 154° C. At these conditions, the web tended to develop a slack which could only be taken up by increasing the draw ratio to 1.6 or more. Thus, film could not be successfully stretched to the lower machine direction draw ratios of the earlier examples at these conditions, but could be drawn to higher machine direction draw ratios.

In Comparative Example 1, the roll temperatures in the length orienter were further increased to about 160°–166° C. At these conditions, the web began to adhere to the rolls, and no stretched film could be made.

In Comparative Example 2, the temperatures of the preheat and stretching zones of the tenter were maintained at about 177° C. At these conditions, the web was blown apart by the turbulent air in the tenter and could not be stretched.

In Comparative Example 3, the temperatures of the preheat and stretching zones of the tenter were maintained at about 149° C. At these conditions, when attempting to stretch to draw ratios similar to those in the above examples, the web tended to pull out of the grippers in the tenter, and could not be successfully stretched.

EXAMPLES 126–134

The following examples illustrate the effect of process parameters on thermal shrinkage of the films.

A series of Examples in the form of a designed experiment was prepared in order to search for conditions at which the irreversible thermal shrinkage might be decreased. Conditions were as in Example 122 above, with the following exceptions: PET resin was dried at about 132° C. Total throughput was about 100 lbs/hr ($1.26 \times 10^{-2}$ kg/s) at 80% PEN by weight. The feedblock was maintained at about 282° C., and the die at about 288° C. The temperature of the heating rolls on the length orienter were adjusted to improve their efficiency in heating the web, and were set at about 118° C. for the slower rolls and 124° C. for the idler rolls. The machine direction stretch ratio in the length orienter was set to 1.35. Stretch ratios in the stretch zone of the tenter were 4.40 in the machine direction and 4.62 in the transverse direction, as determined by grip separation.

In these Examples, three process parameters were varied: (1) the temperature of the first heat-set zone ($T_{HS1}$); (2) the temperature of the second heat-set zone ($T_{HS2}$); and (3) the amount of relaxation allowed in the transverse direction by adjustment of the tenter rails.

The design of the tenter allows for the separation of the rails to be narrowed between the exit of the stretching zone and the exit of the tenter. The rails were adjusted so that the stretch ratio of the film decreased continuously as it traversed the heat-set zones. The "relaxation" parameter is expressed as the transverse direction stretch ratio, determined by grip displacement, based on the positions at the entrance and exit to the tenter ($SR_{REL}$). Thus, low levels of relaxation are represented by values of $SR_{REL}$ nearer to 4.62 (higher values).

A 2-cubed factorial design with center point was performed. The low and high values for the three process parameters were as follows: $T_{HS1}$: 193° and 216° C.; $T_{HS2}$: 193° and 216° C.; $SR_{REL}$: 4.49 and 4.23. The center point had values for the three parameters of 204° C., 204° C., and 4.36, respectively.

All films were about 0.35 mils in thickness. "Green" modulus was determined by tensile test. Irreversible thermal shrinkage was determined using the 150° C./15 min. test described previously. Each of these measurements was made in both the machine and transverse directions. Haze was also measured. Each value reported is the average of two tests. The results are in Table 10.

TABLE 10

| Example No. | $T_{HS1}$ °C. | $T_{HS2}$ °C. | $SR_{REL}$ | Green Mod. MD, kpsi ($10^6$ kPa) | Green Mod. TD, kpsi ($10^6$ kPa) | 150° C./ 15 min Shrinkage MD, % | 150° C./ 15 min Shrinkage TD, % | Haze, % |
|---|---|---|---|---|---|---|---|---|
| 126 | 204 | 204 | 4.36 | 721 (4.97) | 728 (5.02) | 1.95 | 0.50 | 10.30 |
| 127 | 216 | 216 | 4.49 | 668 (4.61) | 771 (5.32) | 1.70 | 1.00 | 12.70 |
| 128 | 216 | 193 | 4.49 | 710 (4.90) | 770 (5.31) | 1.55 | 1.45 | 8.55 |
| 129 | 193 | 193 | 4.49 | 746 (5.14) | 820 (5.65) | 2.75 | 2.00 | 7.70 |
| 130 | 193 | 216 | 4.49 | 775 (5.34) | 799 (5.51) | 1.00 | 0.95 | 6.70 |
| 131 | 193 | 216 | 4.23 | 777 (5.36) | 740 (5.10) | 0.85 | 0.25 | 9.05 |
| 132 | 216 | 216 | 4.23 | 753 (5.19) | 721 (4.97) | 1.05 | 0.10 | 8.75 |
| 133 | 216 | 193 | 4.23 | 739 (5.10) | 740 (5.10) | 1.50 | −0.50[1] | 8.90 |
| 134 | 193 | 193 | 4.23 | 739 (5.10) | 767 (5.29) | 2.65 | 0.35 | 14.80 |

[1] The negative value for Irreversible Thermal Shrinkage in the transverse direction for Example 133 indicates that the sample actually expanded irreversibly upon thermal treatment.

Standard statistical analyses of the design indicated that the measured film properties affected to a statistically significant extent by the changes in process conditions were transverse direction shrinkage, machine direction shrinkage, and transverse direction modulus, in order of decreasing significance. Variations in haze and machine direction modulus were statistically insignificant.

The effects on transverse direction shrinkage of Heat-Set Zone #1 Temperature ("A"), Heat-Set Zone #2 Temperature ("B"), and Relaxation ("C") were all statistically significant, as were the "AB" and "BC" interactions. The "AC" interaction is marginally significant.

The effects on machine direction shrinkage of "A" and "B" were statistically significant, as was the "AB" interaction. The effect of "C" was not statistically significant.

The effects on the transverse direction modulus of "A" and "C" were highly statistically significant, while the effect of "B" was of marginal significance. None of the interactions were significant.

Therefore, for transverse direction shrinkage, the highest level of relaxation is seen to result in general improvement, and a more precise desired value for shrinkage can be achieved through adjustment of the heat-set temperatures. Zero shrinkage in the transverse direction is also achievable. For machine direction shrinkage, the higher level of heat-set zone #2 temperature results in general improvement, while the heat-set zone #1 temperature provides a means of additional control. Not surprisingly, the transverse direction modulus benefits most from a low level of relaxation, but a low temperature in heat-set zone #1 is also beneficial.

Thus, over the range studied, it was found that the combination of low temperature in heat-set zone #1, high temperature in heat-set zone #2, and a large relaxation result in the best overall control of shrinkage in both directions, with some loss of transverse direction modulus, but no statistically significant deleterious effects on any other measured properties.

EXAMPLES 135–137

The following examples illustrate the surface roughness of continuous process films having PEN in the outermost layers.

Upon testing, each of the films of Examples 122–124 was found to slide very easily when folded over onto itself, in spite of having PEN rather than PET in the outermost layers. This was a very unexpected result, as it had not been observed in the laboratory-prepared film of Example 116, and since the films in question contained none of the particulate "slip agents" commonly used in the polyester film-making art to provide frictional "slip" properties. Because of this, measurements were made on the surface roughness by both Interferometry and Rodenstock techniques. The static and kinetic coefficients of friction were also determined. These measurements are summarized in Examples 135–137 in Table 11.

EXAMPLES 138–141

The following examples illustrate the difference in the surface roughness and frictional behavior of the films made on the film line, compared to films made in the laboratory.

For comparison with Examples 135–137, specimens for laboratory stretching were prepared from cast webs of Example 1 (PEN), Example 103 (78% PEN with PEN outermost layers), and Example 99 (80% PEN with PET outermost layers). The specimens were stretched under the conditions outlined in Examples 25–35 to biaxial stretch ratios of 5.5, 6.0, and 6.0, respectively, to give Examples 138–140.

An additional specimen of the cast web of Example 103 was stretched by a technique intended to more closely model the film line conditions of Examples 122–124. After the usual preheating at 150° C. for 45 seconds, the specimen was stretched in only the machine direction at a rate of 100%/sec and a temperature of 150° C. to a stretch ratio of 1.364. The specimen was then immediately further stretched simultaneously in both directions to a stretch ratio in the transverse direction of 6.00, and an overall stretch ratio in the machine direction (based on the original unstretched length) of 6.00. This required additional machine direction stretching in this step of 6.00/1.364, or 4.40. The rate of transverse direction stretching was 100%/sec, and the rate of machine direction stretching was adjusted to cause the stretching in both directions to end simultaneously. There was no pause between the end of the machine direction-only stretch and the commencement of the simultaneous stretching step. This film is Example 141.

The same analyses were performed as for Examples 135–137. The results of these analyses are set forth in Table 11. In the columns of Interferometry and Rodenstock data, the two numbers represent the two sides of each film specimen.

TABLE 11

| Ex. No. | Stretch Method | % PEN | Outer Layer Polymer | Interferometry Ra (nm) | Interferometry Rq (nm) | Rodenstock Ra (nm) | Rodenstock Rq (nm) | Static COF | Kinetic COF |
|---|---|---|---|---|---|---|---|---|---|
| 135 | Film | 80 | PEN | 12.83 | 21.87 | 47 | 79 | 0.66 | 0.38 |
|  | Line |  |  | 13.88 | 20.26 | 40 | 71 |  |  |
| 136 | Film | 80 | PEN | 9.06 | 10.47 | 39 | 63 | 0.80 | 0.48 |
|  | Line |  |  | 11.51 | 17.93 | 34 | 57 |  |  |
| 137 | Film | 80 | PEN | 19.50 | 27.11 | 53 | 95 | 0.61 | 0.44 |
|  | Line |  |  | 21.26 | 31.44 | 65 | 112 |  |  |
| 138 | Lab Stretcher | PEN Control | PEN | 3.29 | 3.92 | 8 | 10 | 3.20 | off scale |
|  |  |  |  | 6.31 | 7.72 | 9 | 14 |  |  |
| 139 | Lab Stretcher | 78 | PEN | 3.49 | 4.74 | 18 | 30 | 1.92 | 0.88 |
|  |  |  |  | 5.53 | 6.75 | 16 | 21 |  |  |
| 140 | Lab Stretcher | 80 | PET | off scale | off scale | 134 | 234 | 0.35 | 0.29 |
|  |  |  |  |  |  | 194 | 359 |  |  |
| 141 | Lab Stretcher/ Line Simulation | 78 | PEN | 3.79 | 4.84 | 14 | 18 | 1.11 | 0.70 |
|  |  |  |  | 4.98 | 8.91 | 15 | 21 |  |  |

The results depicted in Table 11 clearly show that there is an unexpected difference in the surface roughness and frictional behavior of the films made on the film line, compared to films made in the laboratory.

The PEN Control (Example 138) is, as would be expected for a polyester film containing no added slip agent, quite smooth, and shows exceptionally high coefficients of friction. The PEN-surfaced multilayer film made in the laboratory (Example 139) is almost as smooth. The difference between the laboratory produced film and the PEN control is most clearly seen in the Rodenstock numbers, which are not as sensitive to long-range curvature of the specimen surface as are the Interferometry data at such low levels of surface roughness. The coefficients of friction are also somewhat lower, though still high. By contrast, the PET-surfaced multilayer film made in the laboratory (Example 140) shows exceptionally high surface roughness, as would be expected from its frosted or hazy appearance, and correspondingly low coefficients of friction.

Surprisingly, the PEN-surfaced films made on the film line (Examples 135-137) clearly show surface roughness and frictional properties intermediate between the laboratory films of similar composition and the PET-surfaced laboratory films. The stretch conditions of Example 141 more closely simulate the film line conditions, but its surface and frictional properties much more closely resemble those of the other laboratory-made film (Example 139) than the film line examples.

Figure 9A:
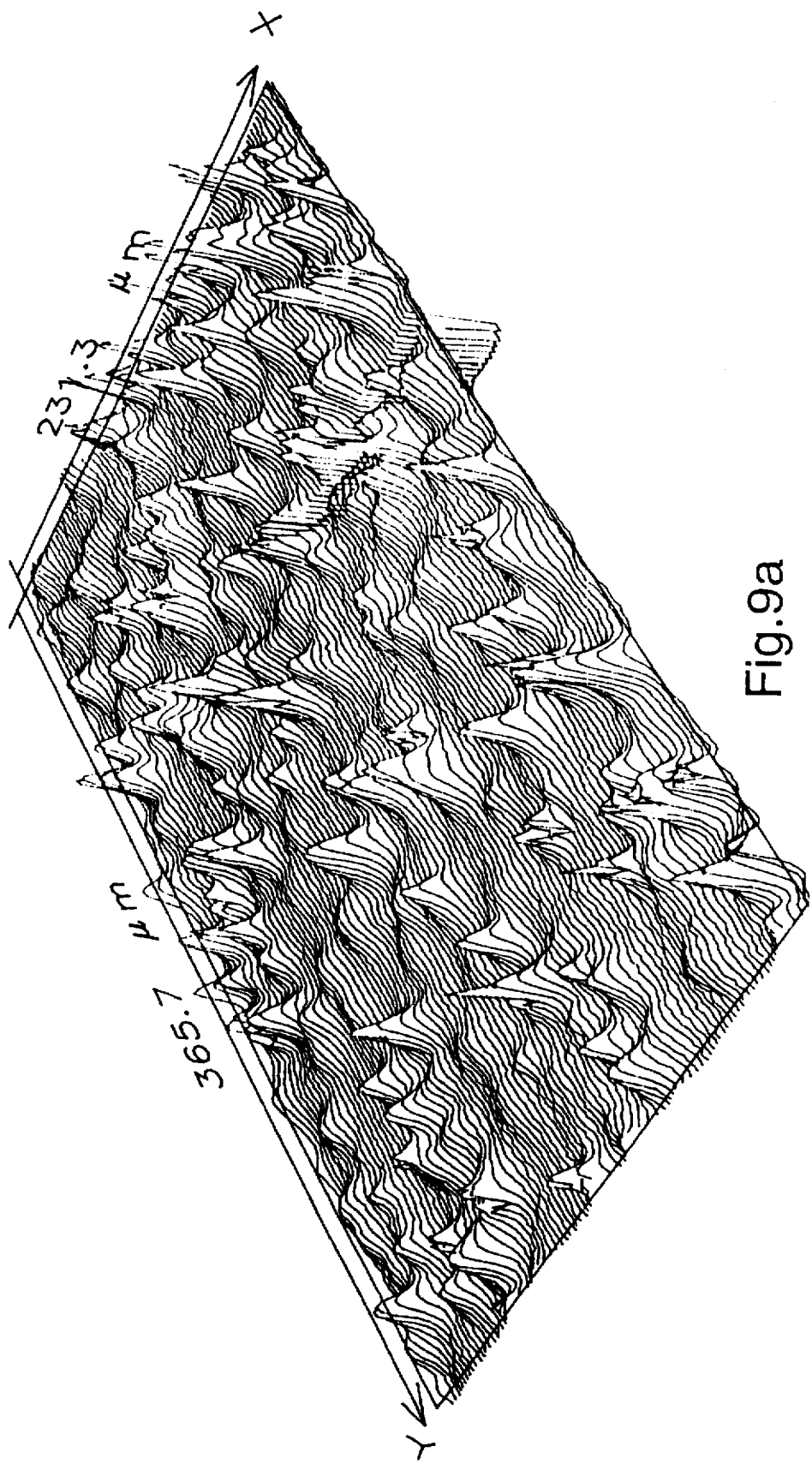
FIG. 9a is a three dimensional interferometry plot of side 1 of Example 135.
Figure 9B:
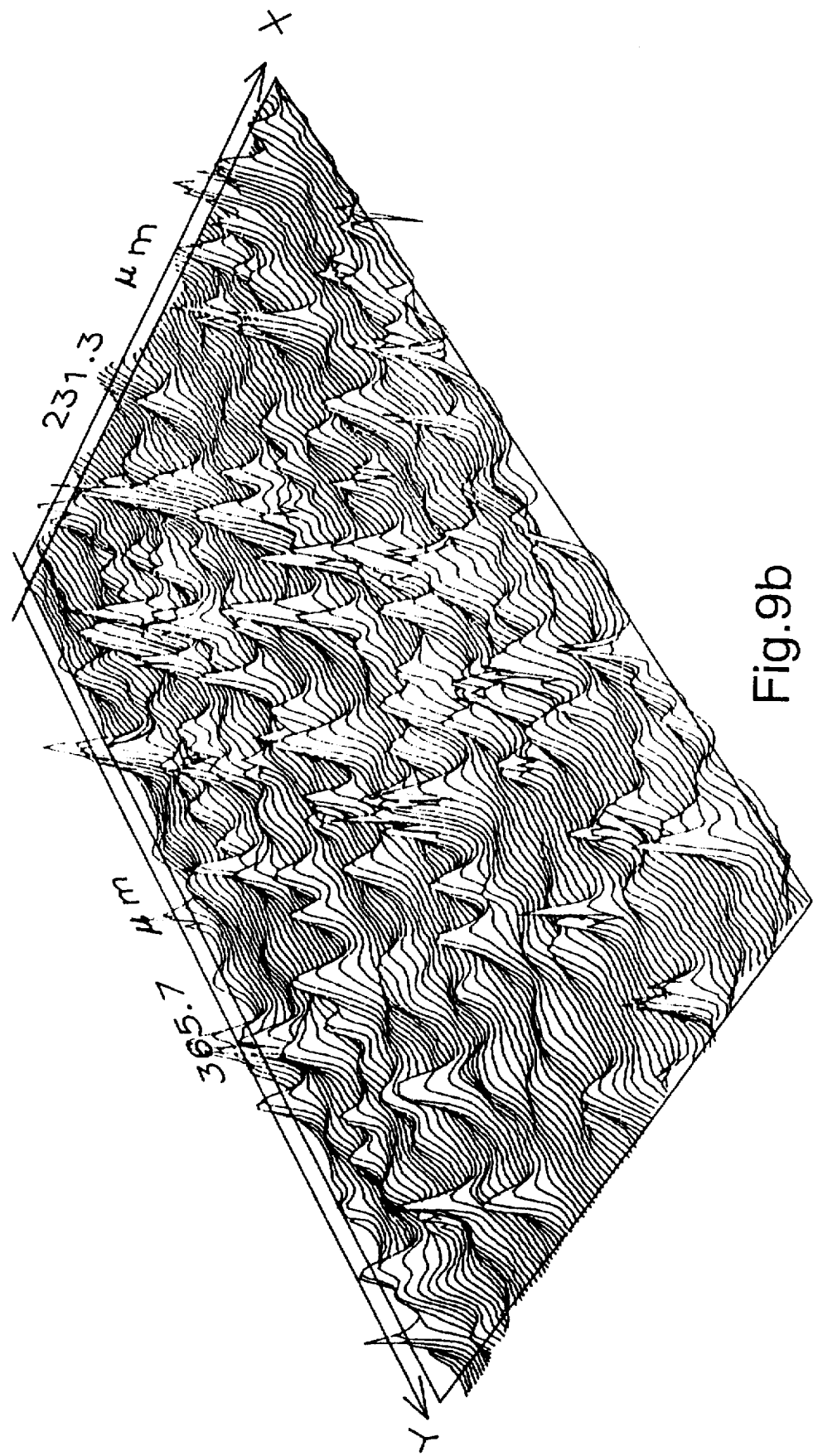
FIG. 9b is a three dimensional interferometry plot of side 2 of Example 135.
Figure 10A:
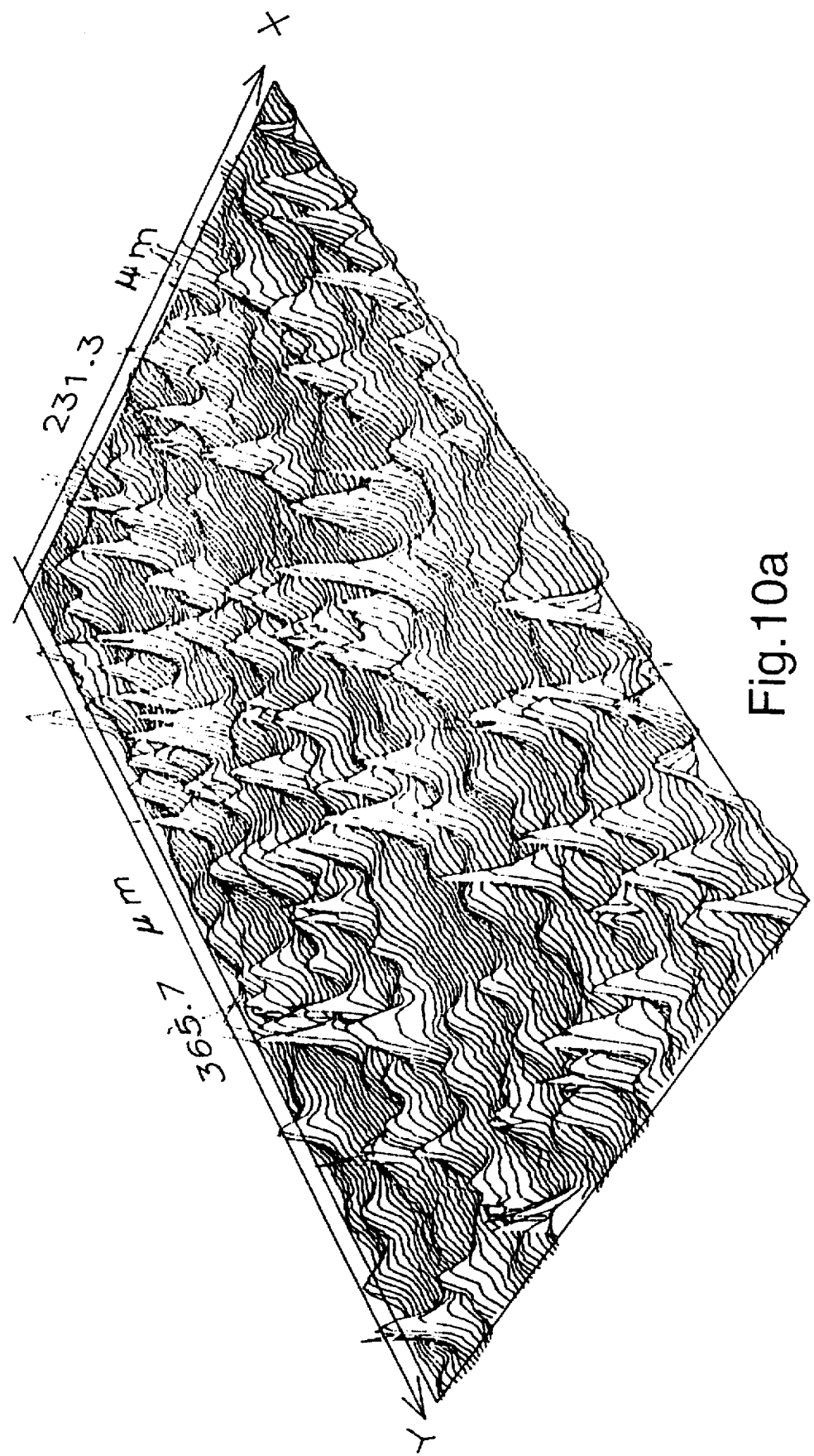
FIG. 10a is a three dimensional interferometry plot of side 1 of Example 136.
Figure 10B:
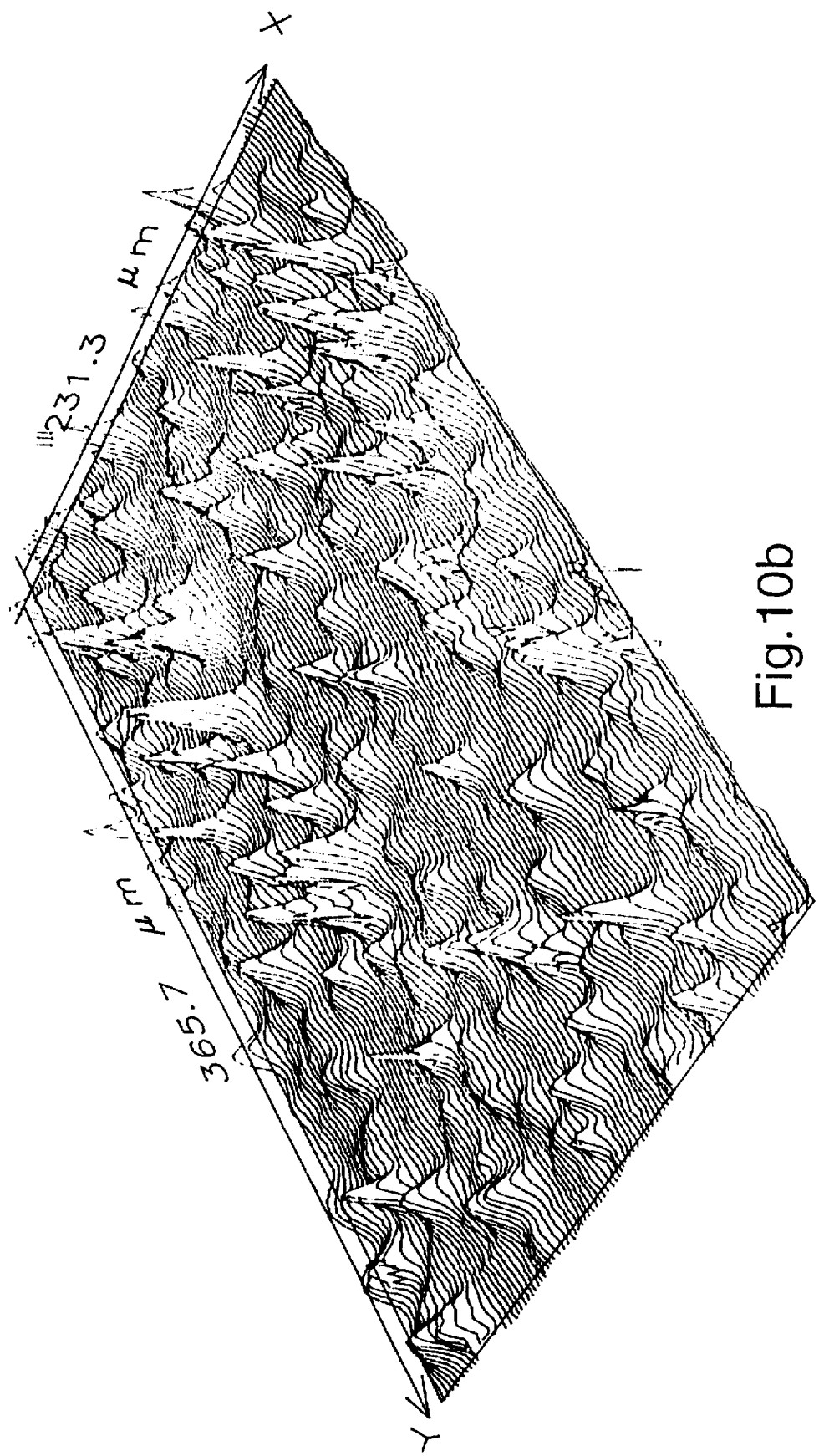
FIG. 10b is a three dimensional interferometry plot of side 2 of Example 136.
Figure 11A:
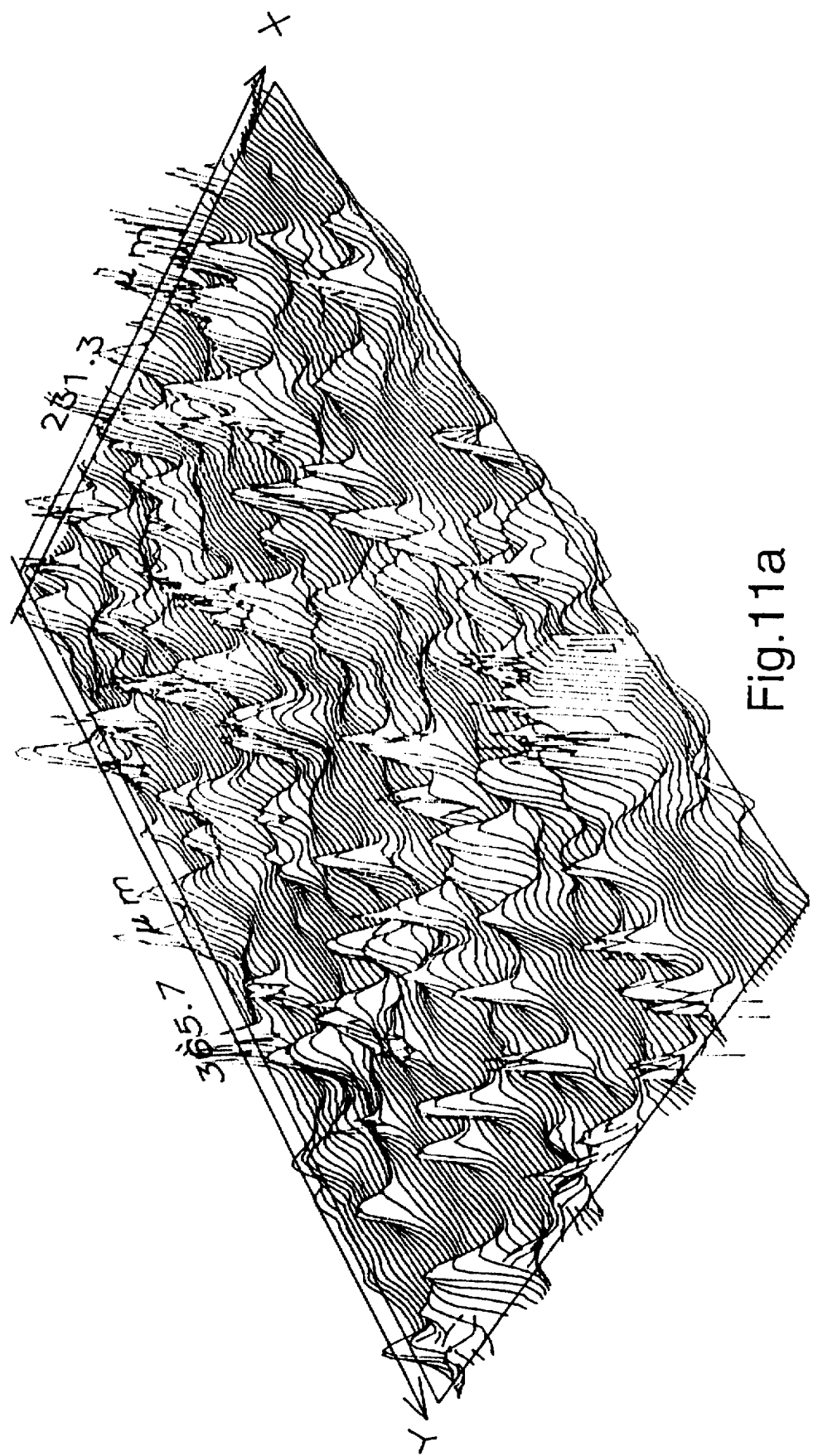
FIG. 11a is a three dimensional interferometry plot of side 1 of Example 137.
Figure 11B:
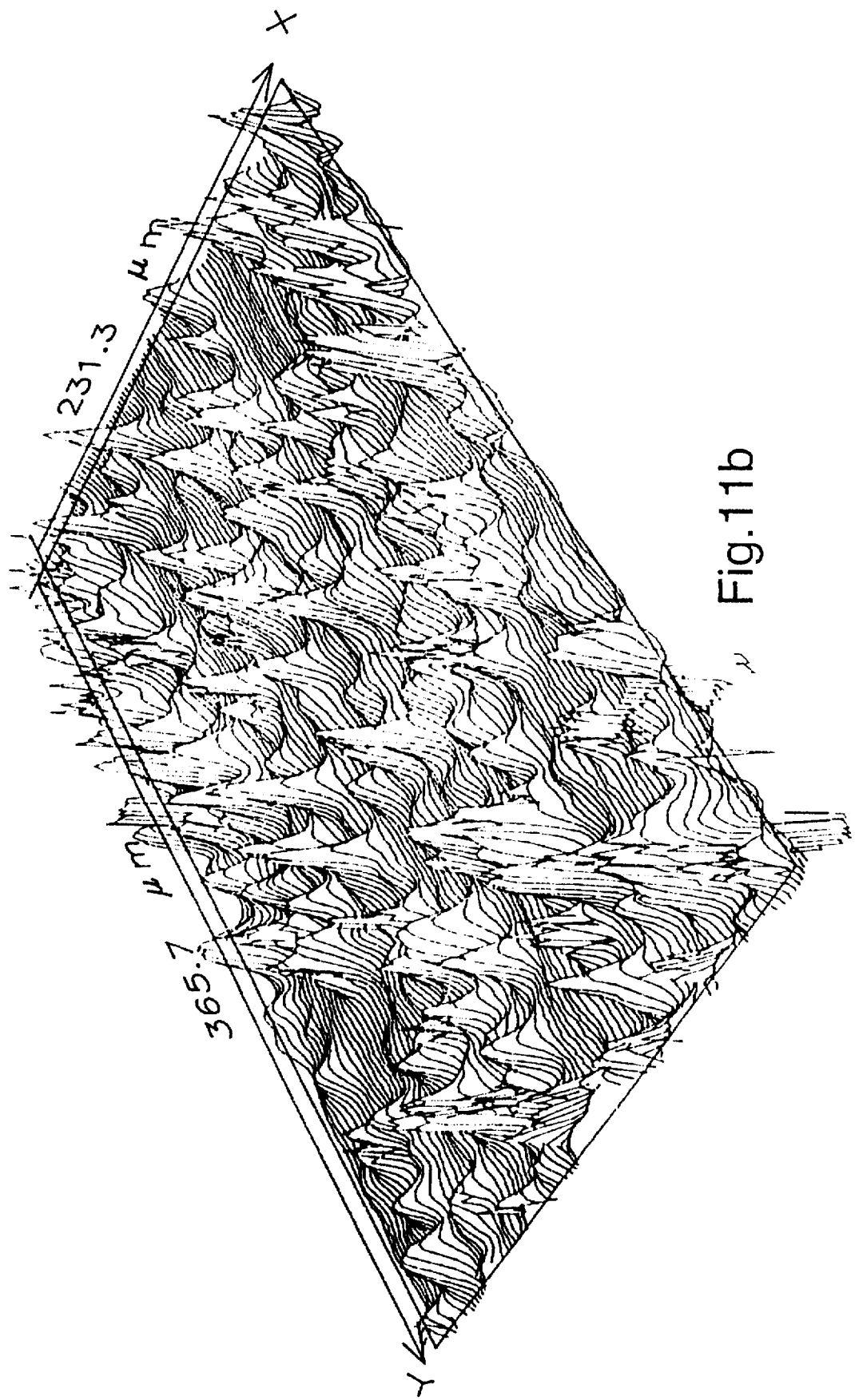
FIG. 11b is a three dimensional interferometry plot of side 2 of Example 137.
Figure 12A:
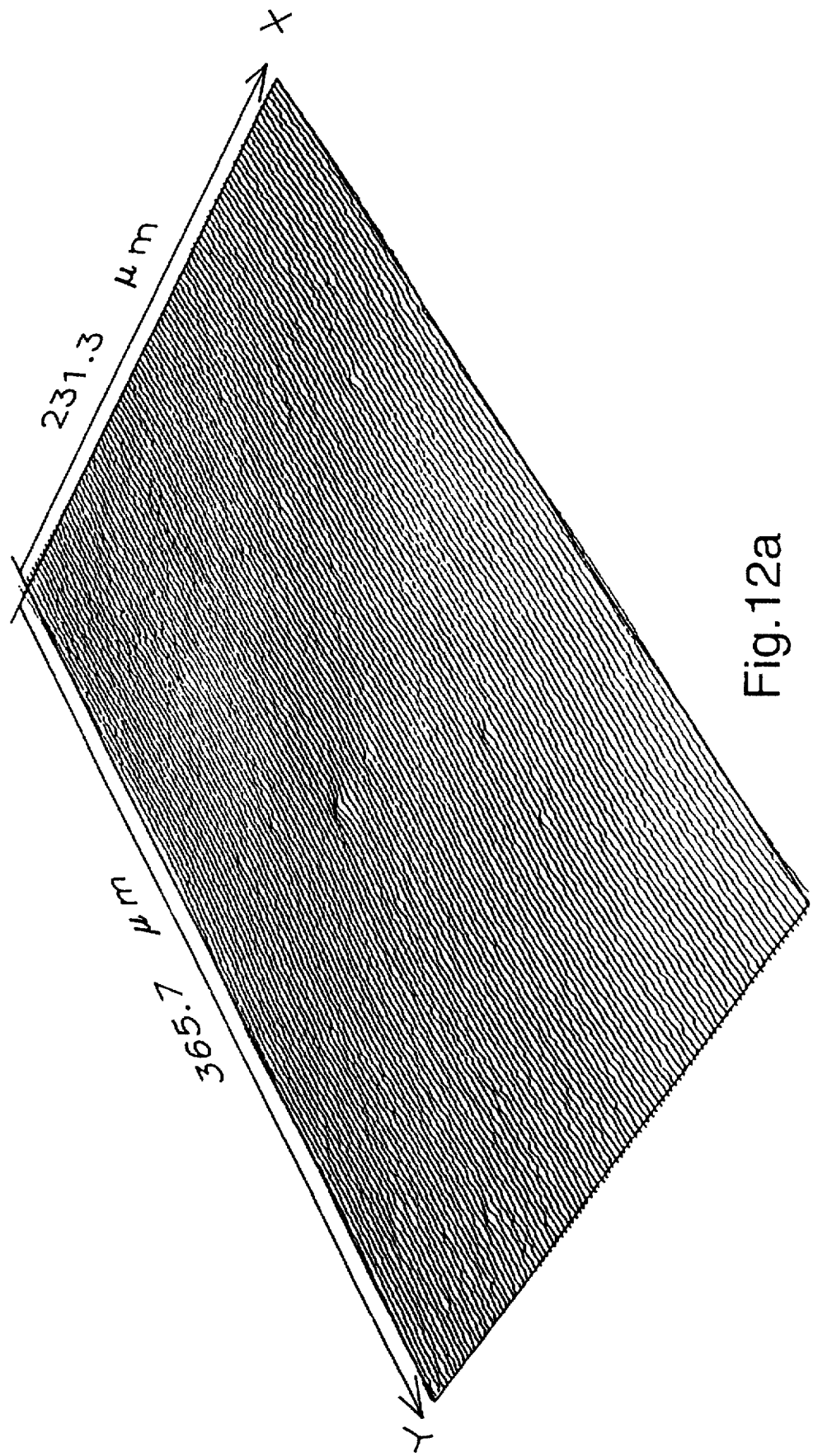
FIG. 12a is a three dimensional interferometry plot of side 1 of Example 138.
Figure 12B:
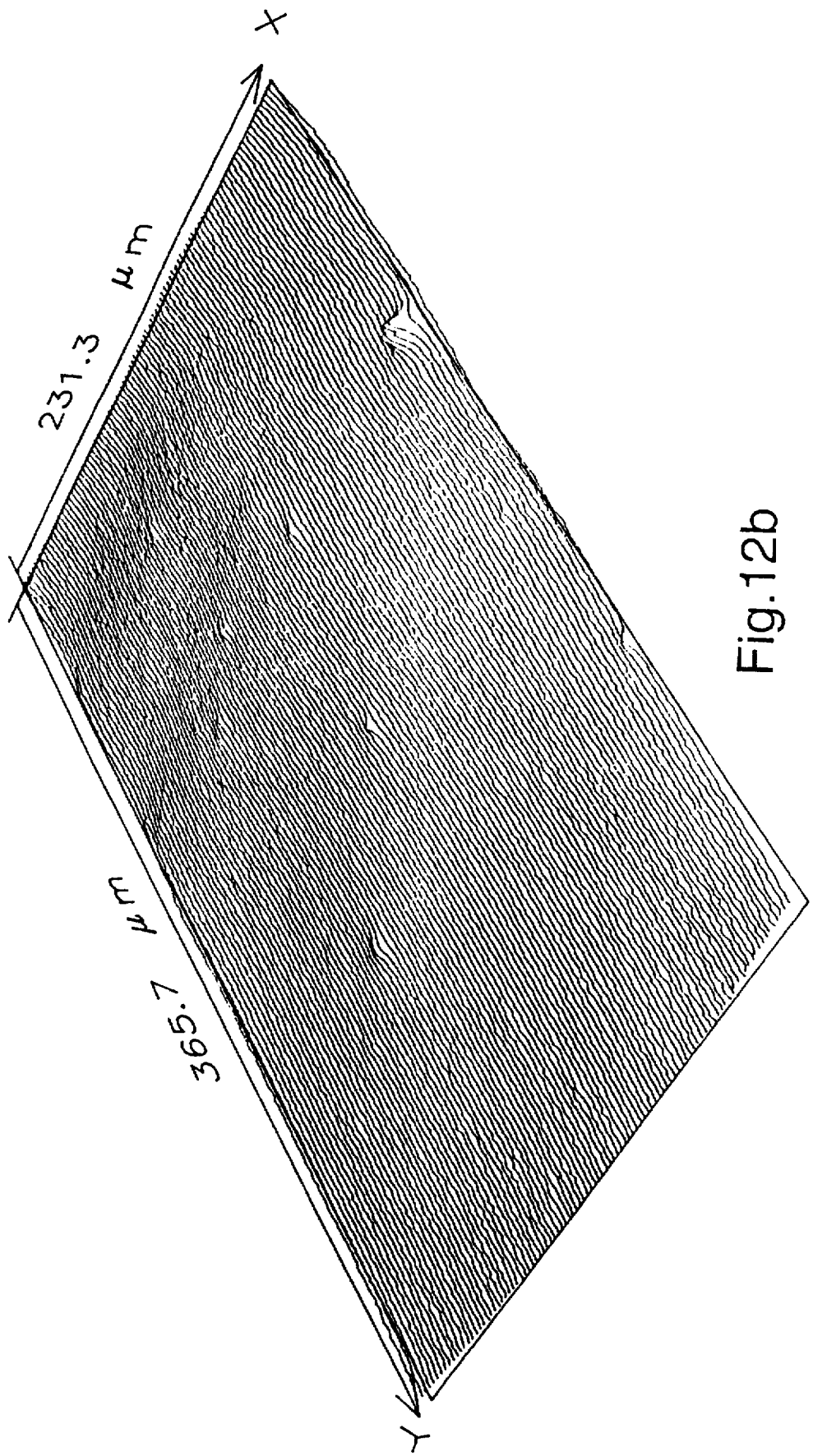
FIG. 12b is a three dimensional interferometry plot of side 2 of Example 138.
Figure 13A:
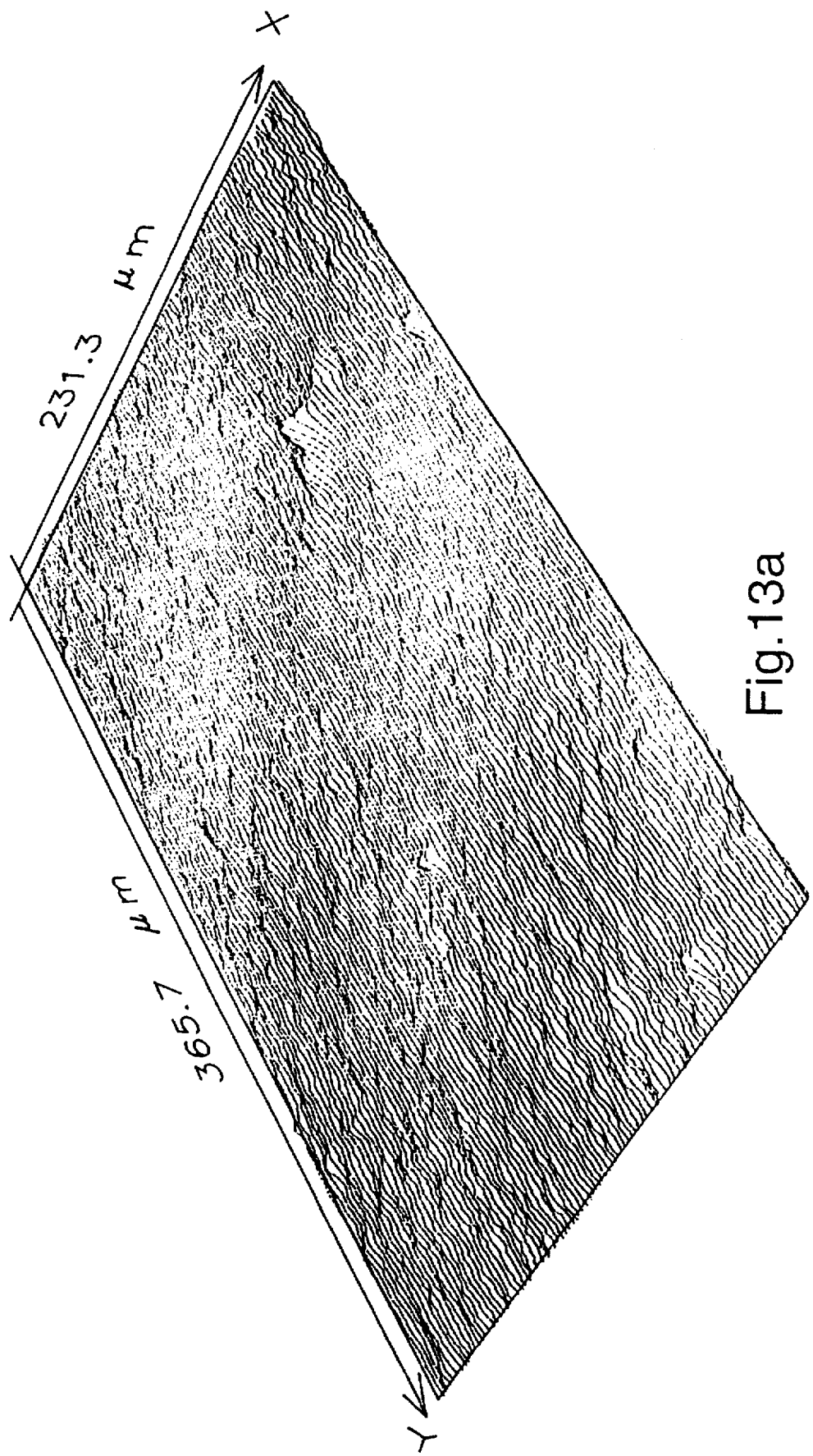
FIG. 13a is a three dimensional interferometry plot of side 1 of Example 139.
Figure 13B:
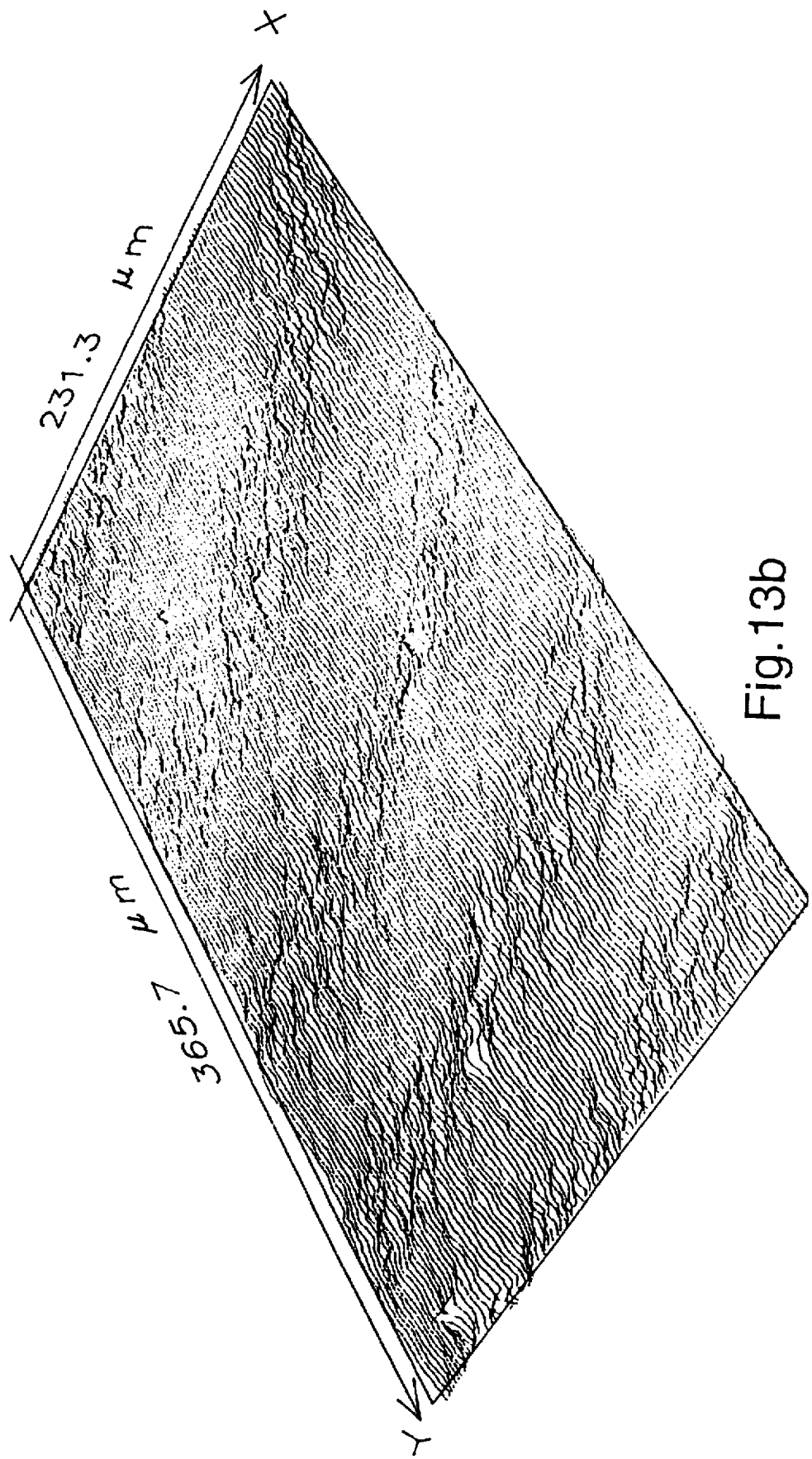
FIG. 13b is a three dimensional interferometry plot of side 1 of Example 139.
Figure 14A:
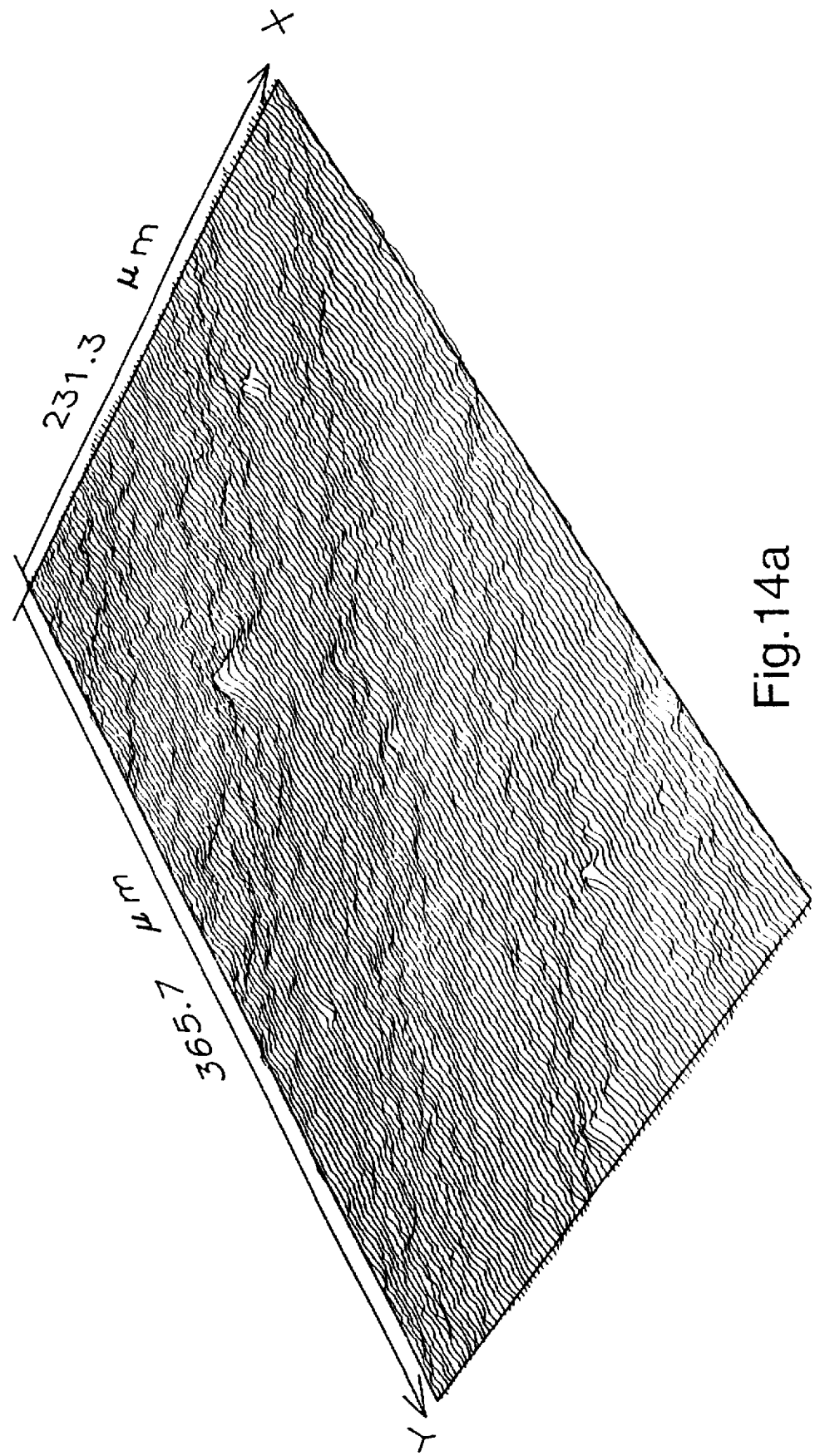
FIG. 14a is a three dimensional interferometry plot of side 1 of Example 141.
Figure 14B:
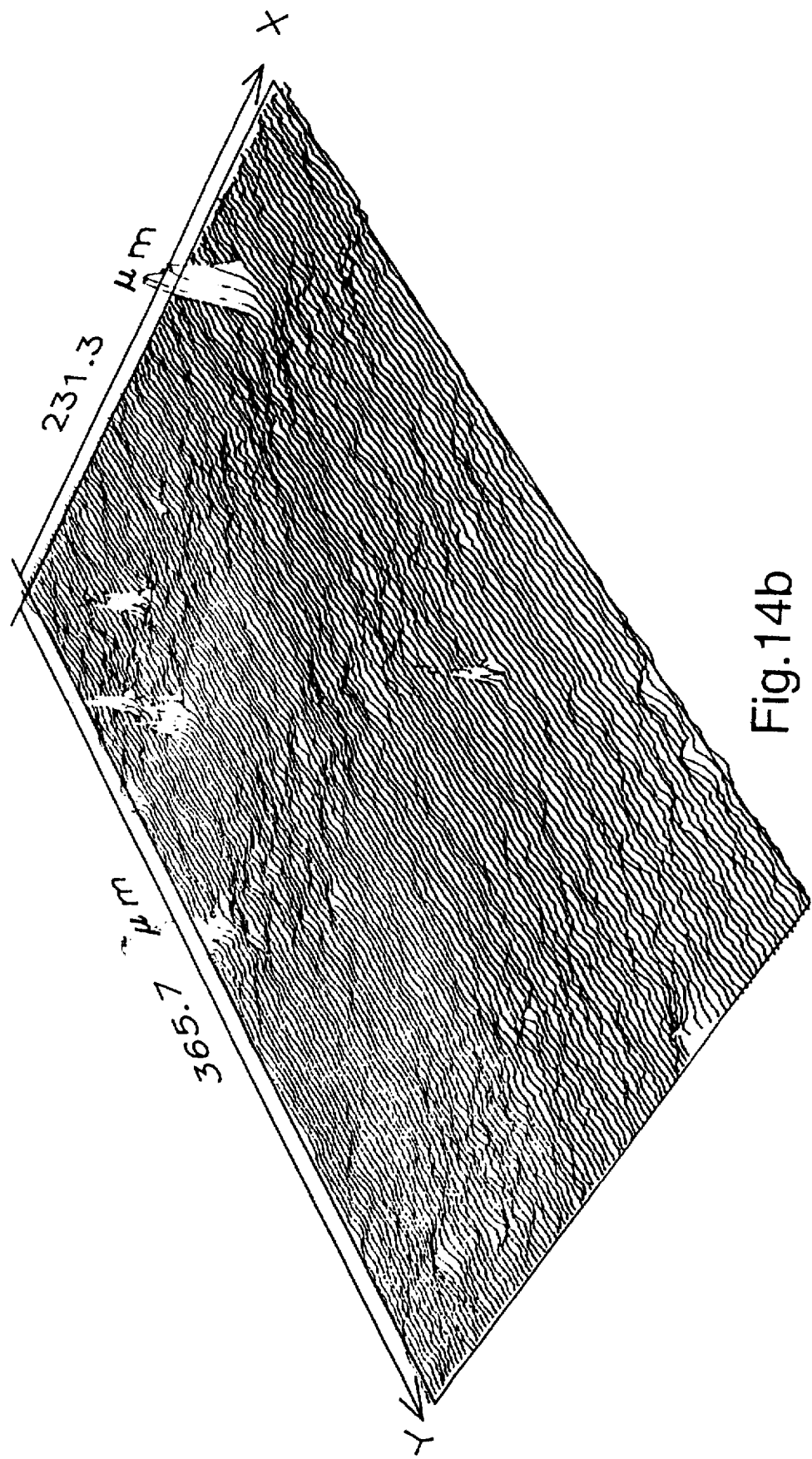
FIG. 14b is a three dimensional interferometry plot of side 1 of Example 141.

These differences can be more clearly seen in FIGS. 9–14, which show 3-dimensional plots of the Interferometry data of Examples 135-139 and 141, respectively. These figures indicate qualitatively that the PEN Control film of Example 138 and FIG. 12 is clearly the smoothest, followed by the PEN-surfaced laboratory films of Examples 139 and 141 and FIGS. 13 and 14, which closely resemble each other. The film line films of Examples 135-137 and FIGS. 9-11 are considerably rougher, and also resemble each other qualitatively. Finally, the PET-surfaced film of Ex. 140 is too rough to be measured by interferometry.

EXAMPLE 142

The following example illustrates the effect of casting on surface roughness.

Some of the cast web from the film line, made at the conditions outlined in Example 122, was collected prior to the in-line stretching steps, and was retained. In order to determine if the unusual surface roughness observed in the finished films was already present in the cast web, a specimen was analyzed by interferometry. The Ra and Rq values were 4.49 nm and 5.50 nm on one side and 4.89 nm and 6.53 nm on the other side. It was concluded that the high surface roughness was not attributable to the film casting process.

EXAMPLES 143-146

The following examples illustrate the effect of length orientation on surface roughness.

In order to confirm that the surface roughness was not caused directly by the length orientation process, Rodenstock surface roughness measurements were made on one specimen of film wound after the casting wheel with no stretching at all, and three specimens of film collected after the length orienter with no tenter stretching. Otherwise, line conditions of Examples 126–134 were used. The results are shown in Table 12:

TABLE 12

| Example No. | $T_{LO}$ (°C.) | $SR_{LO}$ | Rodenstock Ra (nm) |
|---|---|---|---|
| 143 | none | none | 19 |
| 144 | 116 | 1.34 | 18 |

TABLE 12-continued

| Example No. | $T_{LO}$ (°C.) | $SR_{LO}$ | Rodenstock Ra (nm) |
|---|---|---|---|
| 145 | 121 | 1.34 | 15 |
| 146 | 138 | 1.34 | 15 |

Since the length-oriented films (Examples 144–146) are all smoother than the cast web (Example 143), it is confirmed that roughening of the film occurs within the tenter and is not related to the roughness of the length-oriented web.

EXAMPLES 147-148

The following examples illustrate the effect of heat-setting on surface roughness.

In the preceding examples, none of the laboratory films examined for surface roughness were heat-set. To explore the possibility that the unexpected surface roughness of the film line films of Examples 135-137 was caused by the heat-setting step, two more specimens were prepared for laboratory stretching from the cast web retained from the film line Example 122. Simultaneous biaxial stretching experiments were performed at conditions similar to those of Examples 25–35, to a biaxial stretch ratio of 5.75. One film sample (Example 147) was tested as made. The other (Example 148) was heat set on a frame, using the heat-setting conditions of Examples 39–40, and was subsequently tested for surface roughness and COF. The results are shown in Table 13.

TABLE 13

| Example No. | Heat-Set | Interferometry Ra (nm) | Interferometry Rq (nm) | Rodenstock Ra (nm) | Rodenstock Rq (nm) | Static COF | Kinetic COF |
|---|---|---|---|---|---|---|---|
| 147 | NO | 3.18 | 4.04 | 16 | 22 | 4.04 | off scale |
|  |  | 4.28 | 5.23 | 18 | 26 |  |  |
| 148 | YES | 2.65 | 3.55 | 11 | 15 | 3.15 | off scale |
|  |  | 2.80 | 3.95 | 12 | 30 |  |  |

As the data demonstrates, heat setting has no roughening effect on the film, and may even be responsible for reducing the surface roughness somewhat.

In light of Examples 135–148, it appears that the unexpected surface roughness observed on the film line films, containing none of the particulate slip agents customarily used in biaxially oriented polyester films, is not due to the film casting process, the simultaneous biaxial stretching process (even when preceded by a prestretching in the machine direction), or the heat setting process.

EXAMPLES 149-191

The following examples illustrate the effect of tenter preheat on haze and roughness.

Additional experiments were performed at conditions of Examples 126–134, to determine which, if any, of the process variables had significant effects on the surface roughness of the film, as characterized by haze measurement. The process variables investigated were the temperature of the heated rolls in the length orienter ($T_{LO}$), the stretch ratio in the length orienter ($SR_{LO}$), the temperature in the preheat zone of the tenter ($T_{PH}$), the temperature in the stretch zone of the tenter ($T_{STR}$), the temperature in the first heat-set zone of the tenter ($T_{HS1}$), the temperature of the second heat-set zone of the tenter ($T_{HS2}$), the transverse direction stretch ratio in the stretch zone of the tenter as measured by grip separation ($SR_{TD}$), and the transverse direction stretch ratio after relaxation, as measured by the grip separation at the tenter exit ($SR_{REL}$).

In the length orienter, the idler rolls were maintained consistently at 6° C. warmer than the slow driven rolls. Thus, only the temperature of the driven rolls is listed in Table 14. In some examples, the length orienter was bypassed altogether to examine the effect of using only the simultaneous-biaxial tenter to stretch the film.

Table 14 contains the experimental conditions, the measured values for Haze, and some measured values for surface roughness. The latter were obtained by the Rodenstock method, and represent the average value of both sides. The table is arranged in order of increasing preheat zone temperature, and some of Examples 126–134 are relisted for clarity.

TABLE 15

| TPH (°C.) | Haze (%) |
|---|---|
| 153 | 1.1 |
| 154 | 1.1 |
| 157 | 1.8 |
| 159 | 2.6 |
| 160 | 4.6 |
| 161 | 8.6 |
| 162 | 11.7 |
| 163 | 10.7 |
| 166 | 8.3 |
| 168 | 28.7 |

An effect on haze of secondary importance is observed in the data of Examples 182–188. From these examples, it can be seen that raising the temperature of the heated rolls in the length orienter serves to reduce the haze in the case of tenter

TABLE 14

| Ex. No. | $T_{LO}$ (°C.) | $SR_{LO}$ | $T_{PH}$ (°C.) | $T_{STR}$ (°C.) | $T_{HS1}$ (°C.) | $T_{HS2}$ (°C.) | $SR_{TD}$ | $SR_{REL}$ | Haze (%) | Rod'c Ra (nm) |
|---|---|---|---|---|---|---|---|---|---|---|
| 149 | none | none | 153 | 153 | 193 | 216 | 4.38 | 4.02 | 1.1 | |
| 150 | 102 | 1.31 | 154 | 156 | 182 | 216 | 4.40 | 4.03 | 1.1 | |
| 151 | none | none | 157 | 156 | 193 | 216 | 4.38 | 4.02 | 1.8 | |
| 152 | none | none | 157 | 156 | 193 | 216 | 4.62 | 4.24 | 1.8 | |
| 153 | 102 | 1.31 | 159 | 156 | 177 | 216 | 4.40 | 4.03 | 2.6 | |
| 154 | 118 | 1.41 | 160 | 160 | 216 | 199 | 4.98 | 4.98 | 4.6 | |
| 155 | 102 | 1.31 | 161 | 156 | 177 | 216 | 4.40 | 4.03 | 3.7 | |
| 156 | none | none | 161 | 156 | 193 | 216 | 4.62 | 4.24 | 4.2 | 27 |
| 157 | 118 | 1.35 | 161 | 160 | 204 | 193 | 4.48 | 4.48 | 5.3 | |
| 158 | 118 | 1.34 | 161 | 160 | 215 | 198 | 4.98 | 4.98 | 5.8 | |
| 159 | 118 | 1.44 | 161 | 160 | 215 | 198 | 4.48 | 4.48 | 6.3 | |
| 160 | 124 | 1.41 | 161 | 160 | 215 | 198 | 4.98 | 4.98 | 8.4 | |
| 161 | 118 | 1.34 | 161 | 160 | 215 | 198 | 4.48 | 4.48 | 13.5 | |
| 162 | 118 | 1.34 | 161 | 160 | 215 | 198 | 4.73 | 4.73 | 15.1 | |
| 163 | 118 | 1.35 | 161 | 160 | 204 | 193 | 4.48 | 4.23 | 15.3 | |
| 164 | 118 | 1.33 | 162 | 149 | 232 | 199 | 5.31 | 5.10 | 8.6 | |
| 165 | 118 | 1.33 | 162 | 149 | 232 | 199 | 5.08 | 4.91 | 11.0 | |
| 166 | 118 | 1.33 | 162 | 149 | 232 | 199 | 5.08 | 4.88 | 15.7 | |
| 167 | 118 | 1.35 | 163 | 163 | 193 | 216 | 4.62 | 4.49 | 6.7 | 71 |
| 168 | 118 | 1.35 | 163 | 163 | 193 | 193 | 4.62 | 4.49 | 7.7 | |
| 169 | 118 | 1.35 | 163 | 163 | 216 | 193 | 4.62 | 4.49 | 8.3 | 84 |
| 170 | 118 | 1.35 | 163 | 163 | 216 | 216 | 4.62 | 4.24 | 8.8 | 126 |
| 171 | 118 | 1.35 | 163 | 163 | 216 | 193 | 4.62 | 4.24 | 8.9 | 83 |
| 172 | 118 | 1.35 | 163 | 163 | 193 | 216 | 4.62 | 4.24 | 9.1 | 102 |
| 173 | 118 | 1.33 | 163 | 149 | 215 | 198 | 5.08 | 4.95 | 9.9 | |
| 174 | 118 | 1.35 | 163 | 163 | 204 | 193 | 4.62 | 4.36 | 10.2 | 113 |
| 175 | 118 | 1.35 | 163 | 163 | 204 | 204 | 4.62 | 4.36 | 10.3 | 114 |
| 176 | 118 | 1.31 | 163 | 163 | 216 | 199 | 4.98 | 4.98 | 11.8 | |
| 177 | 118 | 1.33 | 163 | 149 | 215 | 198 | 4.54 | 4.42 | 12.3 | |
| 178 | 118 | 1.35 | 163 | 163 | 216 | 216 | 4.62 | 4.49 | 12.7 | 208 |
| 179 | 118 | 1.35 | 163 | 163 | 204 | 204 | 4.62 | 4.24 | 14.8 | 118 |
| 180 | 118 | 1.41 | 163 | 163 | 216 | 199 | 4.98 | 4.98 | 17.0 | |
| 181 | 118 | 1.28 | 163 | 163 | 216 | 199 | 4.54 | 4.41 | 26.6 | |
| 182 | 118 | 1.35 | 163 | 156 | 177 | 216 | 4.40 | 4.03 | 5.7 | |
| 183 | 116 | 1.35 | 163 | 156 | 177 | 216 | 4.40 | 4.03 | 6.9 | |
| 184 | 110 | 1.31 | 163 | 156 | 177 | 216 | 4.40 | 4.03 | 8.1 | |
| 185 | 113 | 1.35 | 163 | 156 | 177 | 216 | 4.40 | 4.03 | 8.6 | |
| 186 | 107 | 1.31 | 163 | 156 | 177 | 216 | 4.40 | 4.03 | 8.7 | |
| 187 | 102 | 1.31 | 163 | 156 | 177 | 216 | 4.40 | 4.03 | 9.8 | |
| 188 | none | none | 163 | 156 | 193 | 216 | 4.62 | 4.24 | 12.4 | |
| 189 | none | none | 166 | 157 | 193 | 216 | 4.62 | 4.24 | 4.2 | |
| 190 | none | none | 166 | 160 | 193 | 216 | 4.62 | 4.24 | 12.3 | |
| 191 | 124 | 1.34 | 168 | 148 | 213 | 199 | 5.02 | 4.99 | 28.7 | |

Standard statistical analysis of this data indicates that the most significant process variable with respect to haze is the temperature in the preheat zone of the tenter. This is made clearer in Table 15 below, which shows the average value of haze for each value of $T_{PH}$, regardless of the values of the other process parameters.

preheat zone and stretch zone temperatures of 163° and 156° C., respectively.

Without wishing to be bound by any particular theory, it appears that the surface roughness and haze of PEN:PET multilayer films containing PEN as each surface layer, is caused by the crystallization of PET layers during preheating (before stretching), and subsequent breakup and rearrangement of the PET crystallites during stretching. In the absence of any stretching in a length orienter prior to the simultaneous-biaxial tenter, the PET layers crystallize to a greater extent as the preheat temperature is raised. The thus-formed crystallites in the PET layers nearest to the surface are separated from one another during the biaxial stretching step, and serve to provide surface roughness through the outermost PEN layer, much as marbles might provide visible lumps if placed under a carpet. If the film is first stretched somewhat in a length orienter, the increased temperature in the length orienter may serve either to inhibit the formation of large PET crystallites in the tenter preheat zone, or to promote the deformation upon subsequent biaxial stretching of those which do form.

EXAMPLES 192–201

The following examples illustrate the effect of preheating time on surface roughness, haze, film color and modulus.

The single aspect of a film line most difficult to simulate in a laboratory stretching apparatus is the time-temperature history of the film as it traverses the film line. This difficulty is inherent in the difference between moving a web from chamber to chamber, each maintained at a different temperature (film line), and changing the temperature of the surrounding air in a single chamber (laboratory film stretcher). This time-temperature history, particularly the preheating time prior to the simultaneous biaxial stretching step, is a significant difference between the film line conditions and the laboratory simulations.

A series of experiments was therefore performed to explore the effect of varying the preheating time prior to stretching. Specimens of the cast web retained from the film line experiment (Experiment 122) were prepared for laboratory stretching. All were stretched in both directions simultaneously at 100%/sec to a biaxial stretch ratio of 5.5 at 150° C. The amount of time allowed for preheating the undrawn specimen at 150° C. was varied in 5 second increments from 0 to 45 seconds (45 seconds was the value used in all of the preceding laboratory stretching Examples). In addition, for each preheat duration examined, a second cast web sample was mounted in the laboratory stretcher, preheated, and removed immediately without undergoing the simultaneous biaxial stretch.

The preheated but unstretched specimens were examined visually, side by side, for haziness. At 150° C., the PET layers would be expected to crystallize into a spherulitic morphology, causing haze or whitening. This process would be expected to be much slower for the slower-crystallizing PEN layers. Thus, an increase in haze in the preheated but unstretched web specimens can be attributed to crystallization of the PET layers. Several specimens were examined "on edge" under a microscope, and it was confirmed that the haziness or whitening occurred only in the PET layers. The stretched films were also inspected visually, side by side, for haziness. Those experienced in the art recognize that haze in finished film can be highly correlated to surface roughness, especially at the high levels of surface roughness exhibited in Examples 135–137. The data of Table 14 serves to corroborate this relationship. Thus, the qualitative assessment of haze in the stretched films was taken as an indication of surface roughness. The films were also inspected visually for color/iridescence. The presence of bands of color running along the specimen's original machine direction, or, alternatively, uniform iridescence, was noted.

Modulus measurements were taken in both the machine and transverse directions. Since the films had been equally and simultaneously biaxially drawn, these modulus results were averaged over the two directions. The results are shown in Table 16.

TABLE 16

| Example No. | Preheat time, sec. | Unstretched Haze | Stretched Film Haze | Stretched Film Color | Modulus, kpsi ($10^6$ kPa) |
| --- | --- | --- | --- | --- | --- |
| 192 | 0 | None | — | — | — |
| 193 | 5 | None | None | Banded | 976 (6.73) |
| 194 | 10 | None | None | Banded | 977 (6.74) |
| 195 | 15 | Slight | Some | Banded | 982 (6.77) |
| 196 | 20 | Increased | Maximum | Less Banded | 1064 (7.34) |
| 197 | 25 | Increased | Some | Less Banded | 1060 (7.31) |
| 198 | 30 | Increased | Some | Less Banded | 1051 (7.24) |
| 199 | 35 | Increased | None | Iridescent | 1042 (7.18) |
| 200 | 40 | Increased | None | Iridescent | 1051 (7.25) |
| 201 | 45 | Unchanged | None | Iridescent | 1020 (7.03) |

Examining these results, it is clear that the PET layers crystallize increasingly with preheating time, perhaps leveling off at 40–45 seconds. However, stretched film haze and, by extension, surface roughness, goes through a maximum at about 20 seconds preheat time, eventually disappearing for the specimens preheated for about 35 seconds or more. The disappearance of haze is accompanied by the dissolution of the color banding into uniform overall iridescence. Recalling that the film line tenter conditions of Example 122 provided a preheating time of about 18 seconds, and only 6 seconds more in the stretch zone, it appears likely that this is the cause of the color banding and haze noted in Examples 122–124, and thus, the surface roughness observed in Examples 135–137.

Examination of the data in Table 16 also leads to the conclusion that there are at least two accessible "levels" of stretched film modulus, depending on duration of preheating. The films from Examples 193–195 (5–15 second preheat time) had a modulus of about 980 kpsi (6.76×$10^6$ kPa). The films from Examples 196–200 (20–40 second preheat time) had a modulus of about 1050 kpsi (7.24×$10^6$ kPa). This suggests that the modulus may be beginning to decline at still longer preheat durations.

Without wishing to be bound by any particular theory, the following explanation for these observations appears plausible: The PET layers in the multilayer cast web begin to crystallize during the preheating step in the simultaneous biaxial tenter or lab stretcher. If the film is stretched before this process has had enough time to result in a significant number of spherulitic structures of sizes larger than optical wavelengths, such structures do not form during the stretching step either, and the resulting film remains clear. Because the preheated but unstretched web consists of largely amorphous layers of both PEN and PET, and because the stretching temperature is so much higher than the Tg of PET, the PET layers deform without significant strain-hardening (i.e., there is viscous flow), and contribute relatively less to the overall modulus of the stretched film.

If, however, the PET layers are allowed to spherulitically crystallize to a moderate extent before stretching commences, a sufficient entanglement network, anchored by crystallites, exists in the PET to effectively transmit stretching forces and cause strain-hardening in the PET layers. This results in a relatively increased contribution of the PET layers to the overall modulus of the stretched film, but does nothing to disrupt the spherulitic structures already formed. Thus, the preheated web's haze remains in the stretched film. Ultimately, if the PET layers are allowed to crystallize still further, the crystallite-anchored entanglement network is strong enough to transmit stretching forces and cause strain-hardening, and to disrupt the pre-existing spherulitic structures in the PET layers. The efficiency of the network in transmitting stretching forces is indicated by the dissolution of the color banding into uniform iridescence, which implies that local thickness and/or orientational gradients have disappeared. The disruption of the spherulites is implied by the disappearance of haze during the stretching step. For haze to disappear, structures large enough to diffract light must be broken up or otherwise reformed into structures of much smaller size. This is observed in the uniaxial and/or biaxial orientation of some semicrystalline polymers such as polyethylene and polypropylene, both of which can be stretched while in the semicrystalline state, and can be made to clarify to some extent due to the reorganization of spherulites and large lamellar bundles into smaller lamellar bundles or fibrillar or rodlike structures.

PET, however, is known not to be highly stretchable once crystallized into spherulitic structures, and has not previously been observed to clarify during orientational stretching. This unexpected result, combined with the observation, in the discussion accompanying Examples 45-57, of the consistency of the observed modulus values with an unprecedented level of modulus within the PET layers, argues that the orientation of the PET layers in the PEN:PET multilayer compositions occurs by a unique and novel mechanism for orientational deformation of PET.

Additional insight into the utility of the multilayer construction for promoting this deformational mechanism can be gained by further examination of the differences between PEN-surfaced and PET-surfaced multilayer films. In Examples 114-117 and 138-140, it was observed that the PET-surfaced films were rougher, slipperier, and hazier than PEN-surfaced films of similar composition. This can be interpreted as a manifestation of the uniqueness of the PET surface layers, compared to internal PET layers in a multilayer construction. Having no overlying PEN layer on one surface, outermost PET layers behave more like conventional free-standing PET films. After crystallizing in a preheat step, stretching causes them to break up, resulting in a patchy, frosty hazed appearance, high (often off-scale) surface roughness, and very low coefficients of friction.

On the other hand, PET layers in the interior of the multilayer construction stretch, without breaking, to stretch ratios much higher than those commonly observed for the biaxial orientation of free-standing monolayer PET films. Depending on the preheating conditions, spherulites may or may not break up or deform into smaller structural units. If not, they provide a "lumpiness" underneath the PEN surface layer, which results in surface roughness in much the same way that placing marbles under a carpet would create a bumpy floor covering.

It will be clear to one skilled in the art, from the foregoing discussion, that the level of surface roughness will be controllable by, among other things, the time-temperature history of the cast web prior to the beginning of stretching, and the details of construction of the multilayer film. The latter include, but are not limited to, the proportion of the two polymers in the construction, the thickness of the PEN surface layers, and the thicknesses of the PET layers nearest the surface. As such, the constructions of the present invention also constitute, unexpectedly, a unique and novel "slip" system for polyester films, which is not dependent on the addition of any particulate substances in any amount.

EXAMPLES 202-203

The following examples corroborate the assumption of an efficient entanglement network with crystalline junctions in the well-crystallized PET layers obtained through long preheat times.

The laboratory stretcher was equipped with force transducers on about half of the grippers, so that stretching force data could be obtained. The stretcher was also adjusted so that a nominal stretch ratio of 6.25 (rather than 6.0) could be achieved. Specimens for stretching were prepared from the retained cast web of Example 122. Stretching was once again done in the simultaneous biaxial mode, at 100%/sec in each direction, to a biaxial draw ratio of 6.25 at 150° C., after preheating at the same temperature.

Example 202 was stretched after preheating for 45 seconds, and Example 203 was stretched after preheating for only 10 seconds. At these conditions, both cast web specimens should be thoroughly preheated throughout their thickness, but the specimen of Example 202 should have well-crystallized PET layers, while the specimen of Example 203 should have almost no crystallinity. Since the stretching experiments were performed equally and simultaneously in both the machine and transverse directions, the output from all force transducers was averaged for each example.

Figure 15:
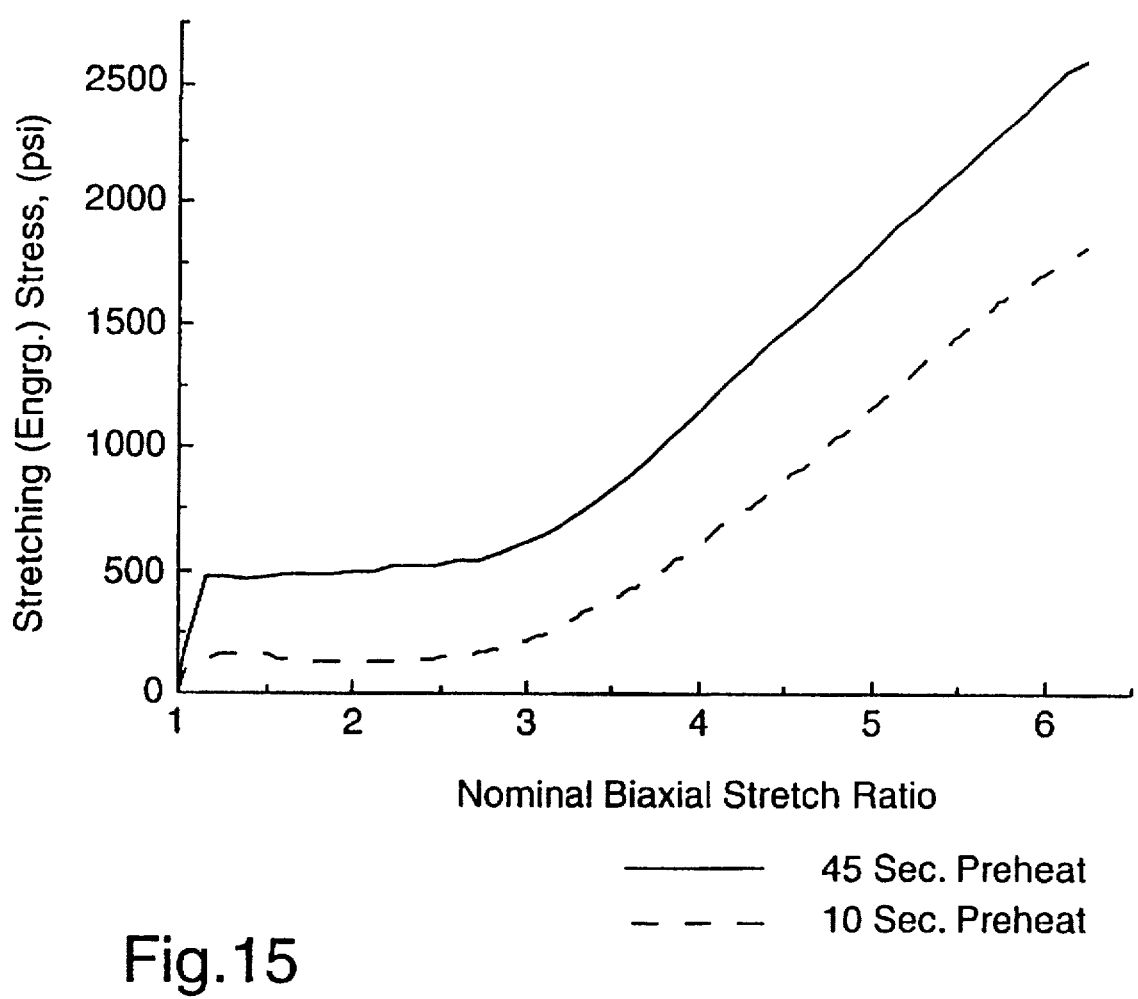
FIG. 15 is a graph depicting the engineering stress as a function of draw ratio for Examples 202 and 203.

The results of the stretching experiments are shown in FIG. 15. It is readily apparent that there are two main differences between the stress-strain traces. First, Example 202 exhibits a sharp sudden rise in force immediately upon the commencement of draw, which is not present in Example 203. Secondly, once strain-hardening commences at a draw ratio of about 3.0, the slope of Example 202 rises faster than that of Example 203.

These results are consistent with the interpretation that the crystalline structures in the PET layers of the specimen in Example 202 must initially be broken up, requiring considerable force. The uncrystallized PET layers in the specimen of Example 203 require no such high force to deform. Further, the steeper rise in the strain-hardening region in Example 202 is consistent with an interpretation of more efficient orientational deformation resulting in strain-hardening of the PET layers as well as the PEN layers.

Figure 16:
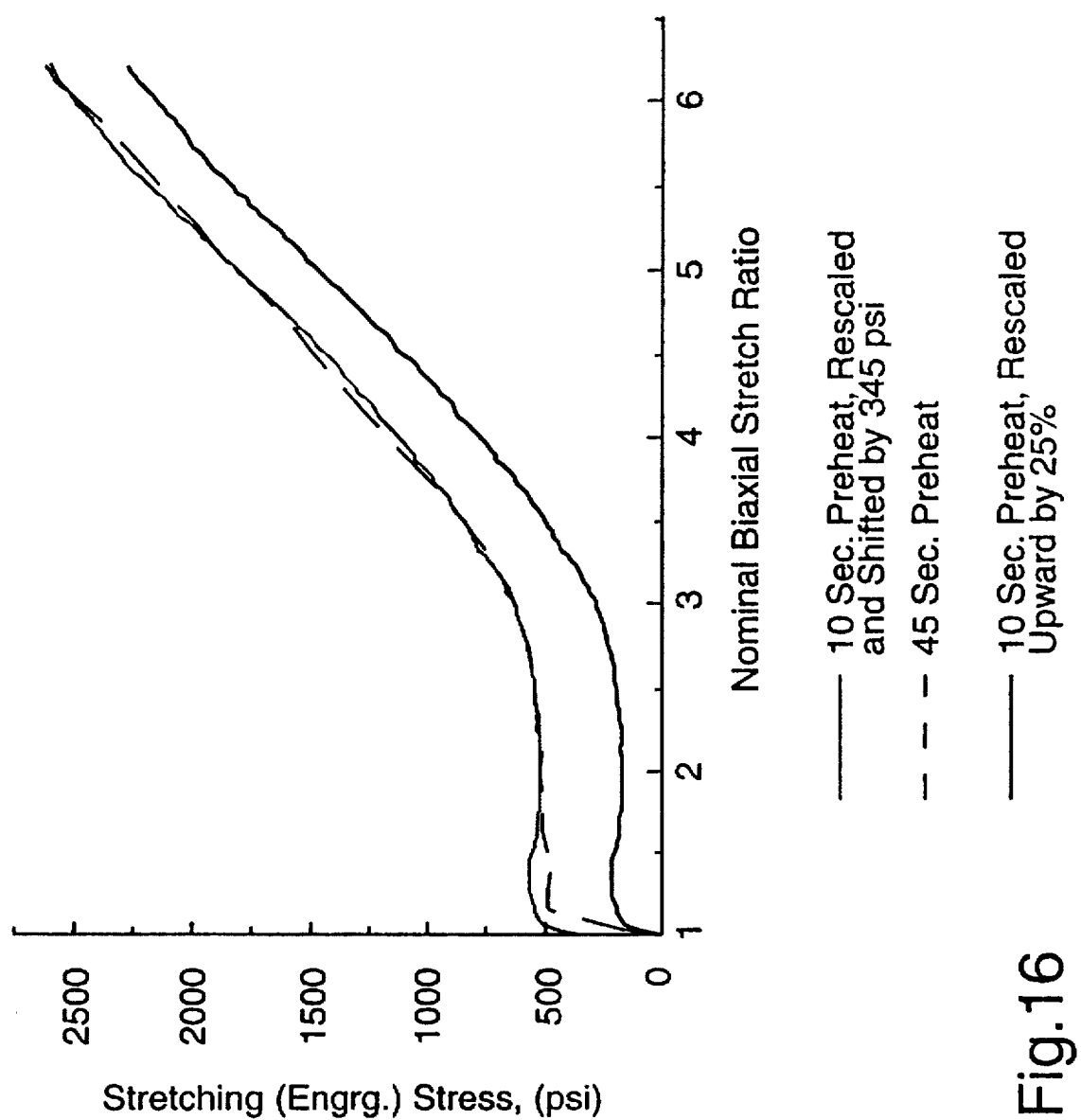
FIG. 16 is a graph depicting the engineering stress as a function of draw ratio for Examples 202 and 203.

This interpretation leads to the conclusion that the uncrystallized PET layers of the specimen of Example 203 contribute negligibly to the overall stretching stress. This implication can be tested by rescaling the stress trace of Example 203. Since the specimen is 80% PEN and 20% PET, if the PET contributes negligibly, the entire specimen would be expected to behave similarly to a monolayer specimen of PEN having 80% of the cast thickness. Since stress is force divided by cross-sectional area, this is equivalent to rescaling the stress upwards by 125%. This is shown in FIG. 16, in which the stress trace for Example 203 has been both rescaled and shifted upward for clarity to match the trace of Example 202 in the plateau region.

7 seconds (the best estimate of the time required for the surfaces of the specimen to reach the preheat/stretch temperature), 15 seconds (as an estimate of the time required for the specimen to approach the preheat/stretch temperature throughout its thickness), and 45 seconds (the standard preheat time used in most prior lab stretcher experiments. The conditions tested are shown in Table 17, which shows the example number for each set of variables explored.

TABLE 17

| Preheat/Stretch Temp. (C.) | 120 | 125 | 130 | 135 | 140 | 145 | 150 | 155 | 160 | 170 |
|---|---|---|---|---|---|---|---|---|---|---|
| Preheat Time (sec) | Ex. No. | | | | | | | | | |
| 7 | 204 | 205 | 206 | 207 | 208 | 209 | 210 | 211 | 212 | — |
| 15 | 213 | 214 | 215 | 216 | 217 | 218 | 219 | — | — | — |
| 45 | 220 | 221 | 222 | 223 | 224 | 225 | 226 | — | 227 | 228 |

These results confirm that the PET layers, if not crystallized, largely deform during stretch by non-strain hardening means (viscous flow). When crystallized through sufficient preheating, however, the PET layers deform first by destruction or re-organization of the existing crystal structure, followed by strain-hardening similar to that occurring in the PEN layers.

EXAMPLES 204–228

The following examples illustrate the effect of preheating conditions during length orientation on haze and uniformity.

Since the design of the film line being used for these studies required, in order to obtain sufficient machine direction stretch ratios, a length orientation step prior to the simultaneous biaxial tenter, it was of interest to explore the effects of preheating conditions on the length orienter step as well. The patent literature regarding sequentially biaxially oriented PEN films indicates that the preferred temperatures for the machine direction stretching step is not as high as 150° C., the optimum temperature for simultaneous biaxial draw of the multilayer films as indicated by laboratory results. Therefore, both the preheating temperature and time were studied.

In Examples 204–228, specimens of the retained cast web of Example 122 were mounted in the laboratory stretcher in such a way as to be gripped only in the machine direction. The other two sides remained ungripped, and were thus free to contract as they are in a length orienter. For each specimen, the preheat and machine direction stretch temperature were the same. Temperature was varied over the range 120°–170° C., and the preheat times employed were 7 seconds, 15 seconds, and 45 seconds. Machine direction stretching was done at 100%/sec to a stretch ratio of 1.50. Ink marks were made on each specimen, so that the uniformity of deformation of each could be judged. After all the specimens had been stretched, they were assessed visually for stretch uniformity and whitening (haziness). For each set created with the same preheat time, it was observed that there was some central value(s) or preheat/stretch temperature at which the stretching uniformity was best, and stretching uniformity degraded continuously as temperature was raised or lowered. For haze, it was observed in each set that there was a preheat/stretch temperature at which haze first appeared, and raising the temperature caused a continuous increase in the haze until the specimens became quite white. The results are summarized in Table 18.

TABLE 18

| Preheat/Stretch Temp. (C.) | 120 | 125 | 130 | 135 | 140 | 145 | 150 | 155 | 160 | 170 |
|---|---|---|---|---|---|---|---|---|---|---|
| Preheat Time (sec) | | | | | | | | | | |
| 7 | | | | | Best Stretch Uniformity | Best Stretch Uniformiy | | | Onset of Haze | |
| 15 | | | | | Best Stretch Uniformity | Onset of Haze | | | | |
| 45 | | | Onset of Haze | Best Stretch Uniforlity | Best Stretch Uniformity | | | | | |

One can clearly see from these results that the temperature for best stretch uniformity, an important consideration in a length orienter, is inversely related to preheat time. Thus, as the preheat time is increased, the temperature for best stretch uniformity slowly falls from 140°–145° C. to 140° C. to 135°–140° C. The onset of haze, however, is a strong function of the preheat time, eventually occurring at temperatures lower than the optimum temperatures for uniform stretching. It is clear, however, that at sufficiently short preheat times, a uniform length orientation stretch can be performed without the onset of haze. In fact, no haze was observed in the film between the length orientation and tenter in the experiments of Examples 122–134, 143–146, or 149–191.

EXAMPLE 229

The following examples illustrate the crystallizability of PET in a length oriented web.

The film of Example 208, preheated for 7 seconds at 140° C. prior to machine direction stretch to stretch ratio of 1.5, was further heated while gripped in the machine direction for 45 seconds at 150° C. The PET layers of the clear machine direction-stretched film whitened similarly to the cast web sample of Example 201. This confirms the feasibility of producing conditions in the tenter-preheated web conducive to making clear, smooth, high modulus films even when the tentering step is preceded by a length orientation step.

EXAMPLES 230–235

The following examples illustrate the properties of cast webs made with different numbers of layers.

Additional cast web rolls were made by techniques similar to those of Examples 1–24 and 89–103 using 1¾ inch extruders for both PEN and PET. The PEN resin IV was about 0.50, and the PET resin IV was about 0.80. Short, ¾ inch neck tubes were used to transport the extrudates to the multilayer feedblock. A 12-inch wide Cloeren film die was used. Different modular inserts were used in the feedblock in the various Examples, each designed to provide a multilayer film of an odd number of alternating layers: 3, 7, 13, 29, and 61. The feedblock inserts were not modified to provide doubly-thick outer layers as had been done in several previous examples. All cast webs were made with PEN as the outermost layers.

The PEN resin was dried at about 177° C. and extruded at about 293° C. The PET resin was dried at about 138° C. and extruded at about 282° C. The neck tubes were maintained at about 293° C. and 277° C., respectively. The feedblock and die were maintained at about 282° C. The casting roll was maintained at about room temperature. Total throughput was about 80 lbs./hr., and each composition was about 80% PEN and cast to about 15 mils. The exact figures are given in Table 19.

Of the cast webs made with each feedblock insert, those having the best appearance were rolled and retained for later experimentation. The best cast web made in these experiments with the 13 and 61-layer inserts had rheologically-related surface defects. In order to make valid comparisons, some webs made with the 29 layer insert were rolled up and retained even though they, too, had some surface defects. A roll made with the 29 layer feedblock without defects was also obtained. Details are given in Table 19.

TABLE 19

| Example No | Number of Layers | % PEN | Cast Thickness (mils) | Quality |
|---|---|---|---|---|
| 230 | 3 | 80 | 15.8 | Good |
| 231 | 7 | 81 | 15.3 | Good |
| 232 | 13 | 81 | 15.1 | Slight Defects |
| 233 | 29 | 81 | 18.0 | Good |
| 234 | 29 | 82 | 16.3 | Defects |
| 235 | 61 | 80 | 15.2 | Defects |

EXAMPLES 236–243

The following examples illustrate the effect of the number of layers on stretchability.

Specimens were prepared for laboratory stretching from the cast webs of Examples 230–235. In addition, specimens were prepared from two different cast webs of monolayer PEN to serve as "controls". One was the cast web of Example 1. This web had a similar thickness to those of Examples 230–235, but used PEN of a higher IV. A second control web was monolayer PEN retained from the start-up of the experiment of Examples 126–134, extruded at the conditions cited for PEN therein. This web was thinner (9.7 mils), but matched the PEN IV of Examples 230–235.

The laboratory film stretcher was used with the added force transducer instrumentation to determine UBSRs. Stretching was done as usual at 15° C., after 45 seconds preheating, at 100%/sec in both the machine direction and the transverse direction simultaneously. The specimens were all stretched to a nominal biaxial stretch ratio of 6.25. If a specimen broke before stretching that far, the stress-strain trace for the experiment showed a sudden fall at the instant of specimen failure. The resolution of the instrument was about 0.12 stretch ratio units, and the precision was about 0.02 units.

For each material, five specimens were stretched. The highest value for stretch ratio replicated within the five tests is considered to be the UBSR. If no value was repeated in five tests, additional tests were performed until a value in the upper half of all values was replicated. This procedure eliminates contamination of the data by extraneous effects (i.e., nicks in the specimen edges). In most cases, replication is achieved at the highest or second-highest value obtained. The results are shown in Table 20.

TABLE 20

| Example No. | Cast Web No. | No. of Layers | Comments | UBSR |
|---|---|---|---|---|
| 236 | 1 | Monolayer PEN | Higher IV | 5.51 |
| 237 | 237 | Monolayer PEN | Thinner Caliper | 5.40 |
| 238 | 230 | 3 | — | 5.63 |
| 239 | 231 | 7 | — | 6.00 |
| 240 | 232 | 13 | Slight Defects | 6.24 |
| 241 | 233 | 29 | — | 6.23 |
| 242 | 234 | 29 | Defects | 6.11 |
| 243 | 235 | 61 | Defects | 6.24 |

Results of 6.23 or 6.24 were obtained from fully successful 6.25× stretches, the difference reflecting only the precision of the instrument. It is clear from the data presented in Table 20 that the results at 13, 29, and 61 layers are roughly equivalent, given the constraints of the laboratory stretcher. It could be argued that the results at 61 layers are superior to those at 29, since surface defects did not degrade performance to a level below the stretching machine limitation. However, the results at 7 layers are significantly less impressive, and those at 3 approach those of plain monolayer PEN films.

These results imply that the enhanced stretchability effect in multilayer films of the present invention is improved by increasing the number of layers at least to 13, and perhaps beyond. A significant effect is still seen at layer numbers as low as 7, but the effect on 3 layer films is negligible.

EXAMPLES 244–249

The following examples illustrate USBRs obtained for 13-layer films.

Additional cast web rolls were made, and specimens from them stretched, by techniques similar to those in Examples 230–243. Only the 13 layer feedblock insert was used. Cast webs were made at about 60, 70, 75, 80, 85, and 90% PEN. Cast caliper was controlled at about 10 mils, so as to be comparable to the monolayer PEN of Example 237. Stretching and assessment of UBSR was done as in Examples 236–243. The details and results are shown in Table 21, with Example 237 repeated for clarity.

TABLE 21

| Example No. | % PEN | Cast Thickness (mils) | Cast Web Surface Defects | UBSR |
| --- | --- | --- | --- | --- |
| 244 | 61 | 10.3 | Moderate | 5.76 |
| 245 | 70 | 10.3 | Moderate | 6.00 |
| 246 | 75 | 10.5 | Moderate | 6.12 |
| 247 | 81 | 10.0 | Slight | 6.24 |
| 248 | 84 | 10.2 | Slight | 6.00 |
| 249 | 91 | 9.9 | Moderate | 5.76 |
| 237 | Monolayer PEN | 9.7 | None | 5.40 |

It is clear from the table that the 13 layer films exhibit the same trend found in the 29 layer series of Table 3 and FIG. 3. The absolute values of the UBSRs differ because of the different measurement techniques employed. Still, the enhanced stretchability clearly goes through a maximum for both data sets at about 80% PEN, and stretching performance is as good or better than for monolayer PEN at all compositions greater than about 60% PEN.

EXAMPLES 250–251

The following examples illustrate the production of tensiled multilayer films.

An effort was made to make "tensilized" films (films with a machine direction modulus significantly higher than a transverse direction modulus) on the film line. Conditions were similar to those of Example 122, with the following exceptions. PET was dried at about 129° C. The PET melt train was maintained at about 271° C. One inch (2.54 cm) neck tubes were used. The 12 inch (30.5 cm) wide Cloeren film die of Examples 230–235 was used. The feedblock was maintained at the same temperature as the die (about 288° C.). The casting roll was maintained at about 32° C. The webs were cast at thicknesses of 13 and 9 mils, respectively, for Examples 250 and 251. All the heated rollers of the length orienter were maintained at the same temperature, about 107° C. The stretch ratio in the length orienter was limited to 1.04. The preheat and stretch zones in the tenter were maintained at about 155° C. and 149° C., respectively. The nominal stretch ratios in the stretch zone of the tenter were 4.40 and 4.53 in the machine direction and transverse direction, respectively.

The tenter was equipped with a modification permitting, immediately following the simultaneous biaxial stretch, a secondary stretch in the machine direction at a stretch ratio of 1.09. Thus, the total stretch ratio in the machine direction was 1.04×4.40×1.09, or 4.99. Real draw ratios measured via the displacement of ink marks on the webs were 5.15 and 5.10 in the machine and transverse directions, respectively. The first heat-set zone was maintained at about 210° C., and the second heat-set zone was maintained at about 204° C. The cooling zone was maintained at about 66° C. The film was relaxed under restraint similarly to Examples 126–134, except that all the relaxation occurred in the cooling zone. The relaxed nominal transverse direction stretch ratio was 4.24.

The thickness, Green Modulus, heat shrinkage, haze, and surface roughness (by Rodenstock) of the films is shown in Table 22. Roughness values are given for both sides of each film. In appearance, both of the films were slightly hazy.

TABLE 22

| Example No | Caliper (mils) | Green Mod. MD, kpsi ($10^6$ kpa) | Green Mod. TD, kpsi ($10^6$ kpa) | 150° C./ 15 min Shrinkage MD (%) | 150° C./ 15 min Shrinkage TD (%) | Haze (%) | Roden-stock Ra (nm) | Roden-stock Rq (nm) |
| --- | --- | --- | --- | --- | --- | --- | --- | --- |
| 250 | 0.47 | 1036 (7.14) | 733 (5.05) | 3.76 | –(0.12) | 7.13 | 144 170 | 210 240 |
| 251 | 0.32 | 996 (6.87) | 721 (4.97) | | | 6.26 | 72 92 | 104 132 |

The data shows that the "secondary stretching" modification to the line film line was successful in producing tensilized film. Compared to the results of Examples 126–134 in Table 10, the machine direction Green Moduli are about 250–300 kpsi (1.02–2.07×$10^6$ kPa) higher, the transverse direction moduli are roughly unchanged, the MD shrinkage is, as expected, somewhat higher, and the TD shrinkage remains near zero. Haze is roughly equivalent to the best Examples in Table 10. These results indicate that multilayer tensilized films can be made by the technique of these examples.

EXAMPLES 252–259

The following examples illustrate that the multilayer effect of enhanced stretchability applies to both sequential drawing processes as well as to simultaneous drawing processes.

Cast webs from Examples 122 (25 Layer, 80% PEN multilayer) and Example 237 (Monolayer PEN) were used to explore the question of whether the enhanced stretchability of the multilayer films also applies to the more industrially common sequential stretching process. Conditions for stretching were as before: 45 second preheat at the stretching temperature, 100%/sec stretch rate in each direction. The specimens were stretched sequentially, first in the original machine direction of the cast web, then in the transverse direction, without any pause between stretching steps.

The monolayer PEN of Example 237 was examined first to determine its stretching behavior in the sequential mode.

The preheat/stretch temperature was varied in 5° C. increments from 120°–15° C. At each temperature, the lab stretcher was set to stretch to the same specific stretch ratio in both directions sequentially. If the specimen broke, the experiment was repeated with lower stretch ratios. If the specimen did not break, the experiment was repeated with higher stretch ratios. The stretch ratio increment was 0.1 stretch ratio units.

When the borderline between successful and unsuccessful stretches was established and reproduced, the highest successful value of stretch ratio was deemed the sequential-mode UBSR. The films were also evaluated for stretch uniformity. Those deemed non-uniform typically stretched non-uniformly in the second or transverse direction, leaving thick and thin bands than ran along the machine direction. The exception was Example 252, which stretched non-uniformly in the first, or machine direction, step. The results are given in Table 23.

TABLE 23

| Example No. | Stretch Temp. (°C.) | UBSR | Comment |
|---|---|---|---|
| 252 | 120 | 4.0 | Non-Uniform in MD |
| 253 | 125 | 4.3 | Good |
| 254 | 130 | 4.6 | Good |
| 255 | 135 | 4.4 | Non-Uniform in TD |
| 256 | 140 | 4.0 | Non-Uniform in TD |
| 257 | 145 | 4.1 | Non-Uniform in TD |
| 258 | 150 | 4.4 | Non-Uniform in TD |

These results show that the optimum temperature for stretchability for PEN is about 130° C. This is consistent with existing prior art. At 130° C., the sequential-mode UBSR is highest and the film is uniform. UBSR falls off in each direction from 130° C., but rises again at 145°–150° C., as the effects of stretching an uncrystallized but overheated web begin to result in a "melty" stretch.

The multilayer sample was then stretched at the optimum PEN temperature of 130° C. using the same protocols. This is Example 259. The sequential-mode UBSR for the cast web of Example 122 was found to be in excess of 5.0. Thus, the multilayer effect of enhanced stretchability does apply to the sequential drawing process as well as to the simultaneous process.

The preceding description is meant to convey an understanding of the present invention to one skilled in the art, and is not intended to be limiting. Modifications within the scope of the invention will be readily apparent to those skilled in the art. Therefore, the scope of the invention should be construed solely by reference to the appended claims.

What is claimed is:

1. A multilayer film, comprising:
   a surface layer comprising a first polymer; and
   a second layer, adjacent to said surface layer, comprising a second polymer;
   wherein said surface layer and said second layer are devoid of particulate slip agents, wherein said second polymer is crystallized into a plurality of crystalline structures, and wherein said surface layer is sufficiently deformed by said crystalline structures such that said surface layer has a surface roughness $R_A$ of at least about 10 nm as measured by the Rodenstock technique.

2. The film of claim 1, wherein the surface layer has a surface roughness $R_A$ of at least about 20 nm as measured by the Rodenstock technique.

3. The film of claim 1, wherein the surface layer has a surface roughness $R_Q$ of at least about 30 nm as measured by the Rodenstock technique.

4. The film of claim 1, wherein the surface layer has a surface roughness $R_A$ of at least about 7 nm as measured by the interferometry technique.

5. The film of claim 1, wherein the surface layer has a surface roughness $R_Q$ of at least about 9 nm as measured by the interferometry technique.

6. The film of claim 1, wherein said film has a percent haze of less than about 8%.

7. The film of claim 1, wherein said film has a static coefficient of friction of less than about 3.2.

8. The film of claim 1, wherein said film has a static coefficient of friction of less than about 1.0.

9. The film of claim 1, wherein said film has a kinetic coefficient of friction of less than about 1.0.

10. The film of claim 1, wherein said film has a kinetic coefficient of friction of less than about 0.6.

11. The multilayer film of claim 1, wherein said first polymer comprises a naphthalene dicarboxylic acid polyester and said second polymer comprises a terephthalic acid polyester.

12. The film of claim 11, wherein said second polymer is polyethylene terephthalate.

13. The film of claim 12, wherein said surface layer comprises polyethylene naphthalate.

14. The multilayer film of claim 11, wherein said naphthalene dicarboxylic acid polyester is polyethylene naphthalate and said terephthalic acid polyester is polyethylene terephthalate.

15. The multilayer film of claim 1, wherein said multilayer film comprises at least 7 alternating layers of a first layer comprising a naphthalene dicarboxylic acid polyester and a second layer comprising a terephthalic acid polyester.

16. The multilayer film of claim 1, wherein said multilayer film comprises at least 13 alternating layers of a first layer comprising a naphthalene dicarboxylic acid polyester and a second layer comprising a terephthalic acid polyester.

17. A film having a slippery surface, comprising:
   a surface layer which is devoid of particle slip agents; and
   a second layer disposed beneath said surface layer;
   wherein said second layer consists essentially of a polymeric material which is crystallized into spherulitic structures of sufficient size and quantity to deform said surface layer.

18. The film of claim 17, wherein said surface layer and said second layer are adjacent.

19. The film of claim 17, wherein said surface layer comprises polyethylene naphthalate, and said second layer comprises polyethylene terephthalate.

20. The film of claim 17, wherein at least one surface of said film is devoid of slip agents, and wherein at least one surface of said film has a surface roughness $R_Q$ of at least about 20 nm as measured by the Rodenstock technique.

21. A film comprising a multilayer film comprising at least about 7 alternating layers of a first polymer and a second polymer in combination with a surface layer, wherein the surface layer comprises:
   a first layer comprising said first polymer; and
   a second layer comprising said second polymer;
   wherein said first polymer is a terephthalic acid polyester and said second polymer is a naphthalene dicarboxylic acid polyester, wherein said first layer is disposed between said second layer and said multilayer film, said second layer being devoid of particulate slip agents, and wherein said first layer is sufficiently crystallized so as to deform said second layer such that the surface layer has a root mean square average surface roughness $R_q$ of at least about 100 nm.

22. The film of claim 21, wherein the terephthalic acid polyester in said first layer contains spherulitic structures.

23. The film of claim 21, wherein said multilayer film has at least 13 alternating layers of said first and second polymers.

24. A multilayer polyester film, comprising:

a surface layer; and a second layer adjacent to said surface layer, said second layer comprising a polyester and containing a plurality of crystalline structures;

wherein said surface layer and said second layer are devoid of particulate slip agents, and wherein said surface layer is sufficiently deformed by said crystalline structures in said second layer such that said surface layer has a surface roughness $R_A$ of at least about 10 nm as measured by the Rodenstock technique.

25. The multilayer film of claim 24, wherein said surface layer has a surface roughness $R_A$ of at least about 20 nm as measured by the Rodenstock technique.

26. A multilayer polyester film, comprising:

alternating layers of a first polymer derived from naphthalene dicarboxylic acid and a second polymer derived from terephthalic acid;

wherein a first layer forming a first surface of the film comprises said first polymer and is substantially devoid of particulate slip agents, wherein a second layer adjacent to said first layer comprises said second polymer, and wherein said second polymer in said second layer is crystallized into crystalline structures of sufficient size and quantity to substantially disrupt the surface smoothness of said first layer.

27. The film of claim 26, wherein said first surface has a surface roughness $R_A$ of at least about 10 nm as measured by the Rodenstock technique.

28. The film of claim 26, wherein said film has at least 7 alternating layers of said first polymer and said second polymer.

29. The film of claim 26, wherein said film has at least 13 alternating layers of said first polymer and said second polymer.

30. A film comprising a multilayer film comprising at least about 5 alternating layers of a first polymer and a second polymer in combination with a surface layer, wherein the surface layer comprises:

a first layer comprising a naphthalene dicarboxylic acid polyester; and a second layer comprising a terephthalic acid polyester; wherein said surface layer is devoid of particulate slip agents, wherein said second layer is disposed between said first layer and said multilayer film, wherein said second layer is sufficiently crystallized so as to deform said first layer such that said surface layer has a surface roughness $R_A$ of at least about 10 nm as measured by the Rodenstock technique, wherein said first polymer comprises a naphthalene dicarboxylic acid polyester, and wherein said second polymer comprises a terephthalic acid polyester.

31. A multilayer film, comprising:

a surface layer comprising a first polymer; and a second layer, disposed beneath said surface layer, comprising a second polymer;

wherein said surface layer is devoid of particulate slip agents, wherein said second polymer is crystallized into a plurality of crystalline structures of sufficient size and quantity to deform said surface layer, and wherein said surface layer has a root mean square average surface roughness $R_q$ of at least about 100 nm.

32. The multilayer film of claim 31, wherein said second polymer is a polyester.

33. The multilayer film of claim 31, wherein said second polymer is polyethylene terephthalate.

* * * * *

UNITED STATES PATENT AND TRADEMARK OFFICE
CERTIFICATE OF CORRECTION

PATENT NO. : 5,783,283
DATED : July 21, 1998
INVENTOR(S) : James A. Klein, Brandt K. Carter, Sheldon J. Israel and Raymond L. Lucking.

It is certified that error appears in the above-identified patent and that said Letters Patent is hereby corrected as shown below:

Column 42, Line 37 delete "particle" and insert in place thereof "particulate"

Signed and Sealed this

Eleventh Day of July, 2000

Attest:

Q. TODD DICKINSON

*Attesting Officer*       *Director of Patents and Trademarks*